US011299417B2

(12) United States Patent
Otter et al.

(10) Patent No.: US 11,299,417 B2
(45) Date of Patent: *Apr. 12, 2022

(54) PREPARATION OF A QUARTZ GLASS BODY IN A MELTING CRUCIBLE OF REFRACTORY METAL

(71) Applicant: Heraeus Quarzglas GmbH & Co. KG, Hanau (DE)

(72) Inventors: Matthias Otter, Hamm (DE); Walter Lehmann, Leipzig (DE); Michael Hünermann, Alzenau (DE); Nils Christian Nielsen, Göllheim (DE); Nigel Robert Whippey, Seligenstadt (DE); Boris Gromann, Aschaffenburg (DE); Abdoul-Gafar Kpebane, Hanau-Mittelbuchen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 401 days.

This patent is subject to a terminal disclaimer.

(21) Appl. No.: 16/062,658

(22) PCT Filed: Dec. 16, 2016

(86) PCT No.: PCT/EP2016/081438
§ 371 (c)(1),
(2) Date: Nov. 15, 2018

(87) PCT Pub. No.: WO2017/103155
PCT Pub. Date: Jun. 22, 2017

(65) Prior Publication Data
US 2019/0071344 A1    Mar. 7, 2019

(30) Foreign Application Priority Data

Dec. 18, 2015 (EP) ..................... 15201137

(51) Int. Cl.
*C03B 37/012* (2006.01)
*C03C 3/06* (2006.01)
(Continued)

(52) U.S. Cl.
CPC .......... *C03B 37/01211* (2013.01); *C03B 5/06* (2013.01); *C03B 17/04* (2013.01);
(Continued)

(58) Field of Classification Search
CPC ................................ C03B 37/01211
See application file for complete search history.

(56) References Cited

U.S. PATENT DOCUMENTS 2,155,131 A   4/1939  Hanlein
3,043,660 A   7/1962  Hughes et al.
(Continued)

FOREIGN PATENT DOCUMENTS

CA   2575799    3/2006
CH   420 502    9/1966
(Continued)

OTHER PUBLICATIONS

Machine Translation of JP 07-277751A (Year: 1995).*
(Continued)

*Primary Examiner* — Cynthia Szewczyk
(74) *Attorney, Agent, or Firm* — Dicke, Billig & Czaja, PLLC

(57) ABSTRACT

The invention relates to a process for preparing a quartz glass body comprising the process steps i.) Providing a silicon dioxide granulate, ii.) Making a glass melt from the silicon dioxide granulate in a melting crucible, and iii.) Making a quartz glass body from at least a part of the glass melt, wherein the melting crucible is comprised in an oven and is made of at least one material comprising tungsten or molybdenum or a combination thereof. The invention fur-
(Continued)

ther relates to a quartz glass body which can be obtained by this process. Further, the invention relates to a light guide, an illuminant and a formed body, each of which can be obtained by processing the quartz glass body further.

10 Claims, 14 Drawing Sheets

(51) Int. Cl.
*C03B 5/06* (2006.01)
*C03B 17/04* (2006.01)
*C03B 20/00* (2006.01)

(52) U.S. Cl.
CPC ............... *C03B 20/00* (2013.01); *C03C 3/06* (2013.01); *C03B 2201/04* (2013.01); *C03B 2201/07* (2013.01); *C03B 2201/23* (2013.01); *C03B 2207/42* (2013.01); *C03C 2201/02* (2013.01); *C03C 2203/10* (2013.01)

(56) References Cited

U.S. PATENT DOCUMENTS

| | | | |
|---|---|---|---|
| 3,127,289 A | 3/1964 | Beall |
| 3,212,871 A | 10/1965 | Vatterodt |
| 3,261,676 A | 7/1966 | Morelock |
| 3,320,045 A | 5/1967 | Weiss et al. |
| 3,331,673 A | 7/1967 | Bour |
| 3,359,098 A | 12/1967 | Teaford |
| 3,370,921 A | 2/1968 | Wagstaff |
| 3,401,017 A | 9/1968 | Burke, Jr. |
| 3,523,096 A | 8/1970 | Burke, Jr. |
| 3,686,113 A | 8/1972 | Burke, Jr. |
| 3,694,398 A | 9/1972 | Burke, Jr. |
| 3,711,262 A | 1/1973 | Schultz et al. |
| 3,717,450 A | 2/1973 | Loughridge et al. |
| 3,764,286 A | 10/1973 | Antczak et al. |
| 3,944,713 A | 3/1976 | Plumat et al. |
| 4,033,780 A | 7/1977 | Baumgartner et al. |
| 4,038,370 A | 7/1977 | Tokimoto et al. |
| 4,042,361 A | 8/1977 | Bihuniak et al. |
| 4,047,966 A | 9/1977 | Bihuniak et al. |
| 4,113,459 A | 9/1978 | Mattmuller |
| 4,195,982 A | 4/1980 | Coucoulas et al. |
| 4,224,295 A | 9/1980 | Brandt et al. |
| 4,336,048 A | 6/1982 | van der Steen et al. |
| 4,358,306 A | 11/1982 | Okamoto et al. |
| 4,372,771 A | 2/1983 | Coucoulas et al. |
| 4,546,484 A | 10/1985 | Meerman |
| 4,650,511 A | 3/1987 | Koya et al. |
| 4,828,593 A | 5/1989 | Morishita et al. |
| 4,828,594 A | 5/1989 | Morishita et al. |
| 4,828,595 A | 5/1989 | Morishita et al. |
| 4,871,695 A | 10/1989 | Seki et al. |
| 4,888,036 A | 12/1989 | Clasen |
| 4,923,497 A | 5/1990 | Leber et al. |
| 4,938,788 A | 7/1990 | Segawa et al. |
| 4,979,973 A | 12/1990 | Takita et al. |
| 4,985,275 A | 1/1991 | Takemura et al. |
| 5,063,179 A | 11/1991 | Menashi et al. |
| 5,141,786 A | 8/1992 | Shimizu et al. |
| 5,145,507 A | 9/1992 | Kyoto et al. |
| 5,196,759 A | 3/1993 | Parham et al. |
| 5,240,488 A | 8/1993 | Chandross et al. |
| 5,244,485 A | 9/1993 | Hihara et al. |
| 5,262,610 A | 11/1993 | Huang et al. |
| 5,302,556 A | 4/1994 | Shimizu et al. |
| 5,364,432 A | 11/1994 | Leber |
| 5,364,433 A | 11/1994 | Nishimura |
| 5,516,350 A | 5/1996 | Onoda et al. |
| 5,540,782 A | 7/1996 | Miyagi et al. |
| 5,541,826 A | 7/1996 | Sandell |
| 5,547,482 A | 8/1996 | Chalk et al. |
| 5,585,173 A | 12/1996 | Kamo et al. |
| 5,601,428 A | 2/1997 | Okoshi et al. |
| 5,631,522 A | 5/1997 | Scott et al. |
| 5,637,284 A | 6/1997 | Sato et al. |
| 5,651,827 A | 7/1997 | Aoyama et al. |
| 5,665,133 A | 9/1997 | Orii et al. |
| 5,674,792 A | 10/1997 | Moritz et al. |
| 5,713,979 A | 2/1998 | Nicholson et al. |
| 5,736,206 A | 4/1998 | Englisch et al. |
| 5,772,714 A | 6/1998 | Sato et al. |
| 5,776,240 A * | 7/1998 | Deller ................... B01J 35/108 106/482 |
| 5,807,418 A | 9/1998 | Chamberland et al. |
| 5,837,334 A | 11/1998 | Yokokawa et al. |
| 5,851,253 A | 12/1998 | Pet et al. |
| 5,855,860 A | 1/1999 | Nishimine et al. |
| 5,904,817 A | 5/1999 | Berger |
| 5,924,216 A | 7/1999 | Takahashi |
| 5,928,397 A | 7/1999 | Bihuniak et al. |
| 5,972,488 A | 10/1999 | Nagata et al. |
| 5,976,480 A | 11/1999 | Mangold et al. |
| 5,979,186 A | 11/1999 | Koppler et al. |
| 6,071,838 A | 6/2000 | Endo et al. |
| 6,127,295 A | 10/2000 | Yoon et al. |
| 6,129,899 A | 10/2000 | Katsuro et al. |
| 6,133,178 A | 10/2000 | Yamada et al. |
| 6,136,736 A | 10/2000 | Rajaram et al. |
| 6,143,676 A | 11/2000 | Ohashi et al. |
| 6,162,552 A | 12/2000 | Bewlay et al. |
| 6,235,669 B1 | 5/2001 | Antczak et al. |
| 6,263,704 B1 | 6/2001 | Tomita et al. |
| 6,257,737 B1 | 7/2001 | Marshall et al. |
| 6,260,563 B1 | 7/2001 | Lordo et al. |
| 6,291,377 B1 | 9/2001 | Komine et al. |
| 6,360,563 B1 | 3/2002 | Gerhardt et al. |
| 6,368,175 B1 | 4/2002 | Horiuchi et al. |
| 6,380,110 B1 | 4/2002 | Werdecker et al. |
| 6,399,526 B2 | 6/2002 | Tomita et al. |
| 6,422,861 B1 | 7/2002 | Antczak et al. |
| 6,484,540 B1 | 11/2002 | Shimada et al. |
| 6,632,086 B1 | 10/2003 | Antczak et al. |
| 6,653,786 B2 | 11/2003 | Fukushima et al. |
| 6,679,945 B2 | 1/2004 | Oswald et al. |
| 6,684,664 B2 | 2/2004 | Werdecker et al. |
| 6,739,155 B1 | 5/2004 | Giddings et al. |
| 6,752,864 B2 | 6/2004 | Meyer et al. |
| 6,763,682 B1 | 7/2004 | Sayce et al. |
| 6,826,927 B2 | 12/2004 | Fukui et al. |
| 6,849,242 B1 | 2/2005 | Koeppler et al. |
| 7,255,843 B2 | 8/2007 | Kobayashi et al. |
| 7,427,387 B2 | 9/2008 | Katsuro et al. |
| 7,452,518 B2 | 11/2008 | Hansen et al. |
| 7,506,521 B2 | 3/2009 | Bookbinder et al. |
| 7,629,391 B2 | 12/2009 | Jacquinot et al. |
| 7,641,969 B2 | 1/2010 | Fletcher, III |
| 7,645,335 B2 | 1/2010 | Lortz et al. |
| 7,722,849 B2 | 5/2010 | Moerters et al. |
| 7,785,560 B2 | 8/2010 | Schumacher et al. |
| 7,803,341 B2 | 9/2010 | Ohara et al. |
| 7,841,211 B2 | 11/2010 | Sato et al. |
| 7,955,715 B2 | 6/2011 | Trommer et al. |
| 7,998,558 B2 | 8/2011 | Chen et al. |
| 8,017,536 B2 | 9/2011 | Weber et al. |
| 8,053,080 B2 | 11/2011 | Fukui et al. |
| 8,132,429 B2 | 3/2012 | Pedrido |
| 8,211,817 B2 | 7/2012 | Arai et al. |
| 8,268,740 B2 | 9/2012 | Fiacco et al. |
| 8,316,671 B2 | 11/2012 | Huenermann |
| 8,426,778 B1 | 4/2013 | Bolt |
| 8,529,651 B2 | 9/2013 | Lortz et al. |
| 8,541,326 B2 | 9/2013 | Morita et al. |
| 8,764,992 B2 | 7/2014 | Wursche et al. |
| 8,899,732 B2 | 12/2014 | Reinten et al. |
| 8,940,266 B2 | 1/2015 | Yamada et al. |
| 9,108,876 B2 | 8/2015 | Dawes et al. |
| 9,120,678 B2 | 9/2015 | Ueda |
| 9,272,942 B2 | 3/2016 | Trommer et al. |
| 9,359,263 B2 | 6/2016 | Hartmann |
| 9,446,959 B2 | 9/2016 | Ueda |
| 9,481,108 B2 | 11/2016 | Sowa |

(56) References Cited

U.S. PATENT DOCUMENTS

| | | | |
|---|---|---|---|
| 9,505,651 B2 | 11/2016 | Gu et al. |
| 9,580,348 B2 | 2/2017 | Lehmann et al. |
| 9,625,213 B2 | 4/2017 | Uibel et al. |
| 9,701,561 B2 | 7/2017 | Coapes et al. |
| 9,732,180 B2 | 8/2017 | Burckhardt et al. |
| 9,745,201 B2 | 8/2017 | Ueda |
| 9,797,068 B2 | 10/2017 | Sakurada et al. |
| 9,914,265 B2 | 3/2018 | Bauer et al. |
| 9,957,431 B2 | 5/2018 | Scheich et al. |
| 9,960,410 B2 | 5/2018 | Neumann et al. |
| 10,173,917 B2 | 1/2019 | Yamazaki et al. |
| 2001/0008366 A1 | 7/2001 | Nishida |
| 2001/0025001 A1 | 9/2001 | Oda et al. |
| 2002/0041963 A1 | 4/2002 | Konya et al. |
| 2002/0044903 A1 | 4/2002 | Oswald et al. |
| 2002/0046992 A1 | 4/2002 | Inaki et al. |
| 2002/0071871 A1 | 6/2002 | Snyder et al. |
| 2002/0134108 A1 | 9/2002 | Werdecker et al. |
| 2002/0144517 A1 | 10/2002 | Fujiwara et al. |
| 2003/0000458 A1 | 1/2003 | Marumo et al. |
| 2003/0041623 A1 | 3/2003 | Werdecker et al. |
| 2003/0089279 A1 | 5/2003 | Meyer et al. |
| 2003/0101748 A1 | 6/2003 | Ezaki et al. |
| 2003/0119648 A1 | 6/2003 | Werdecker et al. |
| 2003/0121283 A1 | 7/2003 | Yu |
| 2003/0124045 A1 | 7/2003 | Kobayashi et al. |
| 2003/0129153 A1 | 7/2003 | Moerters et al. |
| 2003/0158297 A1 | 8/2003 | Sano et al. |
| 2003/0159464 A1 | 8/2003 | Bowden et al. |
| 2003/0159466 A1 | 8/2003 | Bowden et al. |
| 2003/0159468 A1* | 8/2003 | Zeng ................. C03B 37/01892 252/301.4 F 65/86 |
| 2003/0169315 A1 | 9/2003 | Pickrell |
| 2003/0175649 A1 | 9/2003 | Oosterlaken et al. |
| 2003/0185739 A1 | 10/2003 | Mangold et al. |
| 2003/0226377 A1 | 12/2003 | Barrett et al. |
| 2004/0115440 A1 | 6/2004 | Werdecker et al. |
| 2004/0116270 A1 | 6/2004 | Oswald et al. |
| 2004/0118155 A1 | 6/2004 | Brown et al. |
| 2004/0253164 A1 | 12/2004 | Mangold et al. |
| 2005/0000250 A1 | 1/2005 | Humbach et al. |
| 2005/0039490 A1 | 2/2005 | Zeng et al. |
| 2005/0072191 A1 | 4/2005 | Giddings et al. |
| 2005/0103231 A1 | 5/2005 | Geisselmann et al. |
| 2005/0129603 A1 | 6/2005 | Szillat et al. |
| 2005/0129605 A1 | 6/2005 | Unger et al. |
| 2005/0220692 A1 | 10/2005 | Mangold et al. |
| 2005/0232571 A1 | 10/2005 | Fabian |
| 2005/0258758 A1 | 11/2005 | Boehme |
| 2005/0272588 A1 | 12/2005 | Sato et al. |
| 2005/0272826 A1 | 12/2005 | Mangold et al. |
| 2006/0055300 A1 | 3/2006 | Janos et al. |
| 2006/0059948 A1 | 3/2006 | Sato et al. |
| 2006/0117801 A1 | 6/2006 | Saitou et al. |
| 2006/0122450 A1 | 6/2006 | Kim et al. |
| 2006/0137400 A1 | 6/2006 | Hansen et al. |
| 2006/0137401 A1 | 6/2006 | Fabian |
| 2006/0176701 A1 | 8/2006 | Shemit et al. |
| 2006/0183623 A1 | 8/2006 | Ikuta et al. |
| 2006/0201647 A1 | 9/2006 | Schumacher et al. |
| 2006/0204189 A1 | 9/2006 | Sasaki et al. |
| 2006/0246363 A1 | 11/2006 | Kikugawa et al. |
| 2006/0281623 A1 | 12/2006 | Winnen et al. |
| 2007/0015652 A1 | 1/2007 | Mangold et al. |
| 2007/0145332 A1* | 6/2007 | Koeppler ................. C03B 20/00 252/301.4 F |
| 2007/0178329 A1 | 8/2007 | Trommer et al. |
| 2007/0180862 A1 | 8/2007 | Takahashi |
| 2007/0199659 A1 | 8/2007 | Landsmeer |
| 2008/0066497 A1 | 3/2008 | Weber et al. |
| 2008/0075949 A1 | 3/2008 | Kirst et al. |
| 2008/0107385 A1 | 5/2008 | Ohga et al. |
| 2008/0113174 A1 | 5/2008 | Sato et al. |
| 2008/0193715 A1 | 8/2008 | Weber et al. |
| 2008/0203625 A1 | 8/2008 | Oswald et al. |
| 2008/0213591 A1 | 9/2008 | Meyer et al. |
| 2008/0268201 A1 | 10/2008 | Fiacco et al. |
| 2008/0282743 A1 | 11/2008 | Xu et al. |
| 2008/0290317 A1 | 11/2008 | Hille et al. |
| 2009/0139265 A1 | 6/2009 | Sato et al. |
| 2009/0151848 A1 | 6/2009 | Werdecker et al. |
| 2009/0208760 A1 | 8/2009 | Kuwahara et al. |
| 2009/0311159 A1 | 12/2009 | Gray |
| 2010/0005881 A1 | 1/2010 | Broedel et al. |
| 2010/0041538 A1 | 2/2010 | Arai et al. |
| 2010/0048376 A1 | 2/2010 | Oswald et al. |
| 2010/0071421 A1 | 3/2010 | Dawes et al. |
| 2010/0091360 A1 | 4/2010 | Kuehn et al. |
| 2010/0107700 A1 | 5/2010 | Dawes et al. |
| 2010/0162759 A1 | 7/2010 | Duran et al. |
| 2010/0178509 A1 | 7/2010 | Schumacher et al. |
| 2010/0179269 A1 | 7/2010 | Schachtely et al. |
| 2010/0196243 A1 | 8/2010 | Meyer et al. |
| 2010/0221501 A1 | 9/2010 | Chen et al. |
| 2010/0251771 A1 | 10/2010 | Langner et al. |
| 2010/0316858 A1 | 12/2010 | Sato et al. |
| 2010/0319582 A1 | 12/2010 | Fischer |
| 2011/0092757 A1 | 4/2011 | Akagishi et al. |
| 2011/0100063 A1 | 5/2011 | Desorcie et al. |
| 2011/0113829 A1 | 5/2011 | Leber et al. |
| 2011/0183138 A1 | 7/2011 | Trommer et al. |
| 2011/0226020 A1 | 9/2011 | Xu et al. |
| 2011/0244387 A1 | 10/2011 | Katusic et al. |
| 2011/0272322 A1 | 11/2011 | Yamagata et al. |
| 2011/0281227 A1 | 11/2011 | Franz et al. |
| 2012/0052297 A1 | 3/2012 | Pech et al. |
| 2012/0056106 A1 | 3/2012 | Neumann |
| 2012/0103017 A1 | 5/2012 | Ludwig |
| 2012/0174629 A1 | 7/2012 | Leber et al. |
| 2012/0213685 A1 | 8/2012 | Morita et al. |
| 2012/0288716 A1 | 11/2012 | Ueda |
| 2012/0297837 A1 | 11/2012 | Ishihara |
| 2012/0324958 A1 | 12/2012 | Yang |
| 2013/0047669 A1 | 2/2013 | Annamalai |
| 2013/0133377 A1 | 5/2013 | Fabian et al. |
| 2013/0219963 A1 | 8/2013 | Lehmann et al. |
| 2013/0319321 A1 | 12/2013 | Winnicka et al. |
| 2013/0340483 A1 | 12/2013 | Takahashi |
| 2014/0041575 A1 | 2/2014 | Yamagata |
| 2014/0072803 A1 | 3/2014 | Panz et al. |
| 2014/0349830 A1 | 11/2014 | Trommer et al. |
| 2015/0052948 A1 | 2/2015 | Lehmann et al. |
| 2015/0059407 A1 | 3/2015 | Lehmann et al. |
| 2015/0086462 A1 | 3/2015 | Such et al. |
| 2015/0114284 A1 | 4/2015 | Yamagata |
| 2015/0325836 A1 | 11/2015 | Neumann et al. |
| 2016/0002092 A1 | 1/2016 | Kuehn |
| 2016/0009586 A1 | 1/2016 | Bookbinder et al. |
| 2016/0090319 A1 | 3/2016 | Hofmann et al. |
| 2016/0168005 A1 | 6/2016 | Gromann et al. |
| 2018/0057391 A1 | 3/2018 | Kuhn |
| 2018/0362385 A1 | 12/2018 | Arndt et al. |
| 2018/0370835 A1 | 12/2018 | Otter et al. |
| 2018/0370838 A1 | 12/2018 | Otter et al. |
| 2019/0031554 A1 | 1/2019 | Otter et al. |
| 2019/0055150 A1 | 2/2019 | Fabian et al. |
| 2019/0062193 A1 | 2/2019 | Otter et al. |
| 2019/0062194 A1 | 2/2019 | Otter et al. |
| 2019/0062197 A1 | 2/2019 | Otter et al. |
| 2019/0062198 A1 | 2/2019 | Hunermann et al. |
| 2019/0071342 A1 | 3/2019 | Otter et al. |
| 2019/0071344 A1 | 3/2019 | Otter et al. |
| 2019/0077672 A1 | 3/2019 | Otter et al. |
| 2019/0077688 A1 | 3/2019 | Otter et al. |
| 2019/0077691 A1 | 3/2019 | Otter et al. |
| 2019/0092672 A1 | 3/2019 | Gromann et al. |
| 2019/0092674 A1 | 3/2019 | Otter et al. |
| 2019/0092675 A1 | 3/2019 | Whippey et al. |
| 2019/0092676 A1 | 3/2019 | Otter et al. |
| 2019/0119141 A1 | 4/2019 | Whippey et al. |

(56) References Cited

U.S. PATENT DOCUMENTS

| | | | |
|---|---|---|---|
| 2019/0152827 | A1 | 5/2019 | Otter et al. |
| 2020/0123039 | A1 | 4/2020 | Gromann et al. |

FOREIGN PATENT DOCUMENTS

| | | |
|---|---|---|
| CN | 1020190 | 9/1986 |
| CN | 1051528 | 5/1991 |
| CN | 1757598 | 4/2006 |
| CN | 201348619 | 11/2009 |
| CN | 101723387 | 6/2010 |
| CN | 101723388 | 6/2010 |
| CN | 102099304 | 6/2011 |
| CN | 202063820 | 12/2011 |
| CN | 102753493 | 10/2012 |
| CN | 102762362 | 10/2012 |
| CN | 202594940 | 12/2012 |
| CN | 103011552 | 4/2013 |
| CN | 103011567 | 4/2013 |
| CN | 202989330 | 6/2013 |
| CN | 103402933 | 11/2013 |
| CN | 103717531 | 4/2014 |
| CN | 103771690 | 5/2014 |
| CN | 103925791 | 7/2014 |
| CN | 203976973 | 12/2014 |
| CN | 104368272 | 2/2015 |
| CN | 104402197 | 3/2015 |
| CN | 108218194 | 6/2018 |
| DE | 543 957 | 2/1932 |
| DE | 671 626 | 2/1937 |
| DE | 854 073 | 10/1952 |
| DE | 1927851 | 12/1969 |
| DE | 2904199 | 8/1980 |
| DE | 2909815 | 9/1980 |
| DE | 144 868 | 11/1980 |
| DE | 3028364 | 2/1982 |
| DE | 3227785 | 1/1984 |
| DE | 3227786 | 1/1984 |
| DE | 248 928 | 8/1987 |
| DE | 4237107 | 5/1994 |
| DE | 19706556 | 8/1998 |
| DE | 199 50 496 | 4/2001 |
| DE | 10058558 | 6/2002 |
| DE | 102 00 234 C1 | 4/2003 |
| DE | 10243953 | 4/2004 |
| DE | 10329806 | 10/2004 |
| DE | 103 16 661 | 11/2004 |
| DE | 103 17 066 | 11/2004 |
| DE | 102004038602 | 12/2005 |
| DE | 102005016732 | 10/2006 |
| DE | 102005061274 | 6/2007 |
| DE | 102007049158 | 4/2009 |
| DE | 102009059016 | 6/2011 |
| DE | 102010008162 | 8/2011 |
| DE | 10 2011 121 153 | 3/2013 |
| DE | 102011120412 | 6/2013 |
| DE | 102012008123 | 10/2013 |
| DE | 10 2012 011 946 | 12/2013 |
| EP | 0015315 | 9/1980 |
| EP | 0129015 | 12/1984 |
| EP | 0318100 | 5/1989 |
| EP | 0335875 | 10/1989 |
| EP | 0463045 | 1/1992 |
| EP | 0574642 | 12/1993 |
| EP | 0627390 | 12/1994 |
| EP | 0629580 | 12/1994 |
| EP | 0709340 | 5/1996 |
| EP | 0715342 | 6/1996 |
| EP | 0729918 | 9/1996 |
| EP | 1182168 | 2/2002 |
| EP | 1201610 | 5/2002 |
| EP | 1304313 | 4/2003 |
| EP | 1361195 | 11/2003 |
| EP | 1 712 934 | 10/2006 |
| EP | 1717202 | 11/2006 |
| EP | 1 997 778 A1 | 12/2008 |
| EP | 2060313 | 5/2009 |
| EP | 2 423 163 A1 | 2/2012 |
| GB | 1197271 | 7/1970 |
| GB | 1254492 | 11/1971 |
| GB | 2044738 | 10/1980 |
| GB | 2049641 | 12/1980 |
| JP | S53-4027 | 1/1978 |
| JP | 6158822 | 3/1986 |
| JP | 61068340 | 4/1986 |
| JP | 6230633 | 2/1987 |
| JP | 6230634 | 2/1987 |
| JP | 62202826 | 9/1987 |
| JP | 62212233 | 9/1987 |
| JP | 62212235 | 9/1987 |
| JP | 62212236 | 9/1987 |
| JP | S62-212234 | 9/1987 |
| JP | S62-246834 | 10/1987 |
| JP | 63166791 | 7/1988 |
| JP | H02-9783 | 1/1990 |
| JP | 0264645 | 3/1990 |
| JP | H02-80329 | 3/1990 |
| JP | 02199015 | 8/1990 |
| JP | 02283015 | 11/1990 |
| JP | 031528 | 1/1991 |
| JP | 0455332 | 2/1992 |
| JP | 04182322 | 6/1992 |
| JP | H04219333 | 8/1992 |
| JP | 0532429 | 2/1993 |
| JP | H05-24856 | 2/1993 |
| JP | H05-32429 | 2/1993 |
| JP | 0587403 | 4/1993 |
| JP | 3061215 | 4/1993 |
| JP | H05-32432 | 5/1993 |
| JP | H05-229839 | 9/1993 |
| JP | 07133131 | 5/1995 |
| JP | 07277725 | 10/1995 |
| JP | 07277751 | 10/1995 |
| JP | H07-277751 | 10/1995 |
| JP | H08-081226 | 1/1996 |
| JP | H0840737 | 2/1996 |
| JP | 08100411 | 4/1996 |
| JP | H08-119664 | 5/1996 |
| JP | 08165131 | 6/1996 |
| JP | H08-143329 | 6/1996 |
| JP | 09012325 | 1/1997 |
| JP | H09-12325 | 1/1997 |
| JP | 0940434 | 2/1997 |
| JP | H09-40434 | 2/1997 |
| JP | H09-80005 | 3/1997 |
| JP | 09165214 | 6/1997 |
| JP | 10265259 | 10/1998 |
| JP | 10287416 | 10/1998 |
| JP | H11-1331 | 1/1999 |
| JP | 4014724 | 10/1999 |
| JP | 11302081 | 11/1999 |
| JP | 11310423 | 11/1999 |
| JP | 2000-290026 | 10/2000 |
| JP | 2001048571 | 2/2001 |
| JP | 2001072427 | 3/2001 |
| JP | 2001-089168 | 4/2001 |
| JP | 2001089125 | 4/2001 |
| JP | 2001155680 | 6/2001 |
| JP | 2001-220157 | 8/2001 |
| JP | 2001-220158 | 8/2001 |
| JP | 2001220126 | 8/2001 |
| JP | 4889141 | 4/2002 |
| JP | 2002114510 | 4/2002 |
| JP | 4371565 | 5/2002 |
| JP | 2002145633 | 5/2002 |
| JP | 2002291253 | 10/2002 |
| JP | 2003-112933 | 4/2003 |
| JP | 2003137571 | 5/2003 |
| JP | 2003-192331 | 7/2003 |
| JP | 2005008519 | 1/2005 |
| JP | 2005/067913 | 3/2005 |
| JP | 2005056692 | 3/2005 |
| JP | 2005-162535 | 6/2005 |
| JP | 2005145812 | 6/2005 |
| JP | 2005170706 | 6/2005 |

(56) References Cited

FOREIGN PATENT DOCUMENTS

| JP | 2006-335577 | 12/2006 |
|---|---|---|
| JP | 2007520408 | 7/2007 |
| JP | 2008063157 | 3/2008 |
| JP | 2009216373 | 9/2009 |
| JP | 5075703 | 10/2009 |
| JP | 2010018470 | 1/2010 |
| JP | 2010150096 | 7/2010 |
| JP | 2011132073 | 7/2011 |
| JP | 2011184210 | 9/2011 |
| JP | 2011207719 | 10/2011 |
| JP | 2012066947 | 4/2012 |
| JP | 2013-091812 | 5/2013 |
| JP | 2014088298 | 5/2014 |
| JP | 2014-201501 | 10/2014 |
| JP | 2015-518458 | 7/2015 |
| SU | S62 507 | 5/1979 |
| SU | 1675244 | 9/1991 |
| WO | 8803914 | 6/1988 |
| WO | 95/07269 | 3/1995 |
| WO | 99/02459 | 1/1999 |
| WO | 2004/092053 | 10/2004 |
| WO | 2006015763 | 2/2006 |
| WO | 2006021416 | 3/2006 |
| WO | 2006024440 | 3/2006 |
| WO | 2009071465 | 6/2009 |
| WO | 2010/150586 | 12/2010 |
| WO | 2011106221 | 9/2011 |
| WO | 2013/149882 | 10/2013 |
| WO | 2015/114956 | 3/2017 |
| WO | 2015/137340 | 4/2017 |

OTHER PUBLICATIONS

Office Action for U.S. Appl. No. 16/062,705 dated May 16, 2019 (9 pgs.) <128.101>.
Notice of Allowance dated Feb. 25, 2020 in U.S. Appl. No. 16/061,122.
Notice of Allowance dated Mar. 23, 2020 in U.S. Appl. No. 16/061,929.
Notice of Allowance dated Dec. 26, 2019 in U.S. Appl. No. 16/062,705.
Non-Final Office Action in U.S. Appl. No. 16/062,280 dated Sep. 9, 2020.
Non-Final Office Action in U.S. Appl. No. 16/061,185 dated Sep. 3, 2020.
Non-Final Office Action dated Oct. 29, 2019 in U.S. Appl. No. 16/061,122.
Shinetsu Quartz, "Intrinsic Optical Properties of Synthetic Fused Silica for 193 nm Immersion Lithography," (1 page). Oct. 2006.
Functionsbeschreibung, "Theory of Operation," (1 page) 2014.
McPherson Inc., "Vuvas 2000 Vacuum UV Analytical Spectrophotometer," (4 pages) Sep. 7, 2009.
Dodd and Fraser, "Optical Determinations of QH in Fused Silica," (1 page). Received May 25, 1966.
PMX 3000/ION, User's Manual, Microprocessor Controlled High Performance-pH-ion-meter (71 pgs) Mar. 20, 2003.
Goodfellow, Carbon Powder (1 pg.) Dec. 4, 2015.
Telecommunication Standardization Sector of ITU, "Series G: Transmission Systems And Media Digital Systems and Networks," Oct. 2012, (24 pages).
Agilent Technologies, "Agilent 7500 ICP-MS ChemStation (G1834B) Operator's Manual," 2005, (659 pages).
Agilent Technologies, "Agilent 7500 Series ICP-MS," 2008, (334 pages).
Din, "Modeme Rheologische Prufverfahren," Sep. 2012, (62 pages).
International Standard, "Particle Size Analysis—Laser Diffraction Methods," Oct. 2009, (60 pages).
Indian Standard, "Optical Fibres, Fibre Curl," 2006, (23 pages).
Indian Standard, "Optical Fibres, Attenuation," 2001, (29 pages).
International Standard, "Particle Size Analysis—Image Analysis Methods," May 2014, (32 pages).
International Standard, "Particle Size Analysis—Image Analysis Methods," Nov. 2006, (32 pages).
Wacker Polysilicon, "Product Specification," Aug. 2013, (3 pages).
Perkinelmer, "WinLab32 for ICP Instrument Control Software," 2010, (569 pages).
Shinetsu Quartz, "Intrinsic Optical Properties of Synthetic Fused Silica for 193 nm Immersion Lithography," (1 page).
Functionsbeschreibung, "Theory of Operation," (1 page).
McPherson Inc., "Vuvas 2000 Vacuum UV Analytical Spectrophotometer," (4 pages).
Dodd and Fraser, "Optical Determinations of QH in Fused Silica," (1 page).
Journal of Non-Crystalline Solids, "The UV-induced 210 nm absorption band in fused silica with different thermal history and stoichiometry," May 1992, (9 pages).
J. Appl. Phys. 51, "Reaction of Hydrogen with Hydroxyl-Free Vitreous Silica," Jan. 1980, (5 pages).
Institute of Solid State Physics, University of Latvia, "Color Centers and Their Transformations in Glassy SiO2," Jul. 10, 1998, (16 pages).
International Telecommunication Union, "Series G: Transmission Systems and Media, Digital Systems and Networks: Transmission media and optical systems charateristics—Optical Fibre cables," Oct. 2012, (24 pages).
R. Bruckner, "Silicon Dioxide," Encyclopedia of Applied Physics, vol. 18, 1997, (31 pages).
ASTM International, "Standard Test Method for Linear Thermal Expansion of Rigid Solids with Interferometry," 2016, (9 pages).
Photon Kinetics, "Optical Fiber Preform Analyzers from Photon Kinetics," Aug. 17, 2015, (1 page).
OM 100, Heraeus, Aug. 2013 (2 pgs).
PMX 3000/ION, User's Manual, Microprocessor Controlled High Performance-pH-ion-meter (71 pgs).
R 503/P R503/D, WTW, Operating Manual Aug. 2007 (21 pgs).
CI 500 DIN, CI 500 BNC, Operating Manual Mar. 2015 (52 pgs.).
F500 DIN, F500 BNC, Operating Manual Mar. 2015 (52 pgs.).
Goodfellow, Carbon Powder (1 pg.).
Karstensen, H. "Fabrication Techniques of Optical Fibres", Journal of Electronics and Telecom, Engrs., vol. 32, No. 4, Feb. 1986.
Non-Final Office Action dated Oct. 3, 2019 in U.S. Appl. No. 16/061,929.
Final Office Action dated Mar. 10, 2021 in U.S. Appl. No. 16/062,243.
Notice of Allowance dated Mar. 11, 2021 in U.S. Appl. No. 16/061,185.
Final Office Action dated Apr. 2, 2021 in U.S. Appl. No. 16/062,234.
Final Office Action dated Apr. 5, 2021 in U.S. Appl. No. 16/061,927.
Final Office Action dated Apr. 19, 2021 in U.S. Appl. No. 16/062,290.
Non-Final Office Action dated Apr. 30, 2021 in U.S. Appl. No. 16/062,387.
Non-Final Office Action dated May 3, 2021 in U.S. Appl. No. 16/061,451.
"A Review on the Angle of Repose of Granular Materials", Hamzah M. Beakawi Al-Hasheimi, et al., Department of Civil and Environmental Engineering, Feb. 2, 2018.
"Analytical Devices for the Measurement of Water Vapor and Hydrocarbon Dew-Point in Natural Gas", D.R. Potter, AMETEK Process Instruments, NGSTech 2011.
Non-Final Office Action dated Dec. 15, 2020 in U.S. Appl. No. 16/062,348 (131).
Non-Final Office Action dated Dec. 16, 2020 in U.S. Appl. No. 16/062,366 (132).
Final Office Action dated Feb. 1, 2021 in U.S. Appl. No. 16/062,280.
Non-Final Office Action dated Jan. 8, 2021 in U.S. Appl. No. 16/062,685 (127).
Non-Final Office Action dated Jan. 14, 2021 in U.S. Appl. No. 16/062,303 (129).
Non-Final Office Action dated Jan. 15, 2021 in U.S. Appl. No. 16/062,382 (125).
Non-Final Office Action dated Oct. 22, 2020 for U.S. Appl. No. 16/062,243 (121).
Non-Final Office Action dated Nov. 10, 2020 for U.S. Appl. No. 16/062,234 (120).

(56) References Cited

OTHER PUBLICATIONS

Non-Final Office Action dated Nov. 10, 2020 for U.S. Appl. No. 16/061,927 (130).
Non-Final Office Action dated Nov. 18, 2020 for U.S. Appl. No. 16/062,290 (124).
Non-Final Office Action dated Nov. 30, 2020 for U.S. Appl. No. 16/061,558 (117).
Pilachowski, Tim "111, Section 8.5 The Normal Distribution", Lecture Notes, Apr. 12, 2015, 8 pgs.
Notice of Allowance dated May 5, 2021 in U.S. Appl. No. 16/062,366 (132).
Non-Final Office Action dated May 5, 2021 in U.S. Appl. No. 16/062,280 (123).
Non-Final Office Action dated May 14, 2021 in U.S. Appl. No. 16/062,248 (122).
Final Office Action dated May 19, 2021 in U.S. Appl. No. 16/062,348 (131).
Final Office Action dated Jun. 1, 2021 in U.S. Appl. No. 16/062,382 (125).
Final Office Action dated Jun. 2, 2021 in U.S. Appl. No. 16/061,558 (117).
Zhang, et al. "Characterization of Spray Granulated Nd: YAG Particles for Transparent Ceramics", Received Feb. 2, 2015 (8 pgs).
Final Office Action dated Dec. 27, 2021 in U.S. Appl. No. 16/062,234.
Li, Gongyang, et al. "The Characteristic of Spray Drying", The Design of Common Chemical Unit Equipment, Second Edition, Aug. 31, 2009.
Non-Final Office Action dated Jul. 20, 2021 in U.S. Appl. No. 16/062,234.
Non-Final Office Action dated Jul. 20, 2021 in U.S. Appl. No. 16/061,927.
Advisory Action dated Jul. 23, 2021 in U.S. Appl. No. 16/062,348.
Non-Final Office Action dated Aug. 30, 2021 in U.S. Appl. No. 16/062,243.
Non-Final Office Action dated Sep. 27, 2021 in U.S. Appl. No. 16/062,348. (131).
Notice of Allowance dated Oct. 4, 2021 in U.S. Appl. No. 16/062,303.
Hongyong Xie, et al. "Powder Mechanics and Engineering", Chemical Industry Press, p. 186, Jul. 31, 2007.
Final Office Action dated Oct. 18, 2021 in U.S. Appl. No. 16/061,451. (116).
Final Office Action dated Oct. 20, 2021 in U.S. Appl. No. 16/062,387 (133).
Non-Final Office Action dated Oct. 21, 2021 in U.S. Appl. No. 16/061,558 (117).
Notice of Allowance dated Nov. 1, 2021 in U.S. Appl. No. 16/062,303. (129).
Non-Final Office Action dated Nov. 16, 2021 in U.S. Appl. No. 16/062,382. (125).
"How to Produce Glass Fiber Using an Indigenous Method", the first edition, Construction Engineering Bureau, Shaanzi People's Publishing House, Oct. 31, 1959.
Final Office Action dated Jun. 30, 2021 in U.S. Appl. No. 16/062,303 (129).

* cited by examiner

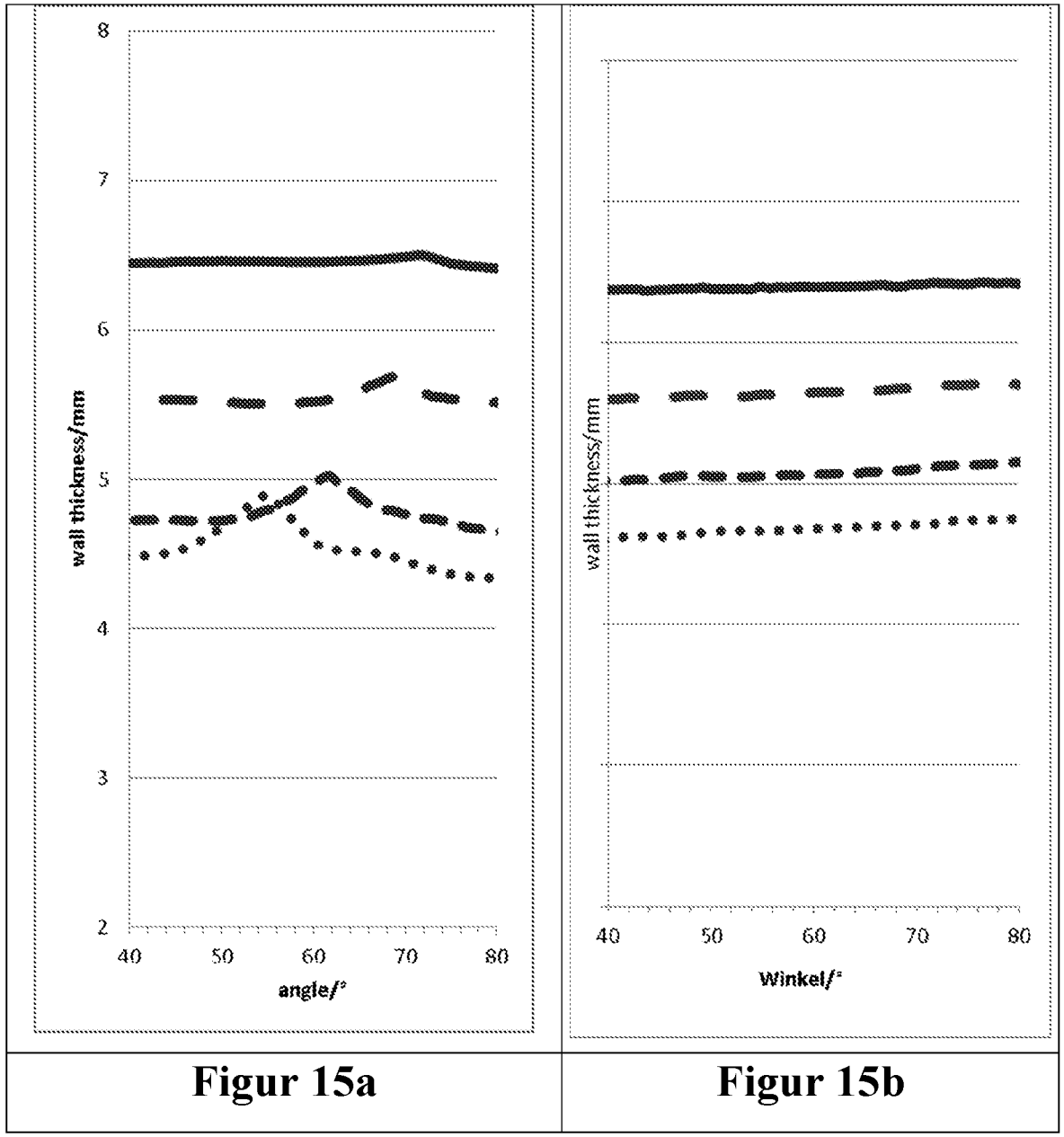
Figur 15a    Figur 15b

PREPARATION OF A QUARTZ GLASS BODY IN A MELTING CRUCIBLE OF REFRACTORY METAL

CROSS REFERENCE TO RELATED APPLICATION

This Utility Patent Application claims the benefit of the filing date of European Application No. 15201137.5, filed Dec. 18, 2015, and International Application No. PCT/EP2016/081438, filed Dec. 16, 2016, both of which are herein incorporated by reference.

The invention relates to a process for the preparation of a quartz glass body comprising the process steps i.) Providing a silicon dioxide granulate, ii.) Making a glass melt out of the silicon dioxide granulate in a melting crucible and iii) Making a quartz glass body out of at least a part of the glass melt, wherein the melting crucible is comprised in an oven and is made of at least one material comprising tungsten or molybdenum or a combination thereof. Furthermore, the invention relates to a quartz glass body obtainable by this process. Furthermore, the invention relates to a light guide, an illuminant, and a formed body, each of which is obtainable by further processing of the quartz glass body.

BACKGROUND OF THE INVENTION

Quartz glass, quartz glass products and products which contain quartz glass are known. Likewise, various processes for the preparation of quartz glass and quartz glass bodies are already known. Nonetheless, considerable efforts are still being made to identify preparation processes by which quartz glass of even higher purity, i.e. absence of impurities, can be prepared. In many areas of application of quartz glass and its processed products, high demands are made, for example in terms of homogeneity and purity. This is the case, inter aim, for quartz glass which is processed into light guides or illuminants Here, impurities can cause absorptions. That is disadvantageous, since it leads to colour changes and attenuation of the emitted light. A further example of an application of high purity quartz glass is production steps in the fabrication of semiconductors. Here, every impurity of the glass body can potentially lead to defects in the semiconductor and thus to rejects in the fabrication. The varieties of high purity, often synthetic, quartz glass which are employed in these processes, are laborious to prepare. These are valuable.

Furthermore, there is a market requirement for the above mentioned high purity synthetic quartz glass, and products derived therefrom at low price. Therefore, it is an aspiration to be able to offer high purity quartz glass at a lower price than before. In this connection, both more cost-efficient preparation processes as well as cheaper sources of raw materials are sought.

Known processes for the preparation of quartz glass bodies comprise melting silicon dioxide and making quartz glass bodies out of the melt. Irregularities in a glass body, for example through inclusion of gases in the form of bubbles, can lead to a failure of the glass body under load, in particular at high temperatures, or can preclude its use for a particular purpose. Impurities in the raw materials for the quartz glass can lead to cracks, bubbles, streaks and discoloration in the quartz glass. When employed in processes for the preparation and processing of semi-conductors, impurities in the glass body can also be released and transferred to the treated semi-conductor components. This is the case, for example, in etching processes and leads to rejects in the semi-conductor billets. A common problem associated with known preparation processes is therefore an inadequate quality of quartz glass bodies.

A further aspect relates to raw materials efficiency. It appears advantageous to input quartz glass and raw materials, which accumulate elsewhere as side products, into a preferably industrial process for quartz glass products, rather than employ these side products as filler, e.g. in construction or to dispose of them as rubbish at a cost. These side products are often separated off as fine dust in filters. The fine dust brings further problems, in particular in relation to health, work safety and handling.

Objects

An object of the present invention is to at least partially overcome one or more of the disadvantages present in the state of the art.

It is a further object of the invention to provide light guides, illuminants and components with a long lifetime. The term components in particular is to be understood to include devices which can be employed in reactors for chemical and/or physical treatment steps.

It is a further object of the invention to provide light guides, illuminants and glass components which are free of bubbles or have a low content of bubbles.

It is a further object of the invention to provide light guides and glass components which have a high transparency.

It is a further object of the invention to provide light guides, illuminants and components which have a low opacity.

It is a further object of the invention to provide light guides with a low attenuation.

It is a further object of the invention to provide light guides, illuminants and components which have a high contour accuracy. In particular, it is an object of the invention to provide light guides, illuminants and components which do not deform at high temperatures. In particular, it is an object of the invention to provide light guides, illuminants and components which are form stable, even when formed with large size.

It is a further object of the invention to provide light guides, illuminants and components which are tear-proof and break-proof.

It is a further object of the invention to provide light guides, illuminants and components which are efficient to prepare.

It is a further object of the invention to provide light guides, illuminants and components which are cost-efficient to prepare.

It is a further object of the invention to provide light guides, illuminants and components, the preparation of which does not require long further processing steps, for example tempering.

It is a further object of the invention to provide light guides, illuminants and components which have a high thermal shock resistance. It is in particular an object of the invention to provide light guides, illuminants and components which with large thermal fluctuations exhibit only little thermal expansion.

It is a further object of the invention to provide light guides, illuminants and components with a high hardness.

It is a further object of the invention to provide light guides, illuminants and components which have a high purity and low contamination with foreign atoms. The term foreign atoms is employed to mean constituents which are not purposefully introduced.

It is a further object of the invention to provide light guides, illuminants and components which contain a low content of dopant materials.

It is a further object of the invention to provide light guides, illuminants and components which have a high homogeneity. A homogeneity of a property or of a material is a measure of the uniformity of the distribution of this property or material in a sample.

It is in particular an object of the invention to provide light guides, illuminants and components which have a high material homogeneity. The material homogeneity is a measure of the uniformity of the distribution of the elements and compounds, in particularly of OH, chlorine, metals, in particular aluminium, alkali earth metals, refractory metals and dopant materials, contained in the light guide, illuminant or semi-conductor device.

It is a further object of the invention to provide an illuminant which has a high resistance to radiation.

It is a further object of the invention to provide an illuminant which is UV-resistant.

It is a further object of the invention to provide an illuminant which emits as little hard UV light as possible. Hard UV light means light with a wavelength of less than 280 nm.

It is a further object of the invention to provide a quartz glass body which is suitable for use in light guides, illuminants and quartz glass components and solves at least partly at least one, preferably several, of the above mentioned objects.

It is a further object of the invention to provide a quartz glass body which has a linear form. In particular, it is an object to provide a quartz glass body which has a high bending radius. In particular, it is a further object to provide a quartz glass body which has a high fibre curl.

It is a further object to provide a quartz glass body in which the migration of cations is as low as possible.

It is a further object to provide a quartz glass body which has a high homogeneity over the entire length of the quartz glass body.

In particular, it is a further object of the invention to provide a quartz glass body which has a high homogeneity of refractive index over the entire length of the quartz glass body.

In particular, it is a further object of the invention to provide a quartz glass body which has a high homogeneity of viscosity over the entire length of the quartz glass body.

In particular, it is a further object of the invention to provide a quartz glass body which has a high material homogeneity over the entire length of the quartz glass body.

In particular, it is a further object of the invention to provide a quartz glass body which has a high optical homogeneity over the entire length of the quartz glass body.

It is a further object of the invention to provide a quartz glass body which has a high OH content.

It is a further object of the invention to provide a quartz glass body with a low hardness.

It is a further object of the invention to provide a quartz glass body which has a low proportion of metallic impurities.

It is a particular object of the invention to provide a quartz glass body which has a low proportion of iron.

It is a particular object of the invention to provide a quartz glass body which has a low proportion of tungsten.

It is a particular object of the invention to provide a quartz glass body which has a low proportion of molybdenum.

It is a further object of the invention to provide a silicon dioxide granulate with a good handlability.

It is a further object of the invention to provide a silicon dioxide granulate which has a low content of fine dust.

It is a further object to provide a silicon dioxide granulate which can be easily stored, transported and conveyed.

It is a further object of the invention to provide a silicon dioxide granulate which can form bubble free quartz glass bodies. It is a further object of the invention to provide a silicon dioxide granulate which as a bulk material comprises as small a gas volume as possible.

It is a further object of the invention to provide an open-pored silicon dioxide granulate.

It is a further object of the invention to provide a process by which quartz glass bodies can be prepared by which at least part of the above described objects is at least partly solved.

It is a further object of the invention to provide a process by which quartz glass bodies can be more simply prepared.

It is a further object of the invention to provide a process by which quartz glass bodies can be prepared continuously.

It is a further object of the invention to provide a process by which quartz glass bodies can be prepared by a continuous melting and forming process.

It is a further object of the invention to provide a process by which quartz glass bodies can be formed with a high speed.

It is a further object of the invention to provide a process by which quartz glass bodies can be prepared with a low reject rate.

It is a further object of the invention to provide a process by which assemblable quartz glass bodies can be prepared.

It is a further object of the invention to provide an automated process by which quartz glass bodies can be prepared.

It is a further object of the invention to provide a process for the preparation of quartz glass bodies in which a silicon dioxide granulate can be processed in a melting oven without the requirement for it to be subjected beforehand to a deliberate compacting step, e.g. by a temperature treatment of more than 1000° C.

It is in particular an object of the invention to provide a process for the preparation of quartz glass bodies in which a silicon dioxide granulate with a BET of 20 m$^2$/g or more can be introduced into a melting oven, melted and processed to obtain a quartz glass body.

A further object is to improve the processability of quartz glass bodies further.

A further object is to improve the assemblability of quartz glass bodies further.

Preferred Embodiments of the Invention

A contribution to at least partially fulfilling at least one of the aforementioned objects is made by the independent claims. The dependent claims provide preferred embodiments which contribute to at least partially fulfilling at least one of the objects.

|1| A process for preparing a quartz glass body comprising pyrogenic silicon dioxide, comprising the following process steps:
  i.) Providing a silicon dioxide granulate comprising the following process steps:
    I. Providing a pyrogenic silicon dioxide powder,
    II. Processing the silicon dioxide powder to give a silicon dioxide granulate, wherein the silicon dioxide granulate has a larger particle diameter than the silicon dioxide powder, ii.) Making a glass melt from the silicon dioxide granulate;
iii.) Making a quartz glass body from at least a part of the glass melt;
wherein the melting crucible is comprised in an oven,
wherein the melting crucible is made of at least one material comprising tungsten or molybdenum or a combination thereof, and
wherein the quartz glass body has the following characteristics:
   A] an OH content of less than 500 ppm;
   B] a chlorine content of less than 60 ppm;
   C] a tungsten content of less than 1000 ppb;
   D] a molybdenum content of less than 1000 ppb;
wherein the ppb and ppm are based on the total weight of the quartz glass body in each case.

|2| The process according to embodiment |1|, wherein the oven has at least one gas inlet and one gas outlet, wherein a gas which is removed through gas outlet, on exiting the oven through the gas outlet, has a dew point of less than 0° C.

|3| The process according to one of the preceding embodiments, wherein the melting crucible does not have a coating selected from a material comprising rhenium, iridium, osmium or a combination thereof on the surface facing the glass melt

|4| The process according to one of the preceding embodiments, wherein the quartz glass body has at least one of the following characteristics:
   E] an aluminium content of less than 200 ppb;
   F] an ODC content of less than $5 \cdot 10^{15}/cm^3$;
   G] a metal content of metals which are different from aluminium of less than 1 ppm;
   H] a viscosity (p=1013 hPa) in a range from $\log_{10} (\eta (1250° C.)/dPas)=11.4$ to $\log_{10} (\eta (1250° C.)/dPas)=12.9$, or $\log_{10} (\eta (1300° C.)/dPas)=11.1$ to $\log_{10} (\eta (1300° C.)/dPas)=12.2$, or $\log_{10} (\eta (1350° C.)/dPas)=10.5$ to $\log_{10} (\eta (1350° C.)/dPas)=11.5$;
   I] a standard deviation of the OH content of not more than 10%, based on the OH content A] of the quartz glass body;
   J] a standard deviation of the Cl content of not more than 10%, based on the Cl content B] of the quartz glass body;
   K] a standard deviation of the Al content of not more than 10%, based on the Al content C] of the quartz glass body;
   L] a refractive index homogeneity of less than $1*10^{-4}$;
   M] a cylindrical form,
wherein the ppb and ppm are based on the total weight of the quartz glass body in each case.

|5| The process according to one of the preceding embodiments, wherein the silicon dioxide powder has at least one of the following features:
   a. a BET surface area in a range from 20 to 60 m/g,
   b. a bulk density in a range from 0.01 to 0.3 g/cm³;
   c. a carbon content of less than 50 ppm;
   d. a chlorine content of less than 200 ppm;
   e. an aluminium content of less than 200 ppb;
   f. a total content of metals which are different from aluminium of less than 5 ppm;
   g. at least 70 wt.-% of the powder particles have a primary particle size in a range from 10 to 100 nm;
   h. a tamped density in a range from 0.001 to 0.3 g/cm³;
   i. a residual moisture content of less than 5 wt.-%;
   j. a particle size distribution $D_{10}$ in a range from 1 to 7 μm;
   k. a particle size distribution $D_{50}$ in a range from 6 to 15 μm;
   l. a particle size distribution $D_{90}$ in a range from 10 to 40 μm;
wherein the wt.-%, ppm and ppb are based on the total weight of the silicon dioxide powder in each case.

|6| The process according to one of the preceding embodiments, wherein the silicon dioxide powder can be prepared from a compound selected from the group consisting of siloxanes, silicon alkoxides and silicon halides.

|7| The process according to one of the preceding embodiments, comprising the following process steps:
   iv.) Making a hollow body with at least one opening from the quartz glass body.

|8| A quartz glass body obtainable by a process according to one of the embodiments |1| to |6|.

|9| A quartz glass body obtainable from pyrogenic silicon dioxide, wherein the quartz glass body has the following characteristics:
   A] an OH content of less than 500 ppm;
   B] a chlorine content of less than 60 ppm;
   C] a tungsten content of less than 1000 ppb;
   D] a molybdenum content of less than 1000 ppb;
wherein the ppb and ppm are based on the total weight of the quartz glass body in each case.

|10| The quartz glass body according to embodiment |8| or embodiment |9|, wherein the quartz glass body has at least one of the following features:
   E] an aluminium content of less than 200 ppb;
   F] an ODC content of less than $510^{15}/cm^3$;
   G] metal content of metals which are different from aluminium of less than 1 ppm;
   H] a viscosity (p=1013 hPa) in a range from $\log_{10} (\eta (1250° C.)/dPas)=11.4$ to $\log_{10} (\eta (1250° C.)/dPas)=12.9$, and/or $\log_{10} (\eta (1300° C.)/dPas)=11.1$ to $\log_{10} (\eta (1300° C.)/dPas)=12.2$, and/or $\log_{10} (\eta (1350° C.)/dPas)=10.5$ to $\log_{10} (\eta (1350° C.)/dPas)=11.5$;
   I] a standard deviation of the OH content of not more than 10%, preferably not more than 5%, based on the OH content A] of the quartz glass body;
   J] a standard deviation of the Cl content of not more than 10%, preferably not more than 5%, based on the Cl content B] of the quartz glass body;
   K] a standard deviation of the Al content of not more than 10%, preferably not more than 5%, based on the Al content C] of the quartz glass body;
   L] a refractive index homogeneity of less than $1*10^{-4}$;
   M] a cylindrical form,
wherein the ppm and ppb are based on the total weight of the quartz glass body in each case.

|11| A process for preparing a light guide, comprising the following steps:
   A/ Providing
      A1/ a hollow body with at least one opening obtainable by a process according to embodiment |7|; or
      A2/ a quartz glass body according to one of embodiments |8| to |10|, wherein the quartz glass body is first processed to give a hollow body with at least one opening;
   B/ Introducing one or more core rods into the quartz glass body through the at least one opening to obtain a precursor,
   C/ Drawing the precursor from step B/ in the warm to obtain a light guide with one or more cores and a jacket M1.

|12| A light guide obtainable by a process according to embodiment |11|.

|13| A process for preparing a light guide, comprising the following steps:
(i) Providing
(i-1) a hollow body obtainable by a process according to embodiment |7|; or
(i-2) a quartz glass body according to one of embodiments |8| to |10|, wherein the quartz glass body is first processed to give a hollow body;
(ii) Fitting the hollow body with electrodes (optional);
(iii) Filling the hollow body from step (i) with a gas.

|14| An illuminant obtainable by a process according to embodiment |13|.

|15| A process for preparing a formed body comprising the following steps
(1) Providing a quartz glass body according to one of embodiments |8| to |10|;
(2) Forming a formed body from the quartz glass body.

|16| A formed body obtainable by the process according to embodiment |15|.

|17| A use of a melting crucible made of at least one material comprising tungsten or molybdenum or a combination thereof for preparing low-molybdenum or low-tungsten quartz glass bodies.

|18| A process for configuring the dew point at the outlet of an oven comprising:
I) Providing a starting material in an oven, wherein the starting material has a residual moisture;
II) Operating the oven, wherein a gas flow is lead through the oven, and
III) Varying the residual moisture of the starting material, or the gas replacement rate of the gas flow.

|19| The process for configuring the dew point at the outlet of an oven according to embodiment |18|, wherein the process is characterised by at least one of the following features:
I} a residual moisture of the starting material in a range from 0.001 to 5 Gew.-%, for example from 0.01 to 1 wt.-%, particularly preferably from 0.03 to 0.5 wt.-%, in each case based on the total weight of the starting material;
II) a gas replacement rate of the gas flow in a range from 200 to 3000 L/h, for example from 200 to 2000 L/h, particularly preferably from 200 to 1000 L/h
III) an oven temperature in a range from 1700 to 2500° C., for example in a range from 1900 to 2400° C., particularly preferably in a range from 2100 to 2300° C.;
IV} a dew point of the gas flow on entry into the oven in a range from −50° C. to −100° C., for example from −60° C. to −100° C., particularly preferably from −70° C. to −100° C.;
V} the gas flow comprises helium, hydrogen or a combination thereof, preferably helium and hydrogen in a ratio from 20:80 to 95:5;
VI} a temperature of the gas at the outlet in a range from 10 to 60° C., for example from 20 to 5° C., particularly preferably from 20 to 30° C.

General

In the present description, disclosed ranges also include the boundary values. A disclosure of the form "in the range from X to Y" in relation to a parameter A therefore means that A can take the values X, Y and values in between X and Y. Ranges bounded on one side of the form "up to Y" for a parameter A mean correspondingly the value Y and those less than Y.

DETAILED DESCRIPTION OF THE INVENTION

A first aspect of the present invention is a process for preparing a quartz glass body comprising pyrogenic silicon dioxide comprising the following process steps:
i.) Providing a silicon dioxide granulate comprising the following process steps:
I. Providing a pyrogenic silicon dioxide powder,
II. Processing the silicon dioxide powder to give a silicon dioxide granulate,
wherein the silicon dioxide granulate has a larger particle diameter than the silicon dioxide powder,
ii.) Making a glass melt from the silicon dioxide granulate;
iii.) Making a quartz glass body from at least a part of the glass melt;
wherein the melting crucible is comprised in an oven,
wherein the melting crucible is made of at least one material comprising tungsten or molybdenum or a combination thereof, and
wherein the quartz glass body has the following characteristics:
A] an OH content of less than 500 ppm;
B] a chlorine content of less than 60 ppm;
C] a tungsten content of less than 1000 ppb, for example of less than 500 ppb or of less than 300 ppb or of less than 100 ppb or in a range from 1 to 500 ppb or from 1 to 300 ppb, particularly preferably in a range from 1 to 100 ppb;
D] a molybdenum content of less than 1000 ppb, for example of less than 500 ppb or of less than 300 ppb or of less than 100 ppb or in a range from 1 to 500 ppb or from 1 to 300 ppb, particularly preferably in a range from 1 to 100 ppb;
wherein the ppb and ppm are each based on the total weight of the quartz glass body in each case.

Preferably, the oven has at least one gas inlet and one gas outlet, wherein a gas which is removed through the gas outlet, on exiting the oven through the gas outlet, has a dew point of less than 0° C.

Step i.)

According to the invention, the provision of the silicon dioxide granulate comprises the following process steps:
I. Providing a pyrogenic silicon dioxide powder, and
II. Processing the silicon dioxide powder to obtain a silicon dioxide granulate, wherein the silicon dioxide granulate has a greater particle diameter than the silicon dioxide powder.

A powder means particles of a dry solid material with a primary particle size in the range from 1 to less than 100 nm.

The silicon dioxide granulate can be obtained by granulating silicon dioxide powder. A silicon dioxide granulate commonly has a BET surface area of 3 m²/g or more and a density of less than 1.5 g/cm³. Granulating means transforming powder particles into granules. During granulation, clusters of multiple silicon dioxide powder particles, i.e. larger agglomerates, form which are referred to as "silicon dioxide granules". These are often also called "silicon dioxide granulate particles" or "granulate particles". Collectively, the granules form a granulate, e.g. the silicon dioxide granules form a "silicon dioxide granulate". The silicon dioxide granulate has a larger particle diameter than the silicon dioxide powder.

The granulation procedure, for transforming a powder into a granulate, will be described in more detail later.

Silicon dioxide grain in the present context means silicon dioxide particles which are obtainable by reduction in size of a silicon dioxide body, in particular of a quartz glass body. A silicon dioxide grain commonly has a density of more than 1.2 g/cm³, for example in a range from 1.2 to 2.2 g/cm³, and particularly preferably of about 2.2 g/cm³. Furthermore, the BET surface area of a silicon dioxide grain is preferably generally less than 1 m²/g, determined according to DIN ISO 9277:2014-01.

In principle, all silicon dioxide particles which are considered to be suitable by the skilled man can be selected.

Preferred are silicon dioxide granulate and silicon dioxide grain.

Particle diameter or particle size mean the diameter of a particle, given as the "area equivalent circular diameter $x_{Ai}$" according to the formula $$x_{Ai} = \sqrt{\frac{4A_i}{\pi}},$$

wherein Ai stands for the surface area of the observed particle by means of image analysis. Suitable methods for the measurement are for example ISO 13322-1:2014 or ISO 13322-2:2009. Comparative disclosures such as "greater particle diameter" always means that the values being compared are measured with the same method.

Silicon Dioxide Powder

In the context of the present invention, according to the invention, synthetic silicon dioxide powder is used, namely pyrogenicly prepared silicon dioxide powder The silicon dioxide powder can be any silicon dioxide powder which has at least two particles. As preparation process, any process which the skilled man considers to be prevalent in the art and suitable can be used.

According to a preferred embodiment of the present invention, the silicon dioxide powder is produced as side product in the preparation of quartz glass, in particular in the preparation of so called "soot bodies". Silicon dioxide from such a source is often also called "soot dust".

A preferred source for the silicon dioxide powder are silicon dioxide particles which are obtained from the synthetic preparation of soot bodies by application of flame hydrolysis burners. In the preparation of a soot body, a rotating carrier tube with a cylinder jacket surface is moved back and forth along a row of burners. Flame hydrolysis burners can be fed with oxygen and hydrogen as burner gases as well as the raw materials for making silicon dioxide primary particles. The silicon dioxide primary particles preferably have a primary particle size of up to 100 nm. The silicon dioxide primary particles produced by flame hydrolysis aggregate or agglomerate to form silicon dioxide particles with particle sizes of about 9 μm (DIN ISO 13320:2009-1). In the silicon dioxide particles, the silicon dioxide primary particles are identifiable by their form by scanning electron microscopy and the primary particle size can be measured. A portion of the silicon dioxide particles are deposited on the cylinder jacket surface of the carrier tube which is rotating about its longitudinal axis. In this way, the soot body is built up layer by layer. Another portion of the silicon dioxide particles are not deposited on the cylinder jacket surface of the carrier tube, rather they accumulate as dust, e.g. in a filter system. This other portion of silicon dioxide particles make up the silicon dioxide powder, often also called "soot dust". In general, the portion of the silicon dioxide particles which are deposited on the carrier tube is greater than the portion of silicon dioxide particles which accumulate as soot dust in the context of soot body preparation, based on the total weight of the silicon dioxide particles.

These days, soot dust is generally disposed of as waste in an onerous and costly manner, or used as filler material without adding value, e.g. in road construction, as additive in the dyes industry, as a raw material for the tiling industry and for the preparation of hexafluorosilicic acid, which is employed for restoration of construction foundations. In the case of the present invention, it is a suitable raw material and can be processed to obtain a high-quality product.

Silicon dioxide prepared by flame hydrolysis is normally called pyrogenic silicon dioxide. Pyrogenic silicon dioxide is normally available in the form of amorphous silicon dioxide primary particles or silicon dioxide particles.

According to a preferred embodiment, the silicon dioxide powder can be prepared by flame hydrolysis out of a gas mixture. In this case, silicon dioxide particles are also created in the flame hydrolysis and are taken away before agglomerates or aggregates form. Here, the silicon dioxide powder, previously referred to as soot dust, is the main product.

Suitable raw materials for creating the silicon dioxide powder are preferably siloxanes, silicon alkoxides and inorganic silicon compounds. Siloxanes means linear and cyclic polyalkylsiloxanes. Preferably, polyalkylsiloxanes have the general formula $Si_pO_pR_{2p}$, wherein p is an integer of at least 2, preferably from 2 to 10, particularly preferably from 3 to 5, and R is an alkyl group with 1 to 8 C-atoms, preferably with 1 to 4 C-atoms, particularly preferably a methyl group.

Particularly preferred are siloxanes selected from the group consisting of hexamethyldisiloxane, hexamethylcyclotrisiloxane (D3), octamethylcyclotetrasiloxane (D4) and decamethylcyclopentasiloxane (D5) or a combination of two or more thereof. If the siloxane comprises D3, D4 and D5, then D4 is preferably the main component. The main component is preferably present in an amount of at least 70 wt.-%, preferably of at least 80 wt.-%, for example of at least 90 wt.-% or of at least 94 wt.-%, particularly preferably of at least 98 wt.-%, in each case based on the total amount of the silicon dioxide powder. Preferred silicon alkoxides are tetramethoxysilane and methyltrimethoxysilane. Preferred inorganic silicon compounds as raw material for silicon dioxide powder are silicon halides, silicates, silicon carbide and silicon nitride. Particularly preferred inorganic silicon compounds as raw material for silicon dioxide powder are silicon tetrachloride and trichlorosilane.

According to a preferred embodiment, the silicon dioxide powder can be prepared from a compound selected from the group consisting of siloxanes, silicon alkoxides and silicon halides.

Preferably, the silicon dioxide powder can be prepared from a compound selected from the group consisting of hexamethyldisiloxane, hexamethylcyclotrisiloxane, octamethylcyclotetrasiloxane, decamethylcyclopentasiloxane, tetramethoxysilane, methyltrimethoxysilane, silicon tetrachloride and trichlorosilane or a combination of two or more thereof, for example out of silicon tetrachloride and octamethylcyclotetrasiloxane, particularly preferably out of octamethylcyclotetrasiloxane.

For making silicon dioxide out of silicon tetrachloride by flame hydrolysis, various parameters are significant. A preferred composition of a suitable gas mixture comprises an oxygen content in the flame hydrolysis in a range from 25 to 40 vol.-%. The content of hydrogen can be in a range from 45 to 60 vol.-%. The content of silicon tetrachloride is preferably 5 to 30 vol.-%, all of the afore mentioned vol.-% being based on the total volume of the gas flow. Further preferred is a combination of the above mentioned volume proportions for oxygen, hydrogen and $SiCl_4$. The flame in the flame hydrolysis preferably has a temperature in a range from 1500 to 2500° C., for example in a range from 1600 to 2400° C., particularly preferably in a range from 1700 to 2300° C. Preferably, the silicon dioxide primary particles created in the flame hydrolysis are taken away as silicon dioxide powder before agglomerates or aggregates form.

According to a preferred embodiment of the first aspect of the invention, the silicon dioxide powder has one, for example at least two or at least three or at least four, particularly preferably at least five of the following features:

a. a BET surface area in a range from 20 to 60 m²/g, for example from 25 to 55 m²/g, or from 30 to 50 m²/g, particularly preferably from 20 to 40 m²/g,
b. a bulk density 0.01 to 0.3 g/cm³, for example in the range from 0.02 to 0.2 g/cm³, preferably in the range from 0.03 to 0.15 g/cm³, further preferably in the range from 0.1 to 0.2 g/cm³ or in the range from 0.05 to 0.1 g/cm³.
c. a carbon content of less than 50 ppm, for example of less than 40 ppm or of less than 30 ppm, particularly preferably in a range from 1 ppb to 20 ppm;
d. a chlorine content of less than 200 ppm, for example of less than 150 ppm or of less than 100 ppm, particularly preferably in a range from 1 ppb to 80 ppm;
e. an aluminium content of less than 200 ppb, for example in the range from 1 to 100 ppb, particularly preferably in the range from 1 to 80 ppb;
f. a total content of metals different to aluminium of less than 5 ppm, for example of less than 2 ppm, particularly preferably in a range from 1 ppb to 1 ppm;
g. at least 70 wt.-% of the powder particles have a primary particle size in a range from 10 to less than 100 nm, for example in the range from 15 to less than 100 nm, particularly preferably in the range from 20 to less than 100 nm
h. a tamped density in a range from 0.001 to 0.3 g/cm³, for example in the range from 0.002 to 0.2 g/cm³ or from 0.005 to 0.1 g/cm³, preferably in the range from 0.01 to 0.06 g/cm³, and preferably in the range from 0.1 to 0.2 g/cm³, or in the range of from 0.15 to 0.2 g/cm³;
i. a residual moisture content of less than 5 wt.-%, for example in the range from 0.25 to 3 wt.-%, particularly preferably in the range from 0.5 to 2 wt.-%;
j. a particle size distribution $D_{10}$ in the range from 1 to 7 µm, for example in the range from 2 to 6 µm or in the range from 3 to 5 µm, particularly preferably in the range from 3.5 to 4.5 µm;
k. a particle size distribution $D_{50}$ in the range from 6 to 15 µm, for example in the range from 7 to 13 µm or in the range from 8 to 11 µm, particularly preferably in the range from 8.5 to 10.5 µm;
l. a particle size distribution $D_{90}$ in the range from 10 to 40 µm, for example in the range from 15 to 35 µm, particularly preferably in the range from 20 to 30 µm;

wherein the wt.-%, ppm and ppb are each based on the total weight of the silicon dioxide powder.

The silicon dioxide powder contains silicon dioxide. Preferably, the silicon dioxide powder contains a proportion of silicon dioxide of more than 95 wt.-%, for example more than 98 wt.-% or more than 99 wt.-%, or more than 99.9 wt.-%, in each case based on the total weight of the silicon dioxide powder. Particularly preferably, the silicon dioxide powder contains a proportion of silicon dioxide of more than 99.99 wt.-%, based on the total weight of the silicon dioxide powder.

Preferably, the silicon dioxide powder has a metal content of metals different from aluminium of less than 5 ppm, for example of less than 2 ppm, particularly preferably of less than 1 ppm, in each case based on the total weight of the silicon dioxide powder. Often however, the silicon dioxide powder has a content of metals different to aluminium of at least 1 ppb. Such metals are for example sodium, lithium, potassium, magnesium, calcium, strontium, germanium, copper, molybdenum, tungsten, titanium, iron and chromium. These can be present for example in elemental form, as an ion, or as part of a molecule or of an ion or of a complex.

Preferably, the silicon dioxide powder has a total content of further constituents of less than 30 ppm, for example of less than 20 ppm, particularly preferably of less than 15 ppm, the ppm in each case being based on the total weight of the silicon dioxide powder. Often however, the silicon dioxide powder has a content of further constituents of at least 1 ppb. Further constituents means all constituents of the silicon dioxide powder which do not belong to the following group: silicon dioxide, chlorine, aluminium, OH-groups.

In the present context, reference to a constituent, when the constituent is a chemical element, means that it can be present as element or as an ion or in a compound or a salt. For example, the term "aluminium" includes in addition to metallic aluminium, also aluminium salts, aluminium oxides and aluminium metal complexes. For example, the term "chlorine" includes, in addition to elemental chlorine, chlorides such as sodium chloride and hydrogen chloride. Often, the further constituents are present in the same aggregate state as the material in which they are contained.

In the present context, in the case where a constituent is a chemical compound or a functional group, reference to the constituent means that the constituent can be present in the form disclosed, as a charged chemical compound or as derivative of the chemical compound. For example, reference to the chemical material ethanol includes, in addition to ethanol, also ethanolate, for example sodium ethanolate. Reference to "OH-group" also includes silanol, water and metal hydroxides. For example, reference to derivate in the context of acetic acid also includes acetic acid ester and acetic acid anhydride.

Preferably, at least 70% of the powder particles of the silicon dioxide powder, based on the number of powder particles, have a primary particle size of less than 100 nm, for example in the range from 10 to 100 nm or from 15 to 100 nm, and particularly preferably in the range from 20 to 100 nm. The primary particle size is measured by dynamic light scattering according to ISO 13320:2009-10.

Preferably at least 75% of the powder particles of the silicon dioxide powder, based on the number of powder particles, have a primary particle size of less than 100 nm, for example in the range from 10 to 100 nm or from 15 to 100 nm, and particularly preferably in the range from 20 to 100 nm.

Preferably, at least 80% of the powder particles of the silicon dioxide powder, based on the number of powder particles, have a primary particle size of less than 100 nm, for example in the range from 10 to 100 nm or from 15 to 100 nm, and particularly preferably in the range from 20 to 100 nm.

Preferably, at least 85% of the powder particles of the silicon dioxide powder, based on the number of powder particles, have a primary particle size of less than 100 nm, for example in the range from 10 to 100 nm or from 15 to 100 nm, and particularly preferably in the range from 20 to 100 nm.

Preferably, at least 90% of the powder particles of the silicon dioxide powder, based on the number of powder particles, have a primary particle size of less than 100 nm, for example in the range from 10 to 100 nm or from 15 to 100 nm, and particularly preferably in the range from 20 to 100 nm.

Preferably, at least 95% of the powder particles of the silicon dioxide powder, based on the number of powder particles, have a primary particle size of less than 100 nm, for example in the range from 10 to 100 nm or from 15 to 100 nm, and particularly preferably in the range from 20 to 100 nm.

Preferably, the silicon dioxide powder has a particle size $D_{10}$ in the range from 1 to 7 μm, for example in the range from 2 to 6 μm or in the range from 3 to 5 μm, particularly preferably in the range from 3.5 to 4.5 μm. Preferably, the silicon dioxide powder has a particle size $D_{50}$ in the range from 6 to 15 μm, for example in the range from 7 to 13 m or in the range from 8 to 11 μm, particularly preferably in the range from 8.5 to 10.5 μm. Preferably, the silicon dioxide powder has a particle size $D_{90}$ in the range from 10 to 40 μm, for example in the range from 15 to 35 μm, particularly preferably in the range from 20 to 30 μm.

Preferably, the silicon dioxide powder has a specific surface area (BET-surface area) in a range from 20 to 60 $m^2/g$, for example from 25 to 55 $m^2/g$, or from 30 to 50 m/g, particularly preferably from 20 to 40 $m^2/g$. The BET surface area is determined according to the method of Bnurauer, Emmet and Teller (BET) by means of DIN 66132 which is based on gas absorption at the surface to be measured.

Preferably, the silicon dioxide powder has a pH value of less than 7, for example in the range from 3 to 6.5 or from 3.5 to 6 or from 4 to 5.5, particularly preferably in the range from 4.5 to 5. The pH value can be determined by means of a single rod measuring electrode (4% silicon dioxide powder in water).

The silicon dioxide powder preferably has the feature combination a./b./c. or a./b./f. or a./b./g., further preferred the feature combination a./b./c./f. or a/b./c./g. or a./b./f./g., further preferably the feature combination a./b./c./f./g.

The silicon dioxide powder preferably has the feature combination a./b./c., wherein the BET surface area is in a range from 20 to 40 $m^2/g$, the bulk density is in a range from 0.05 to 0.3 g/mL and the carbon content is less than 40 ppm.

The silicon dioxide powder preferably has the feature combination a./b./f., wherein the BET surface area is in a range from 20 to 40 $m^2/g$, the bulk density is in a range from 0.05 to 0.3 g/mL and the total content of metals which are different to aluminium is in a range from 1 ppb to 1 ppm.

The silicon dioxide powder preferably has the feature combination a./b./g., wherein the BET surface area is in a range from 20 to 40 $m^2/g$, the bulk density is in a range from 0.05 to 0.3 g/mL and at least 70 wt. % of the powder particles have a primary particle size in a range from 20 to less than 100 nm.

The silicon dioxide powder further preferably has the feature combination a./b./c./f., wherein the BET surface area is in a range from 20 to 40 $m^2/g$, the bulk density is in a range from 0.05 to 0.3 g/mL, the carbon content is less than 40 ppm and the total content of metals which are different to aluminium is in a range from 1 ppb to 1 ppm.

The silicon dioxide powder further preferably has the feature combination a./b./c./g., wherein the BET surface area is in a range from 20 to 40 $m^2/g$, the bulk density is in a range from 0.05 to 0.3 g/mL, the carbon content is less than 40 ppm and at least 70 wt. % of the powder particles have a primary particle size in a range from 20 to less than 100 nm.

The silicon dioxide powder further preferably has the feature combination a./b./f./g., wherein the BET surface area is in a range from 20 to 40 $m^2/g$, the bulk density is in a range from 0.05 to 0.3 g/mL, the total content of metals which are different to aluminium is in a range from 1 ppb to 1 ppm and at least 70 wt. % of the powder particles have a primary particle size in a range from 20 to less than 100 nm.

The silicon dioxide powder has particularly preferably the feature combination a./b./c./f./g., wherein the BET surface area is in a range from 20 to 40 $m^2/g$, the bulk density is in a range from 0.05 to 0.3 g/mL, the carbon content is less than 40 ppm, the total content of metals which are different to aluminium is in a range from 1 ppb to 1 ppm and at least 70 wt. % of the powder particles have a primary particle size in a range from 20 to less than 100 nm.

Step II.

According to the invention, silicon dioxide powder is processed in step II to obtain a silicon dioxide granulate, wherein the silicon dioxide granulate has a greater particle diameter than the silicon dioxide powder. For this purpose, any processes known to the skilled man that lead to an increase in the particle diameter are suitable.

The silicon dioxide granulate has a particle diameter which is greater than the particle diameter of the silicon dioxide powder. Preferably, the particle diameter of the silicon dioxide granulate is in a range from 500 to 50,000 times as great as the particle diameter of the silicon dioxide powder, for example 1,000 to 10,000 times as great, particularly preferably 2,000 to 8,000 times as great.

Preferably, at least 90% of the silicon dioxide granulate provided in step i.) is made up of pyrogenically produced silicon dioxide powder, for example at least 95 wt.-% or at least 98 wt.-%, particularly preferably at least 99 wt. % or more, in each case based on the total weight of the silicon dioxide granulate.

According to a preferred embodiment of the first aspect of the invention, the silicon dioxide granulate employed has at least one, preferably at least two or at least three or at least four, particularly preferably all of the following features:
A) a BET surface area in the range from 20 $m^2/g$ to 50 $m^2/g$; and
B) a mean particle size in a range from 50 to 500 μm.
C) a bulk density in a range from 0.5 to 1.2 $g/cm^3$, for example in a range from 0.6 to 1.1 $g/cm^3$, particularly preferably in a range from 0.7 to 1.0 $g/cm^3$;
D) a carbon content of less than 50 ppm;
E) an aluminium content of less than 200 ppb;
F) a tamped density in a range from 0.7 to 1.2 $g/cm^3$;
G) a pore volume in a range from 0.1 to 2.5 mL/g, for example in a range from 0.15 to 1.5 mL/g; particularly preferably in a range from 0.2 to 0.8 mL/g,
H) an angle of repose in a range from 23 to 26°;
I) a particle size distribution $D_{10}$ in a range from 50 to 150 μm;
J) a particle size distribution $D_{50}$ in a range from 150 to 300 μm;
K) a particle size distribution $D_{90}$ in a range from 250 to 620 μm,
wherein the ppm and ppb are each based on the total weight of the silicon dioxide granulate.

Preferably, the granules of the silicon dioxide granulate have a spherical morphology. Spherical morphology means a round or oval form of the particle. The granules of the silicon dioxide granulate preferably have a mean sphericity in a range from 0.7 to 1.3 SPHT3, for example a mean sphericity in a range from 0.8 to 1.2 SPHT3, particularly preferably a mean sphericity in a range from 0.85 to 1.1 SPHT3. The feature SPHT3 is described in the test methods.

Furthermore, the granules of the silicon dioxide granulate preferably have a mean symmetry in a range from 0.7 to 1.3 Symm3, for example a mean symmetry in a range from 0.8 to 1.2 Symm3, particularly preferably a mean symmetry in a range from 0.85 to 1.1 Symm3. The feature of the mean symmetry Symm3 is described in the test methods.

Preferably, the silicon dioxide granulate has a metal content of metals different to aluminium of less than 1000 ppb, for example of less than 500 ppb, particularly preferably of less than 100 ppb, in each case based on the total weight of the silicon dioxide granulate. Often however, the silicon dioxide granulate has a content of metals different to aluminium of at least 1 ppb. Often, the silicon dioxide granulate has a metal content of metals different to aluminium of less than 1 ppm, preferably in a range from 40 to 900 ppb, for example in a range from 50 to 700 ppb, particularly preferably in a range from 60 to 500 ppb, in each case based on the total weight of the silicon dioxide granulate. Such metals are for example sodium, lithium, potassium, magnesium, calcium, strontium, germanium, copper, molybdenum, titanium, iron and chromium. These can for example be present as an element, as an ion, or as part of a molecule or of an ion or of a complex.

The silicon dioxide granulate can comprise further constituents, for example in the form of molecules, ions or elements. Preferably, the silicon dioxide granulate comprises less than 500 ppm of further constituents, for example less than 300 ppm, particularly preferably less than 100 ppm, in each case based on the total weight of the silicon dioxide granulate. Often, at least 1 ppb of further constituents are comprised. The further constituents can in particular be selected from the group consisting of carbon, fluoride, iodide, bromide, phosphorus or a mixture of at least two thereof.

Preferably, the silicon dioxide granulate comprises less than 10 ppm carbon, for example less than 8 ppm or less than 5 ppm, particularly preferably less than 4 ppm, in each case based on the total weight of the silicon dioxide granulate. Often, at least 1 ppb of carbon is comprised in the silicon dioxide granulate.

Preferably, the silicon dioxide granulate comprises less than 100 ppm of further constituents, for example less than 80 ppm, particularly preferably less than 70 ppm, in each case based on the total weight of the silicon dioxide granulate. Often however, at least 1 ppb of the further constituents are comprised in the silicon dioxide granulate.

Preferably, step II. comprises the following steps:
II.1. Providing a liquid;
II.2. Mixing the silicon dioxide powder with the liquid to obtain a slurry;
II.3. Granulating the slurry.

In the context of the present invention, a liquid means a material or a mixture of materials which is liquid at a pressure of 1013 hPa and a temperature of 20° C.

A "slurry" in the context of the present invention means a mixture of at least two materials, wherein the mixture, considered under the prevailing conditions, comprises at least one liquid and at least one solid.

Suitable liquids are all materials and mixtures of materials known to the skilled man and which appear suitable for the present application. Preferably, the liquid is selected from the group consisting of organic liquids and water.

Preferably, the solubility of the silicon dioxide powder in the liquid is less than 0.5 g/L, preferably less than 0.25 g/L, particularly preferably less than 0.1 g/L, the g/L each given as g silicon dioxide powder per litre liquid.

Preferred suitable liquids are polar solvents. These can be organic liquids or water. Preferably, the liquid is selected from the group consisting of water, methanol, ethanol, n-propanol, iso-propanol, n-butanol, tert-butanol and mixtures of a more than one thereof. Particularly preferably, the liquid is water. Particularly preferably, the liquid comprises distilled or de-ionized water.

Preferably, the silicon dioxide powder is processed to obtain a slurry. The silicon dioxide powder is virtually insoluble in the liquid at room temperature, but can be introduced into the liquid in high weight proportions to obtain the slurry.

The silicon dioxide powder and the liquid can be mixed in any manner. For example, the silicon dioxide powder can be added to the liquid, or the liquid can be added to the silicon dioxide powder. The mixture can be agitated during the addition or following the addition. Particularly preferably, the mixture is agitated during and following the addition. Examples for the agitation are shaking and stirring, or a combination of both. Preferably, the silicon dioxide powder can be added to the liquid under stirring. Furthermore, preferably, a portion of the silicon dioxide powder can be added to the liquid, wherein the mixture thus obtained is agitated, and the mixture is subsequently mixed with the remaining portion of the silicon dioxide powder. Likewise, a portion of the liquid can be added to the silicon dioxide powder, wherein the mixture thus obtained is agitated, and the mixture subsequently mixed with the remaining portion of the liquid.

By mixing the silicon dioxide powder and the liquid, a slurry is obtained. Preferably, the slurry is a suspension in which the silicon dioxide powder is distributed uniformly in the liquid. "Uniform" means that the density and the composition of the slurry at each position does not deviate from the average density and from the average composition by more than 10%, in each case based on the total amount of slurry. A uniform distribution of the silicon dioxide powder in the liquid can prepared, or obtained, or both, by an agitation as mentioned above.

Preferably, the slurry has a weight per litre in the range from 1000 to 2000 g/L, for example in the range from 1200 to 1900 g/L or from 1300 to 1800 g/L, particularly preferably in the range from 1400 to 1700 g/L. The weight per litre is measured by weighing a volume calibrated container.

According to a preferred embodiment, at least one, for example at least two or at least three or at least four, particularly preferably at least five of the following features applies to the slurry:
a.) the slurry is transported in contact with a plastic surface;
b.) the slurry is sheared;
c.) the slurry has a temperature of more than 0° C., preferably in a range from 5 to 35° C.;
d.) the slurry has a zeta potential at a pH value of 7 in a range from 0 to −100 mA, for example from −20 to −60 mA, particularly preferably from −30 to −45 mA;

e.) the slurry has a pH value in a range of 7 or more, for example of more than 7 or a pH value in the range from 7.5 to 13 or from 8 to 11, particularly preferably from 8.5 to 10;
f.) the slurry has an isoelectric point of less than 7, for example in a range from 1 to 5 or in a range from 2 to 4, particularly preferably in a range from 3 to 3.5;
g.) the slurry has a solids content of at least 40 wt.-%, for example in a range from 50 to 80 wt.-%, or in a range from 55 to 75 wt.-%, particularly preferably in a range from 60 to 70 wt.-%, in each case based on the total weight of the slurry;
h.) the slurry has a viscosity according to DIN 53019-1 (5 rpm, 30 wt.-%) in a range from 500 to 2000 mPas, for example in the range from 600 to 1700 mPas, particularly preferably in the range from 1000 to 1600 mPas;
i.) the slurry has a thixotropy according to DIN SPEC 91143-2 (30 wt.-% in water, 23° C., 5 rpm/50 rpm) in the range from 3 to 6, for example in the range from 3.5 to 5, particularly preferably in the range from 4.0 to 4.5;
j.) the silicon dioxide particles in the shury have in a 4 wt.-% slurry a mean particle size in suspension according to DIN ISO 13320-1 in the range from 100 to 500 nm, for example in a range from 200 to 300 nm.

Preferably, the silicon dioxide particles in a 4 wt.-% aqueous slurry have a particle size $D_{10}$ in a range from 50 to 250 nm, particularly preferably in the range from 100 to 150 nm. Preferably, the silicon dioxide particles in a 4 wt.-% aqueous slurry have a particle size $D_{50}$ in a range from 100 to 400 nm, particularly preferably in the range from 200 to 250 nm. Preferably, the silicon dioxide particles in a 4 wt.-% aqueous slurry have a particle size $D_{90}$ in a range from 200 to 600 nm, particularly preferably in a range from 350 to 400 nm. The particle size is measured according to DIN ISO 13320-1.

"Isoelectric point" means the pH value at which the zeta potential takes the value 0. The zeta potential is measured according to ISO 13099-2:2012.

Preferably, the pH value of the slurry is set to a value in the range given above. Preferably, the pH value can be set by adding to the slurry materials such as NaOH or $NH_3$, for example as aqueous solution. During this process, the slurry is often agitated.

Granulation

The silicon dioxide granulate is obtained from the silicon dioxide powder by granulation. Granulation means the transformation of powder particles into granules. During granulation, larger agglomerates which are referred to as "silicon dioxide granules" are formed by agglomeration of multiple silicon dioxide powder particles. These are often also called "silicon dioxide particles", "silicon dioxide granulate particles" or "granulate particles". Collectively, granules make up a granulate, e.g. the silicon dioxide granules make up a "silicon dioxide granulate".

In the present case, any granulation process which is known to the skilled man and appears to him to be suitable for the granulation of silicon dioxide powder can in principle be selected. Granulation processes can be categorised as agglomeration granulation processes or press granulation processes, and further categorised as wet and dry granulation processes. Known methods are roll granulation in a granulation plate, spray granulation, centrifugal pulverisation, fluidised bed granulation, granulation processes employing a granulation mill, compactification, roll pressing, briquetting, scabbing or extruding.

Preferably, a silicon dioxide granulate is formed in the processing which has granules having a spherical morphology; wherein the process is further preferably performed by spray granulation or roll granulation. Further preferably, a silicon dioxide granulate with granules having a spherical morphology comprises at most 50% of granules, preferably at most 40% of granules, further preferred at most 20% of granules, more preferably between 0 and 50%, between 0 and 40/o or between 0 and 20%, or between 10 and 50%, between 10 and 40% or between 10 and 20% of granules not having a spherical morphology, the percentages in each case based on the total number of granules in the granulate. The granules with a spherical morphology have the SPHT3 values described in the description.

Spray Drying

According to a preferred embodiment of the first aspect of the invention, a silicon dioxide granulate is obtained by spray granulation of the slurry. Spray granulation is also known as spray drying.

Spray drying is preferably effected in a spray tower. For spray dying, the slurry is preferably put under pressure at a raised temperature. The pressurised slurry is then depressurised via a nozzle and thus sprayed into the spray tower. Subsequently, droplets form which instantly dry and first form dry minute particles ("nuclei"). The minute particles form, together with a gas flow applied to the particles, a fluidised bed. In this way, they are maintained in a floating state and can thus form a surface for drying further droplets.

The nozzle, through which the slurry is sprayed into the spray tower, preferably forms an inlet into the interior of the spray tower.

The nozzle preferably has a contact surface with the slurry during spraying. "Contact surface" means the region of the nozzle which comes into contact with the slurry during spraying. Often, at least part of the nozzle is formed as a tube through which the slurry is guided during spraying, so that the inner side of the hollow tube comes into contact with the slurry.

The contact surface preferably comprises a glass, a plastic or a combination thereof. Preferably, the contact surface comprises a glass, particularly preferably quartz glass. Preferably, the contact surface comprises a plastic. In principle, all plastics known to the skilled man, which are stable at the process temperatures and do not pass any foreign atoms to the slurry, are suitable. Preferred plastics are polyolefins, for example homo- or co-polymers comprising at least one olefin, particularly preferably homo- or co-polymers comprising polypropylene, polyethylene, polybutadiene or combinations of two or more thereof. Preferably, the contact surface is made of a glass, a plastic or a combination thereof, for example selected from the group consisting of quartz glass and polyolefins, particularly preferably selected from the group consisting of quartz glass and homo- or co-polymers comprising polypropylene, polyethylene, polybutadiene or combinatios of two or more thereof. Preferably, the contact surface comprises no metals, in particular no tungsten, titanium, tantalum, chromium, cobalt, nickel, iron, vanadium, zirconium and manganese.

It is in principle possible for the contact surface and the further parts of the nozzle to be made of the same or from different materials. Preferably, the further parts of the nozzle comprise the same material as the contact surface. It is likewise possible for the further parts of the nozzle to comprise a material different to the contact surface. For example, the contact surface can be coated with a suitable material, for example with a glass or with a plastic.

Preferably, the nozzle is more than 70 wt.-%, based on the total weight of the nozzle, made out of an item selected from the group consisting of glass, plastic or a combination of glass and plastic, for example more than 75 wt.-% or more than 80 wt.-% or more than 85 wt.-% or more than 90 wt.-% or more than 95 wt.-%, particularly preferably more than 99 wt.-%.

Preferably, the nozzle comprises a nozzle plate. The nozzle plate is preferably made of glass, plastic or a combination of glass and plastic. Preferably, the nozzle plate is made of glass, particularly preferably quartz glass. Preferably, the nozzle plate is made of plastic. Preferred plastics are polyolefins, for example homo- or co-polymers comprising at least one olefin, particularly preferably homo- or co-polymers comprising polypropylene, polyethylene, polybutadiene or combinatios of two or more thereof. Preferably, the nozzle plate comprises no metals, in particular no tungsten, titanium, tantalum, chromium, cobalt, nickel, iron, vanadium, zirconium and manganese.

Preferably, the nozzle comprises a screw twister. The screw twister is peferably made of glass, plastic or a combination of glass and plastic. Preferably, the screw twister is made of glass, particularly preferably quartz glass.

Preferably, the screw twister is made of plastic. Preferred plastics are polyolefis, for example homo- or co-polymers comprising at least one olefin, particularly preferably homo- or co-polymers comprising polypropylene, polyethylene, polybutadiene or combinatios of two or more thereof. Preferably, the screw twister comprises no metals, in particular no tungsten, titanium, tantalum, chromium, cobalt, nickel, iron, vanadium, zirconium and manganese.

Furthermore, the nozzle can comprise further constituents. Preferred further constituents are a nozzle body, particularly preferable is a nozzle body which surrounds the screw twister and the nozzle plate, a cross piece and a baffle. Preferably, the nozzle comprises one or moe, particularly preferably all, of the further constituents. The further constituents can independently from each other be made of in principle any material which is known to the skilled man and which is suitable for this purpose, for example of a metal comprising material, of glass or of a plastic. Preferably, the nozzle body is made of glass, particularly preferably quartz glass. Preferably, the further constituents are made of plastic. Preferred plastics are polyolefins, for example homo- or co-polymers comprising at least one olefin, particularly preferably homo- or co-polymers comprising polypropylene, polyethylene, polybutadiene or combinations of two or more thereof. Preferably, the further constituents comprise no metals, in particular no tungsten, titanium, tantalum, chromium, cobalt, nickel, iron, vanadium, zirconium and manganese.

Preferably, the spray tower comprises a gas inlet and a gas outlet. Through the gas inlet, a gas can be introduced into the interior of the spray tower, and through the gas outlet it can be let out. It is also possible to introduce gas into the spray tower via the nozzle. Likewise, gas can be let out via the outlet of the spray tower. Furthermore, gas can preferably be introduced via the nozzle and a gas inlet of the spray tower, and let out via the outlet of the spray tower and a gas outlet of the spray tower.

Preferably, in the interior of the spray tower is present an atmosphere selected from air, an inert gas, at least two inert gases or a combination of air with at least one inert gas, preferably a combination of air with at least two inert gases. Inert gasses are preferably selected from the list consisting of nitrogen, helium, neon, argon, krypton and xenon. For example, in the interior of the spray tower there is present air, nitrogen or Argon, particularly preferably air.

Further preferably, the atmosphere present in the spray tower is part of a gas flow. The gas flow is preferably introduced into the spray tower via a gas inlet and let out via a gas outlet. It is also possible to introduce parts of the gas flow via the nozzle and to let out parts of the gas flow via a solids outlet. The gas flow can take on further constituents in the spray tower. These can come from the slurry during the spray drying and transfer to the gas flow.

Preferably, a dry gas flow is fed to the spray tower. A dry gas flow means a gas or a gas mixture which has a relative humidity at the temperature set in the spray tower below the condensation point. A relative air humidity of 100% corresponds to a water content of 17.5 g/m$^3$ at 20° C. The gas is preferably pre-warmed to a temperature in a range from 150 to 450° C., for example from 200 to 420° C. or from 300 to 400° C., particularly preferably from 350 to 400° C.

The interior of the spray tower is preferably temperature-controllable. Preferably, the temperature in the interior of the spray tower has a value up to 550° C., for example 300 to 500° C., particularly preferably 350 to 450° C.

The gas flow preferably has a temperature at the gas inlet in a range from 150 to 450° C., for example from 200 to 420° C. or from 300 to 400° C., particularly preferably from 350 to 400° C.

The gas flow which is let out at the solids outlet, at the gas outlet or at both locations, preferably has a temperature of less than 170° C., for example from 50 to 150° C., particularly preferably from 100 to 130° C.

Furthermore, the difference between the temperature of the gas flow on introduction and of the gas flow on expulsion is preferably in a range from 100 to 330° C., for example from 150 to 300° C.

The thus obtained silicon dioxide granules are present as an agglomerate of individual particles of silicon dioxide powder. The individual particles of the silicon dioxide powder continue to be recognizable in the agglomerate.

The mean particle size of the particles of the silicon dioxide powder is preferably in the range from 10 to 1000 nm, for example in the range from 20 to 500 nm or from 30 to 250 nm or from 35 to 200 nm or from 40 to 150 nm, or particularly preferably in the range from 50 to 100 nm. The mean particle size of these particles is measured according to DIN ISO 13320-1.

The spray drying can be carried out in the presence of auxiliaries. In principle, all materials can be employed as auxiliaries, which are known to the skilled man and which appear suitable for the present application. As auxiliary material for example, so-called binders can be considered. Examples of suitable binding materials are metal oxides such as calcium oxide, metal carbonates such as calcium carbonate and polysaccharides such as cellulose, cellulose ether, starch and starch derivatives.

Particularly preferably, the spray drying is carried out in the context of the present invention without auxiliaries.

Preferably, before, after or before and after the removal of the silicon dioxide granulate from the spray tower a portion thereof is separated off. For separating off, all processes which are known to the skilled man and which appear suitable can be considered. Preferably, the separating off is effected by a screening or a sieving.

Preferably, before removal from the spray tower of the silicon dioxide granulate which have been formed by spray drying, particles with a particle size of less than 50 µm, for example with a particle size of less than 70 rpm particularly preferably with a particle size of less than 90 µm are separated off by screening. The screening is effected preferably using a cyclone arrangement, which is preferably arranged in the lower region of the spray tower, particularly preferably above the outlet of the spray tower.

Preferably, after removal of the silicon dioxide granulate from the spray tower, particles with a particle size of greater than 1000 μm, for example with a particle size of greater than 700)μm, particularly preferably with a particle size of greater than 500 μm are separated off by sieving. The sieving of the particles can in principle by effected by all processes known to the skilled man and which are suitable for this purpose. Preferably, the sieving is effected using a vibrating chute.

According to a preferred embodiment, the spray drying of the slurry through a nozzle into a spray tower is characterised by at least one, for example two or three, particularly preferably all of the following features:

a] spray granulation in a spray tower,
b] the presence of a pressure of the slurry at the nozzle of not more than 40 bar, for example in a range from 1.3 to 20 bar, from 1.5 to 18 bar or from 2 to 15 bar or from 4 to 13 bar, or particularly preferably in the range from 5 to 12 bar, wherein the pressure is given in absolute terms (relative to p=0 hPa);
c] a temperature of the droplets upon entering into the spray tower in a range from 10 to 50° C., preferably in a range from 15 to 30° C., particularly preferably in a range from 18 to 25° C.
d] a temperature at the side of the nozzle directed towards the spray tower in a range from 100 to 450° C., for example in a range from 250 to 440° C., particularly preferably from 350 to 430° C.;
e] A throughput of slurry through the nozzle in a range from 0.05 to 1 m³ l/h, for example in a range from 0.1 to 0.7 m/h or from 0.2 to 0.5 m³ l/h, particularly preferably in a range from 0.25 to 0.4 m/h;
f] A solids content of the slurry of at least 40 wt.-%, for example in a range from 50 to 80 wt.-%, or in a range from 55 to 75 wt.-%, particularly preferably in a range from 60 to 70 wt.-%, in each case based on the total weight of the slurry;
g] A gas inflow into the spray tower in a range from 10 to 100 kg/min, for example in a range from 20 to 80 kg/min or from 30 to 70 kg/min, particularly preferably in a range from 40 to 60 kg/min;
h] A temperature of the gas flow upon entering into the spray tower in a range from 100 to 450° C., for example in a range from 250 to 440° C., particularly preferably from 350 to 430° C.;
i] A temperature of the gas flow at the exit out of the spray tower of less than 170° C.;
j] The gas is selected from the group consisting of air, nitrogen and helium, or a combination of two or more thereof; preferably air,
k] a residual moisture content of the granulate on removal out of the spray tower of less than 5 wt.-%, for example of less than 3 wt.-% or of less than 1 wt.-% or in a range from 0.01 to 0.5 wt.-%, particularly preferably in a range from 0.1 to 0.3 wt.-%, in each case based on the total weight of the silicon dioxide granulate created in the spray drying;
l] at least 50 wt.-% of the spray granulate, based on the total weight of the silicon dioxide granulate created in the spray drying, completes a flight time in a range from 1 to 100 s, for example of a period from 10 to 80 s, particularly preferably over a period from 25 to 70 s;
m] at least 50 wt.-% of the spray granulate, based on the total weight of the silicon dioxide granulate created in the spray drying, covers a flight path of more than 20 n, for example of moe than 30 or of more than 50 or of more than 70 or of more than 100 or of more than 150 or of more than 200 or in a range from 20 to 200 m or from 10 to 150 or from 20 to 100, particularly preferably a range from 30 to 80 m.
n] the spray tower has a cylindrical geometry;
o] a height of the spray tower of more than 10 m, for example of more than 15 m or of more than 20 m or of more than 25 m or of more than 30 m or in a range from 10 to 25 m, particularly preferably in a range from 15 to 20 m;
p] screening out of particles with a size of less than 90 un before the removal of the granulate from the spray tower,
q] sieving out of particles with a size of more than 500 μm after the removal of the granulate from the spray tower, preferably in a vibrating chute;
r] The exit of the droplets of the slurry out of the nozzle occurs at an angle of 30 to 60 degrees from vertical, particularly preferably at an angle of 45 degree from vertical.

Vertical means the direction of the gravitational force vector.

The flight path means the path covered by a droplet of slurry from exiting out of the nozzle in the gas chamber of the spray tower to form a granule up to completion of the action of flying and falling. The action of flying and falling frequently ends by the granule impacting with the floor of the spray tower impacting or the granule impacting with other granules already lying on the floor of the spray tower, whichever occurs first.

The flight time is the period required by a granule to cover the flight path in the spray tower. Preferably, the granules have a helical flight path in the spray tower.

Preferably, at least 60 wt.-% of the spray granulate, based on the total weight of the silicon dioxide granulate created in the spray dying, cover a mean flight path of more than 20 n, for example of more than 30 or of more than 50 or of more than 70 or of more than 100 or of more than 150 or of more than 200 or in a range from 20 to 200 m or from 10 to 150 or from 20 to 100, particularly preferably a range from 30 to 80 m.

Preferably, at least 70 wt.-% of the spray granulate, based on the total weight of the silicon dioxide granulate created in the spray dying, cover a mean flight path of more than 20 n, for example of more than 30 or of more than 50 or of more than 70 or of more than 100 or of more than 150 or of more than 200 or in a range from 20 to 200 m or from 10 to 150 or from 20 to 100, particularly preferably a range from 30 to 80 m.

Preferably, at least 80 wt.-% of the spray granulate, based on the total weight of the silicon dioxide granulate created in the spray dying, cover a mean flight path of more than 20 n, for example of more than 30 or of more than 50 or of more than 70 or of more than 100 or of more than 150 or of more than 200 or in a range from 20 to 200 m or from 10 to 150 or from 20 to 100, particularly preferably a range from 30 to 80 m.

Preferably, at least 90 wt.-% of the spray granulate, based on the total weight of the silicon dioxide granulate created in the spray dying, cover a mean flight path of more than 20 n, for example of more than 30 or of more than 50 or of more than 70 or of more than 100 or of more than 150 or of more than 200 or in a range from 20 to 200 m or from 10 to 150 or from 20 to 100, particularly preferably a range from 30 to 80 m.

Roll Granulation

According to a preferred embodiment of the first aspect of the invention, a silicon dioxide granulate is obtained by roll granulation of the slurry.

The roll granulation is carried out by stirring the slurry in the presence of a gas at raised temperature. Preferably, the roll granulation is effected in a stirring vessel fitted with a stirring tool. Preferably, the stirring vessel rotates in the opposite sense to the stirring tool. Preferably, the stirring vessel additionally comprises an inlet through which the silicon dioxide powder can be introduced into the stirring vessel, an outlet through which the silicon dioxide granulate can be removed, a gas inlet and a gas outlet.

For stirring the slurry, preferably a pin-type stirring tool is used. A pin-type stirring tool means a stirring tool fitted with multiple elongate pins having their longitudinal axis coaxial with the rotational axis of the stirring tool. The trajectory of the pins preferably traces coaxial circles around the axis of rotation.

Preferably, the slurry is set to a pH value of less than 7, for example to a pH value in the range from 2 to 6.5, particularly preferably to a pH value in a range from 4 to 6. For setting the pH value, an inorganic acid is preferably used, for example an acid selected from the group consisting of hydrochloric acid, sulphuric acid, nitric acid and phosphoric acid, particularly preferably hydrochloric acid.

Preferably, in the stirring vessel is present an atmosphere selected from air, an inert gas, at least two inert gases or a combination of air with at least one inert gas, preferably at least two inert gases. Inert gases are preferably selected from the list consisting of nitrogen, helium, neon, argon, krypton and xenon. For example, air, nitrogen or argon is present in the stirring vessel, particularly preferably air.

Furthermore, preferably, the atmosphere present in the stirring vessel is part of a gas flow. The gas flow is preferably introduced into the stirring vessel via the gas inlet and let out via the gas outlet. The gas flow can take on further constituents in the stirring vessel. These can originate from the slurry in the roll granulation and transfer into the gas flow.

Preferably, a dry gas flow is introduced to the stirring vessel. A dry gas flow means a gas or a gas mixture which has a relative humidity at the temperature set in the stirring vessel under the condensation point. The gas is preferably pre-warmed to a temperature in a range from 50 to 300° C., for example from 80 to 250° C., particularly preferably from 100 to 200° C.

Preferably, per 1 kg of the employed slurry, 10 to 150 m³ gas per hour is introduced into the stirring vessel, for example 20 to 100 m³ gas per hour, particularly preferably 30 to 70 m³ gas per hour.

During the mixing, the slurry is dried by the gas flow to form silicon dioxide granules. The granulate which is formed is removed from the stirring vessel.

Preferably, the removed granulate is dried further. Preferably, the drying is effected continuously, for example in a rotary kiln. Preferred temperatures for the drying are in a range from 80 to 250° C., for example in a range from 100 to 200° C., particularly preferably in a range from 120 to 180° C.

In the context of the present invention, continuous in respect of a process means that it can be operated continuously. That means that the introduction and removal of materials involved in the process can be effected on an ongoing basis whilst the process is being run. It is not necessary to interrupt the process for this.

Continuous as an attribute of an object, e.g. in relation to a "continuous oven", means that this object is configured in such a way that a process carried out therein, or a process step carried out therein, can be carried out continuously.

The granulate obtained from the roll granulation can be sieved. The sieving occur before or after the drying. Preferably it is sieved before drying. Preferably, granule with a particle size of less than 50 μm, for example with a particle size of less than 80 μm, particularly preferably with a particle size of less than 100 μmin, are sieved out. Furthermore, preferably, granules with a particle size of greater than 900 μm, for example with a particle size of greater than 700 μm, particularly preferably with a particle size of greater than 500 μm, sieved out. The sieving out of larger particles can in principle be carried out by any process known to the skilled man and which is suitable for this purpose. Preferably, the sieving out of larger particles is carried out by means of a vibrating chute.

According to a preferred embodiment, the roll granulation is characterised by at least one, for example two or three, particularly preferably all of the following features:

[a] The granulation is carried out in a rotating stirring vessel;
[b] The granulation is carried out in a gas flow of 10 to 150 kg gas per hour and per 1 kg slurry;
[c] The gas temperature on introduction is 40 to 200° C.;
[d] Granules with a particle size of less than 100 μm and of more than 500 μm are sieved out;
[e] The granules formed have a residual moisture content of 15 to 30 wt. %;
[f] The granules formed are dried at 80 to 250° C., preferably in a continuous drying tube, particularly preferably to a residual moisture content of less than 1 wt.-%.

Preferably, the silicon dioxide granules obtained by granulation, preferably by spray- or roll-granulation, also referred to as silicon dioxide granulate I, is treated before it is processed to obtain quartz glass bodies. This pre-treatment can fulfil various purposes which either facilitate the processing to obtain quartz glass bodies or influence the properties of the resulting quartz glass body. For example, the silicon dioxide granulate I can be compactified, purified, surface-modified or dried.

Preferably, the silicon dioxide granulate I can by subjected to a thermal, mechanical or chemical treatment or a combination of two or more treatments, wherein a silicon dioxide granulate II is obtained.

Chemical

According to a preferred embodiment of the first aspect of the invention, the silicon dioxide granulate I has a carbon content $w_{C(1)}$. The carbon content $w_{C(1)}$ is preferably less than 50 ppm, for example in the range from less than 40 ppm, particularly preferably in the range from less than 30 ppm, particularly preferably in a range from 1 ppb to 20 ppm, are each based on the total weight of the silicon dioxide granulate I.

According to a preferred embodiment of the first aspect of the invention, the silicon dioxide granulate I comprises at least two particles. Preferably, the at least two particles can carry out a motion relative to each other. As means for bringing about the relative motion, in principle all means known to the skilled man and which appear to him to be suitable can be considered. Particular preferred is a mixing. A mixing can in principle be carried out in any manner. Preferably, a feed-oven is selected for this. Accordingly, the at least two particles can preferably perform a motion relative to each other by being agitated in a feed oven, for example in a rotary kiln.

Feed ovens mean ovens for which loading and unloading of the oven, so-called charging, is carried out continuously. Examples of feed-ovens are rotary kilns, roll-over type furnaces, belt conveyor ovens, conveyor ovens, continuous pusher-type furnaces. Preferably, for treatment of the silicon dioxide granulate I, rotary kilns are used.

According to a preferred embodiment of the first aspect of the invention, the silicon dioxide granulate I is treated with a reactant to obtain a silicon dioxide granulate II. The treatment is carried out in order to change the concentration of certain materials in the silicon dioxide granulate. The silicon dioxide granulate I can have impurities or certain functionalities, the content of which should be reduced, such as for example: OH groups, carbon containing compounds, transition metals, alkali metals and alkali earth metals. The impurities and functionalities can originate from the starting materials or can be introduced in the course of the process. The treatment of the silicon dioxide granulate I can serve various purposes. For example, employing treated silicon dioxide granulate I, i.e. silicon dioxide granulate II, can simplify the processing of the silicon dioxide granulate to obtain quartz glass bodies. Furthermore, this selection can be employed to tune the properties of the resulting quartz glass body. For example, the silicon dioxide granulate I can be purified or surface modified. The treatment of the silicon dioxide granulate I can thus be employed for improving the properties of the resulting quartz glass bodies.

Preferably, a gas or a combination of multiple gases is suitable as reactant. This is also referred to as a gas mixture. In principle, all gases known to the skilled man can be employed, which are known for the specified treatment and which appear to be suitable. Preferably, a gas selected from the group consisting of HCl, $Cl_2$, $F_2$, $O_2$, $O_3$, $H_2$, $C_2F_4$, $C_2F_6$, $HClO_4$, air, inert gas, e.g. $N_2$, He, Ne, Ar, Kr, or combinations of two or more thereof is employed. Preferably, the treatment is carried out in the presence of a gas or a combination of two or more gases. Preferably, the treatment is carried out in a gas counter flow or a gas co-flow.

Preferably, the reactant is selected from the group consisting of HCl, $Cl_2$, $F_2$, $O_2$, $O_3$ or combinations of two or more thereof. Preferably, mixtures of two or more of the above-mentioned gases are used for the treatment of silicon dioxide granulate I. Through the presence of F, Cl or both, metals which are contained in silicon dioxide granulates I as impurities, such as for example transition metals, alkali metals and alkali earth metals, can be removed. In this connection, the above mentioned metals can be converted along with constituents of the gas mixture under the process conditions to obtain gaseous compounds which are subsequently drawn out and thus are no longer present in the granulate. Furthermore, preferably, the OH content in the silicon dioxide granulate I can be decreased by the treatment of the silicon dioxide granulate I with these gases.

Preferably, a gas mixture of HCl and $Cl_2$ is employed as reactant. Preferably, the gas mixture has an HCl content in a range from 1 to 30 vol.-%, for example in a range from 2 to 15 vol.-%, particularly preferably in a range from 3 to 10 vol.-%. Likewise, the gas mixture preferably has a $Cl_2$ content in a range from 20 to 70 vol.-%, for example in a range from 25 to 65 vol.-%, particularly preferably in a range from 30 to 60 vol.-%. The remainder up to 100 vol.-% can be made up of one or more inert gases, e.g. $N_2$, He, Ne, Ar, Kr, or of air. Preferably, the proportion of inert gas in the reactants is in a range from 0 to less than 50 vol.-%, for example in a range from 1 to 40 vol.-% or from 5 to 30 vol.-%, particularly preferably in a range from 10 to 20 vol.-%, in each case based on the total volume of the reactants.

$O_2$, $C_2F_2$, or mixtures thereof with $Cl_2$ are preferably used for purifying silicon dioxide granulate I which has been prepared from a siloxane or from a mixture of multiple siloxanes.

The reactant in the form of a gas or of a gas mixture is preferably contacted with the silicon dioxide granulate as a gas flow or as part of a gas flow with a throughput in a range from 50 to 2000 L/h, for example in a range from 100 to 1000 L/h, particularly preferably in a range from 200 to 500 L/h. A preferred embodiment of the contacting is a contact of the gas flow and silicon dioxide granulate in a feed oven, for example in a rotary kiln. Another preferred embodiment of the contacting is a fluidised bed process.

Through treatment of the silicon dioxide granulate I with the reactant, a silicon dioxide granulate II with a carbon content $w_{C(2)}$ is obtained. The carbon content $w_{C(2)}$ of the silicon dioxide granulate II is less than the carbon content $w_{C(1)}$ of the silicon dioxide granulate I, based on the total weight of the respective silicon dioxide granulate. Preferably, $w_{C(2)}$ is 0.5 to 99%, for example 20 to 80% or 50 to 95%, particularly preferably 60 to 90% less than $w_{C(1)}$.

Thermal

Preferably, the silicon dioxide granulate I is additionally subjected to a thermal or mechanical treatment or to a combination of these treatments. One or more of these additional treatments can be carried out before or during the treatment with the reactant. Alternatively, or additionally, the additional treatment can also be carried out on the silicon dioxide granulate II. In what follows, the term "silicon dioxide granulate" comprises the alternatives "silicon dioxide granulate I" and "silicon dioxide granulate II". It is equally possible to carry out the treatments described in the following to the "silicon dioxide granulate I", or to the treated silicon dioxide granulate I, the "silicon dioxide granulate II".

The treatment of the silicon dioxide granulate can serve various purposes. For example, this treatment facilitates the processing of the silicon dioxide granulate to obtain quartz glass bodies. The treatment can also influence the properties of the resulting glass body. For example, the silicon dioxide granulate can be compactified, purified, surface modified or dried. In this connection, the specific surface area (BET) can decrease. Likewise, the bulk density and the mean particle size can increase due to agglomerations of silicon dioxide particles. The thermal treatment can be carried out dynamically or statically.

For the dynamic thermal treatment, all ovens in which the silicon dioxide granulate can be thermally treated whilst being agitated are in principle suitable. For the dynamic thermal treatment, preferably feed ovens are used.

A preferred mean holding time of the silicon dioxide granulate in the dynamic thermal treatment is quantity dependent. Preferably, the mean holding time of the silicon dioxide granulate in the dynamic thermal treatment is in the range from 10 to 180 min, for example in the range from 20 to 120 min or from 30 to 90 min. Particularly preferably, the mean holding time of the silicon dioxide granulate in the dynamic thermal treatment is in the range from 30 to 90 min.

In the case of a continuous process, a defined portion of the flow of silicon dioxide granulate is used as a sample load for the measurement of the holding time, e.g. a gram, a kilogram or a tonne. The start and end of the holding time are determined by the introduction into and exiting from the continuous oven operation.

Preferably, the throughput of the silicon dioxide granulate in a continuous process for dynamic thermal treatment is in the range from 1 to 50 kg/h, for example in the range from 5 to 40 kg/h or from 8 to 30 kg/h. Particularly preferably, the throughput here is in the range from 10 to 20 kg/h.

In the case of a discontinuous process for dynamic thermal treatment, the treatment time is given as the period of time between the loading and subsequent unloading of the oven.

In the case of a discontinuous process for dynamic thermal treatment, the throughput is in a range from 1 to 50 kg/h, for example in the range from 5 to 40 kg/h or from 8 to 30 kg/h. Particularly preferably, the throughput is in the range from 10 to 20 kg/h. The throughput can be achieved using a sample load of a determined amount which is treated for an hour. According to another embodiment, the throughput can be achieved through a number of loads per hour, wherein the weight of a single load corresponds to the throughput per hour divided by the number of loads. In this event, time of treatment corresponds to the fraction of an hour which is given by 60 minutes divided by the number of loads per hour.

Preferably, the dynamic thermal treatment of the silicon dioxide granulate is carried out at an oven temperature of at least 500° C., for example in the range from 510 to 1700° C. or from 550 to 1500° C. or from 580 to 1300° C., particularly preferably in the range from 600 to 1200° C.

Normally, the oven has the indicated temperature in the oven chamber. Preferably, this temperature deviates from the indicated temperature by less than 10% downwards or upwards, based on the entire treatment period and the entire length of the oven as well as at every point in time in the treatment as well as at every position in the oven.

Alternatively, in particular the continuous process of a dynamic thermal treatment of the silicon dioxide granulate can be carried out at differing oven temperatures. For example, the oven can have a constant temperature over the treatment period, wherein the temperature varies in section over the length of the oven. Such sections can be of the same length or of different lengths. Preferably, in this case, the temperature increases from the entrance of the oven to the exit of the oven. Preferably, the temperature at the entrance is at least 100° C. lower than at the exit, for example 150° C. lower or 200° C. lower or 300° C. lower or 400° C. lower. Furthermore, preferably, the temperature at the entrance is preferably at least 500° C., for example in the range from 510 to 1700° C. or from 550 to 1500° C. or from 580 to 1300° C., particularly preferably in the range from 600 to 1200° C. Furthermore, preferably, the temperature at the entrance is preferably at least 300° C., for example from 400 to 1000° C. or from 450 to 900° C. or from 500 to 800° C. or from 550 to 750° C., particularly preferably from 600 to 700° C. Furthermore, each of the temperature ranges given at the oven entrance can be combined with each of the temperature ranges given at the oven exit. Preferred combinations of oven entrance temperature ranges and oven exit temperature ranges are:

| Oven entrance temperature range [° C.] | Oven exit temperature range [° C.] |
| --- | --- |
| 400-1000 | 510-1300 |
| 450-900 | 550-1260 |
| 480-850 | 580-1200 |
| 500-800 | 600-1100 |
| 530-750 | 630-1050 |

For the static thermal treatment of the silicon dioxide granulate crucibles arranged in an oven are preferably used. Suitable crucibles are sinter crucibles or metal sheet crucibles. Preferred are rolled metal sheet crucibles made out of multiple sheets which are riveted together. Examples of crucible materials are refractory metals, in particular tungsten, molybdenum and tantalum. The crucible can furthermore be made of graphite or in the case of the crucible of refractory metals can be lined with graphite foil. Furthermore, preferably, the crucibles can be made of silicon dioxide. Particularly preferably, silicon dioxide crucibles are employed.

The mean holding time of the silicon dioxide granulate in the static thermal treatment is quantity dependent. Preferably, the mean holding time of the silicon dioxide granulate in the static thermal treatment for a 20 kg amount of silicon dioxide granulate I is in the range from 10 to 180 min, for example in the range from 20 to 120 min, particularly preferably in the range from 30 to 90 min.

Preferably, the static thermal treatment of the silicon dioxide granulate is carried out at an oven temperature of at least 800° C., for example in the range from 900 to 1700° C. or from 950 to 1600° C. or from 1000 to 1500° C. or from 1050 to 1400° C., particularly preferably in the range from 1100 to 1300° C.

Preferably, the static thermal treatment of the silicon dioxide granulate I is carried out at constant oven temperature. The static thermal treatment can also be carried out at a varying oven temperature. Preferably, in this case, the temperature increases during the treatment, wherein the temperature at the start of the treatment is at least 50° C. lower than at the end, for example 70° C. lower or 80° C. lower or 100° C. lower or 110° C. lower, and wherein the temperature at the end is preferably at least 800° C., for example in the range from 900 to 1700° C. or from 950 to 1600° C. or from 1000 to 1500° C. or from 1050 to 1400° C., particularly preferably in the range from 1100 to 1300° C.

Mechanical

According to a further preferred embodiment, the silicon dioxide granulate I can be mechanically treated. The mechanical treatment can be carried out for increasing the bulk density. The mechanical treatment can be combined with the above mentioned thermal treatment. A mechanical treatment can avoid the agglomerates in the silicon dioxide granulate and therefore the mean particle size of the individual, treated silicon dioxide granules in the silicon dioxide granulate becoming too large. An enlargement of the agglomerates can hinder the further processing or have disadvantageous impacts on the properties of the quartz glass bodies prepared by the inventive process, or a combination of both effects. A mechanical treatment of the silicon dioxide granulate also promotes a uniform contact of the surfaces of the individual silicon dioxide granules with the gas or gases. This is in particular achieved by concurrent mechanical and chemical treatment with one or more gases. In this way, the effect of the chemical treatment can be improved.

The mechanical treatment of the silicon dioxide granulate can be carried out by moving two or more silicon dioxide granules relative to each other, for example by rotating the tube of a rotary kiln.

Preferably, the silicon dioxide granulate I is treated chemically, thermally and mechanically. Preferably, a simultaneous chemical, thermal and mechanical treatment of the silicon dioxide granulate I is carried out.

In the chemical treatment, the content of impurities in the silicon dioxide granulate I is reduced. For this, the silicon dioxide granulate I can be treated in a rotary kiln at raised temperature and under a chlorine and oxygen containing atmosphere. Water present in the silicon dioxide granulate I evaporates, organic materials react to form CO and $CO_2$. Metal impurities can be converted to volatile chlorine containing compounds.

Preferably, the silicon dioxide granulate I is treated in a chlorine and oxygen containing atmosphere in a rotary kiln at a temperature of at least 500° C., preferably in a temperature range from 550 to 1300° C. or from 600 to 1260° C. or from 650 to 1200° C. or from 700 to 1000° C., particularly preferably in a temperature range from 700 to 900° C. The chlorine containing atmosphere contains for example HCl or $Cl_2$ or a combination of both. This treatment causes a reduction of the carbon content.

Furthermore, preferably alkali and iron impurities are reduced. Preferably, a reduction of the number of OH groups is achieved. At temperatures under 700° C., treatment periods can be long, at temperatures above 1100° C. there is a risk that pores of the granulate close, trapping chlorine or gaseous chlorine compounds.

Preferably, it is also possible to carry out sequentially multiple chemical treatment steps, each concurrent with thermal and mechanical treatment. For example, the silicon dioxide granulate I can first be treated in a chlorine containing atmosphere and subsequently in an oxygen containing atmosphere. The low concentrations of carbon, hydroxyl groups and chlorine resulting therefrom facilitate the melting down of the silicon dioxide granulate II.

According to a further preferred embodiment, step II.2) is characterised by at least one, for example by at least two or at least three, particularly preferably by a combination of all of the following features:

N1) The reactant comprises HCl, $Cl_2$ or a combination therefrom;
N2) The treatment is carried out in a rotary kiln;
N3) The treatment is carried out at a temperature in a range from 600 to 900° C.;
N4) The reactant forms a counter flow;
N5) The reactant has a gas flow in a range from 50 to 2000 L/h, preferably 100 to 1000 L/h, particularly preferably 200 to 500 L/h;
N6) The reactant has a volume proportion of inert gas in a range from 0 to less than 50 vol.-%.

Preferably, the silicon dioxide granulate I has a particle diameter which is greater than the particle diameter of the silicon dioxide powder. Preferably, the particle diameter of the silicon dioxide granulate I is up to 300 times as great as the particle diameter of the silicon dioxide powder, for example up to 250 times as great or up to 200 times as great or up to 150 times as great or up to 100 times as great or up to 50 times as great or up to 20 times as great or up to 10 times as great, particularly preferably 2 to 5 times as great.

The silicon dioxide granulate obtained in this way is also called silicon dioxide granulate II. Particularly preferably, the silicon dioxide granulate II is obtained from the silicon dioxide granulate I in a rotary kiln by means of a combination of thermal, mechanical and chemical treatment.

The silicon dioxide granulate provided in step i.) is preferably selected from the group consisting of silicon dioxide granulate I, silicon dioxide granulate II and a combination therefrom.

"Silicon dioxide granulate I" means a granulate of silicon dioxide which is produced by granulation of silicon dioxide powder which was obtained through pyrolysis of silicon compounds in a fuel gas flame. Preferred fuel gases are oxyhydrogen gas, natural gas or methane gas, particularly preferable is oxyhydrogen gas.

"Silicon dioxide granulate II" means a granulate of silicon dioxide which is produced by post treatment of the silicon dioxide granulate I. Possible post treatments are chemical, thermal and/or mechanical treatments. This is described at length in the context of the description of the provision of the silicon dioxide granulate (process step II. of the first aspect of the invention).

Particularly preferably, the silicon dioxide granulate provided in step i.) is the silicon dioxide granulate I. The silicon dioxide granulate I has the following features:

[A] a BET surface area in the range from 20 to 50 $m^2/g$, for example in a range from 20 to 40 $m^2/g$; particularly preferably in a range from 25 to 35 $m^2/g$, wherein the micro pore portion preferably accounts for a BET surface area in a range from 4 to 5 $m^2/g$; for example in a range from 4.1 to 4.9 $m^2/g$; particularly preferably in a range from 4.2 to 4.8 $m^2/g$, and
[B] a mean particle size in a range from 180 to 300 μm.

Preferably, the silicon dioxide granulate I is characterised by at least one, for example by at least two or at least three or at least four, particularly preferably by at least five of the following features:

[C] a bulk density in a range from 0.5 to 1.2 $g/cm^3$, for example in a range from 0.6 to 1.1 $g/cm^3$, particularly preferably in a range from 0.7 to 1.0 $g/cm^3$;
[D] a carbon content of less than 50 ppm, for example less than 40 ppm or less than 30 ppm or less than 20 ppm or less than 10 ppm, particularly preferably in a range from 1 ppb to 5 ppm;
[E] an aluminium content of less than 200 ppb, preferably of less than 100 ppb, for example of less than 50 ppb or from 1 to 200 ppb or from 15 to 100 ppb, particularly preferably in a range from 1 to 50 ppb.
[F] a tamped density in a range from 0.5 to 1.2 $g/cm^3$, for example in a range from 0.6 to 1.1 $g/cm^3$, particularly preferably in a range from 0.75 to 1.0 $g/cm^3$;
[G] a pore volume in a range from 0.1 to 1.5 mL/g, for example in a range from 0.15 to 1.1 mL/g; particularly preferably in a range from 0.2 to 0.8 mL/g,
[H] a chlorine content of less than 200 ppm, preferably of less than 150 ppm, for example less than 100 ppm, or of less than 50 ppm, or of less than 1 ppm, or of less than 500 ppb, or of less than 200 ppb, or in a range from 1 ppb to less than 200 ppm, or from 1 ppb to 100 ppm, or from 1 ppb to 1 ppm, or from 10 ppb to 500 ppb, or from 10 ppb to 200 ppb, particularly preferably from 1 ppb to 80 ppb;
[I] metal content of metals which are different to aluminium of less than 1000 ppb, preferably in a range from 1 to 900 ppb, for example in a range from 1 to 700 ppb, particularly preferably in a range from 1 to 500 ppb;
[J] a residual moisture content of less than 10 wt.-%, preferably in a range from 0.01 wt.-% to 5 wt. %, for example from 0.02 to 1 wt.-%, particularly preferably from 0.03 to 0.5 wt.-%;

wherein the wt.-%, ppm and ppb are each based on the total weight of the silicon dioxide granulate I.

The OH content, or hydroxyl group content, means the content of OH groups in a material, for example in silicon dioxide powder, in silicon dioxide granulate or in a quartz glass body. The content of OH groups is measured spectroscopically in the infrared by comparing the first and the third OH bands.

The chlorine content means the content of elemental chlorine or chlorine ions in the silicon dioxide granulate, in the silicon dioxide powder or in the quartz glass body.

The aluminium content means the content of elemental aluminium or aluminium ions in the silicon dioxide granulate, in the silicon dioxide powder or in the quartz glass body.

Preferably, the silicon dioxide granulate I has a micro pore proportion in a range from 4 to 5 m$^2$/g; for example in a range from 4.1 to 4.9 m$^2$/g; particularly preferably in a range from 4.2 to 4.8 m$^2$/g.

The silicon dioxide granulate I preferably has a density in a range from 2.1 to 2.3 g/cm$^3$, particularly preferably in a range from 2.18 to 2.22 g/cm$^3$.

The silicon dioxide granulate I preferably has a mean particle size in a range from 180 to 300 µm, for example in a range from 220 to 280 µm, particularly preferably in a range from 230 to 270 µm.

The silicon dioxide granulate I preferably has a particle size $D_{50}$ in a range from 150 to 300 µm, for example in a range from 180 to 280 µm, particularly preferably in a range from 220 to 270 µm. Furthermore, preferably, the silicon dioxide granulate I has a particle size $D_{10}$ in a range from 50 to 150 µm, for example in a range from 80 to 150 µm, particularly preferably in a range from 100 to 150 µm. Furthermore, preferably, the silicon dioxide granulate I has a particle size $D_{90}$ in a range from 250 to 620 µm, for example in a range from 280 to 550 µm, particularly preferably in a range from 300 to 450 µm.

The silicon dioxide granulate I preferably has the feature combination [A]/[B]/[C] or [A]/[B]/[E] or [A]/[B]/[G], further preferred the feature combination [A]/[B]/[C]/[E] or [A]/[B]/[C]/[G] or [A]/[B]/[E]/[G], further preferably the feature combination [A]/[B]/[C]/[E]/[G].

The silicon dioxide granulate I preferably has the feature combination [A]/[B]/[C], wherein the BET surface area is in a range from 20 to 40 m$^2$/g, the mean particle size is in a range from 180 to 300)µm and the bulk density is in a range from 0.6 to 1.1 g/mL.

The silicon dioxide granulate I preferably has the feature combination [A]/[B]/[E], wherein the BET surface area is in a range from 20 to 40 m$^2$/g, the mean particle size is in a range from 180 to 300 µm and the aluminium content is in a range from 1 to 50 ppb.

The silicon dioxide granulate I preferably has the feature combination[A]/[B]/[G], wherein the BET surface area is in a range from 20 to 40 m$^2$/g, the mean particle size is in a range from 180 to 300 µm and the pore volume is in a range from 0.2 to 0.8 mL/g.

The silicon dioxide granulate I preferably has the feature combination [A]/[B]/[C]/[E], wherein the BET surface area is in a range from 20 to 40 m$^2$/g, the mean particle size is in a range from 180 to 300 µm, the bulk density is in a range from 0.6 to 1.1 g/mL and the aluminium content is in a range from 1 to 50 ppb.

The silicon dioxide granulate I preferably has the feature combination [A]/[B]/[C]/[G], wherein the BET surface area is in a range from 20 to 40 m$^2$/g, the mean particle size is in a range from 180 to 300 µm, the bulk density is in a range from 0.6 to 1.1 g/mL and the pore volume is in a range from 0.2 to 0.8 mL/g.

The silicon dioxide granulate I preferably has the feature combination [A]/[B]/[E]/[G], wherein the BET surface area is in a range from 20 to 40 m$^2$/g, the mean particle size is in a range from 180 to 300 µm, the aluminium content is in a range from 1 to 50 ppb and the pore volume is in a range from 0.2 to 0.8 mL/g.

The silicon dioxide granulate I preferably has the feature combination [A]/[B]/[C]/[E]/[G], wherein the BET surface area is in a range from 20 to 40 m$^2$/g, the mean particle size is in a range from 180 to 300 µm, the bulk density is in a range from 0.6 to 1.1 g/mL, the aluminium content is in a range from 1 to 50 ppb and the pore volume is in a range from 0.2 to 0.8 mL/g.

Particle size means the size of the particles of aggregated primary particles, which are present in a silicon dioxide powder, in a slurry or in a silicon dioxide granulate. The mean particle size means the arithmetic mean of all particle sizes of the indicated material. The $D_{50}$ value indicates that 50% of the particles, based on the total number of particles, are smaller than the indicated value. The $D_{10}$ value indicates that 10% of the particles, based on the total number of particles, are smaller than the indicated value. The $D_{90}$ value indicates that 90% of the particles, based on the total number of particles, are smaller than the indicated value. The particle size is measured by the dynamic photo analysis process according to ISO 13322-2:2006-11.

Furthermore, particularly preferably, the silicon dioxide granulate provided in step i.) is the silicon dioxide granulate II. The silicon dioxide granulate II has the following features:
  (A) a BET surface area in the range from 10 to 35 m$^2$/g, for example in a range from 10 to 30 m$^2$/g, particularly preferably in a range from 20 to 30 m$^2$/g, and
  (B) a mean particle size in a range from 100 to 300 µm, for example in a range from 150 to 280 µm or from 200 to 270 µm, particularly preferably in a range from 230 to 260 µm.

Preferably, the silicon dioxide granulate II has at least one, for example at least two or at least three or at least four, particularly preferably at least five of the following features:
  (C) a bulk density in a range from 0.7 to 1.2 g/cm$^3$, for example in a range from 0.75 to 1.1 g/cm$^3$, particularly preferably in a range from 0.8 to 1.0 g/cm$^3$;
  (D) a carbon content of less than 5 ppm, for example less than 4.5 ppm or in a range from 1 ppb to 4 ppm, particularly preferably of less than 4 ppm;
  (E) an aluminium content of less than 200 ppb, for example of less than 150 ppb or of less than 100 ppb or from 1 to 150 ppb or from 1 to 100 ppb, particularly preferably in a range from 1 to 80 ppb;
  (F) a tamped density in a range from 0.7 to 1.2 g/cm$^3$, for example in a range from 0.75 to 1.1 g/cm$^3$, particularly preferably in a range from 0.8 to 1.0 g/cm$^3$;
  (G) a pore volume in a range from 0.1 to 2.5 mL/g for example in a range from 0.2 to 1.5 mL/g, particularly preferably in a range from 0.4 to 1 mL/g,
  (H) a chlorine content of less than 500 ppm, preferably of less than 400 ppm, for example less than 350 ppm or preferably of less than 330 ppm or in a range from 1 ppb to 500 ppm or from 10 ppb to 450 ppm particularly preferably from 50 ppb to 300 ppm;
  (I) a metal content of metals which are different to aluminium of less than 1000 ppb, for example in a range from 1 to 400 ppb, particularly preferably in a range from 1 to 200 ppb;
  (J) a residual moisture content of less than 3 wt.-%, for example in a range from 0.001 wt.-% to 2 wt.-%, particularly preferably from 0.01 to 1 wt.-%,
  wherein the wt.-%, ppm and ppb are each based on the total weight of the silicon dioxide granulate II.

Preferably, the silicon dioxide granulate II has a micro pore proportion in a range from 1 to 2 m$^2$/g, for example in a range from 1.2 to 1.9 m$^2$/g, particularly preferably in a range from 1.3 to 1.8 m$^2$/g.

The silicon dioxide granulate II preferably has a density in a range from 0.5 to 2.0 g/cm$^3$, for example from 0.6 to 1.5 g/cm$^3$, particularly preferably from 0.8 to 1.2 g/cm$^3$. The density is measured according to the method described in the test methods.

The silicon dioxide granulate II preferably has a particle size $D_{50}$ in a range from 150 to 250 μm, for example in a range from 180 to 250 μm, particularly preferably in a range from 200 to 250 μm. Furthermore, preferably, the silicon dioxide granulate II has a particle size $D_{10}$ in a range from 50 to 150 μm, for example in a range from 80 to 150 μm, particularly preferably in a range from 100 to 150 μm. Furthermore, preferably, the silicon dioxide granulate II has a particle size $D_{90}$ in a range from 250 to 450 μm, for example in a range from 280 to 420 μm, particularly preferably in a range from 300 to 400 μm.

The silicon dioxide granulate II preferably has the feature combination (A)/(B)/(D) or (A)/(B)/(F) or (A)/(B)/(I), further preferred the feature combination (A)/(B)/(D)/(F) or (A)/(B)/(D)/(I) or (A)/(B)/(F)/(I), further preferably the feature combination (A)/(B)/(D)/(F)/(I).

The silicon dioxide granulate II preferably has the feature combination (A)/(B)/(D), wherein the BET surface area is in a range from 10 to 30 m$^2$/g, the mean particle size is in a range from 150 to 280 μm and the carbon content is less than 4 ppm.

The silicon dioxide granulate II preferably has the feature combination (A)/(B)/(F), wherein the BET surface area is in a range from 10 to 30 m$^2$/g, the mean particle size is in a range from 150 to 280 μm and the tamped density is in a range from 0.8 to 1.0 g/mL.

The silicon dioxide granulate II preferably has the feature combination (A)/(B)/(I), wherein the BET surface area is in a range from 10 to 30 m$^2$/g, the mean particle size is in a range from 150 to 280 μm and the metal content of metals which are different to aluminium is in a range from 1 to 400 ppb.

The silicon dioxide granulate II preferably has the feature combination (A)/(B)/(D)/(F), wherein the BET surface area is in a range from 10 to 30 m/g the mean particle size is in a range from 150 to 280 Ipm, the carbon content is less than 4 ppm and the tamped density is in a range from 0.8 to 1.0 g/mL.

The silicon dioxide granulate II preferably has the feature combination (A)/(B)/(D)/(I), wherein the BET surface area is in a range from 10 to 30 m$^2$/g the mean particle size is in a range from 150 to 280 μm, the carbon content is less than 4 ppm and the metal content of metals which are different to aluminium is in a range from 1 to 400 ppb.

The silicon dioxide granulate II preferably has the feature combination (A)/(B)/(F)/(I), wherein the BET surface area is in a range from 10 to 30 m$^2$/g, the mean particle size is in a range from 150 to 280 μm, the tamped density is in a range from 0.8 to 1.0 g/mL and the metal content of metals which are different to aluminium is in a range from 1 to 400 ppb.

The silicon dioxide granulate II preferably has the feature combination (A)/(B)/(D)/(F)/(I), wherein the BET surface area is in a range from 10 to 30 m$^2$/g, the mean particle size is in a range from 150 to 280 μm, the carbon content is less than 4 ppm, the tamped density is in a range from 0.8 to 1.0 g/mL and the metal content of metals which are different to aluminium is in a range from 1 to 400 ppb.

Step ii.)

According to step ii.), a glass melt is formed out of the silicon dioxide granulate. Normally, the silicon dioxide granulate is warmed until a glass melt is obtained. The warming of the silicon dioxide granulate to obtain a glass melt can in principle by carried out by any way known to the skilled man for this purpose.

Preparation of a Glass Melt

The formation of a glass melt from the silicon dioxide granulate, for example by warming, can be carried out by a continuous process. In the process according to the invention for the preparation of a quartz glass body, the silicon dioxide granulate can preferably be introduced continuously into an oven or the glass melt can be removed continuously from the oven, or both. Particularly preferably, the silicon dioxide granulate is introduced continuously into the oven and the glass melt is removed continuously from the oven.

For this, an oven which has at least one inlet and at least one outlet is in principle suitable. An inlet means an opening through which silicon dioxide and optionally further materials can be introduced into the oven. An outlet means an opening through which at least a part of the silicon dioxide can be removed from the oven. The oven can for example be arranged vertically or horizontally. Preferably, the oven is arranged vertically. Preferably, at least one inlet is located above at least one outlet. "Above" in connection with fixtures and features of an oven means, in particular in connection with an inlet and outlet, that the fixture or the features which is arranged "above" another has a higher position above the zero of absolute height. "Vertical" means that the line directly joining the inlet and the outlet of the oven deviates not more than 30° from the direction of gravity.

According to the invention, the oven comprises a melting crucible. In principle, any crucible arrangement in the oven which is known to the skilled person and is suitable for the process can be selected. Preferably, the melting crucible can be arranged standing or hanging in the oven. Preferred are metal sheet crucibles or sinter crucibles. Particularly preferably, the oven comprises a hanging metal sheet crucible, a hanging sinter crucible or a standing sinter crucible.

A metal sheet crucible means a crucible which comprises at least one rolled metal sheet. Preferably, a metal sheet crudible has multiple rolled metal sheets. A hanging metal sheet crucible means a metal sheet crucible as described above which is arranged hanging in an oven.

Preferably, the metal sheet of the hanging metal sheet crucible has a density 95% or greater of the theoretical density, for example from 95% to 98% or from 96% to 98%. More preferable are higher theoretical densities, in particular in the range from 98 to 99.95%. The theoretical density of a basic material corresponds to the density of a pore free and 100% dense material. A density of the metal sheet of the metal sheet crucible of more than 95% of the theoretical density can for example be obtained by sintering a sinter metal and subsequent compactification of the sintered metal. Particularly preferably, a metal sheet crucible is obtainable by sintering of a sinter metal, rolling to obtain a metal sheet and processing the metal sheet to obtain a crucible.

Preferably, the metal sheet crucible has at least a lid, a wall and a base plate. Preferably, the hanging metal sheet crucible has at least one, for example at least two or at least three or at least four, particularly preferably at least five or all of the following features:

(a) at least one, e.g. more than one or at least two or at least three or at least five, particularly preferably three or four layers of the metal sheet;

(b) at least one metal sheet, e.g. at least three or at least four or at least six or at least eight or at least twelve or at least 15 or at least 16 or at least 20 metal sheets, particularly preferably twelve or 16 metal sheets;

(c) at least one join between two metal sheet parts, e.g. at least two or at least five or at least ten or at least 18 or at least 24 or at least 36 or at least 48 or at least 60 or at least 72 or at least 48 or at least 96 or at least 120 or at least 160, particularly preferably 36 or 48 joins between two of the same or between multiple different metal sheet parts of the hanging metal sheet crucible;

(d) The metal sheet parts of the hanging metal sheet crucible are riveted, e.g. by deep drawing at least one join e.g. joined by a combination of deep drawing with metal sheet collaring or countersinking, screwed or welded e.g. electron beam welding and sintering of the weld points, the metal sheet parts are particularly preferably riveted;

(e) The metal sheet of the hanging metal sheet crucible is obtainable by a shaping step which is associated with an increase of the physical density, preferably by shaping of a sintered metal or of a sintered alloy; furthermore, preferably, the shaping is a rolling;

(f) A hanger assembly of copper, aluminium, steel, iron, nickel or a refractory metal, e.g. of the crucible material, preferably a water cooled hanger assembly of copper or steel;

(g) A nozzle, preferably a nozzle permanently fixed to the crucible;

(h) A mandrel, for example a mandrel fixed to the nozzle with pins or a mandrel fixed to the lid with a supporting rod or a mandrel attached underneath the crucible with a supporting rod;

(i) at least one gas inlet, e.g. in the form of a filling pipe or as a separate inlet;

(j) at least one gas outlet, e.g. as a separate outlet in the lid or in the wall of the crucible;

(k) a cooled jacket, preferably a water cooled jacket;

(l) an insulation on the outside, preferably an insulation on the outside made of zirconium oxide.

The hanging metal sheet crucible can in principle be heated in any way which is known to the skilled person and which seems to him to be suitable. The hanging metal sheet crucible can for example be heated by means of electrical heating elements (resistive) or by induction. In the case of resistive heating, the solid surface of the metal sheet crucible is warmed from the outside and delivers the energy from there to its inner side. For inductive heating, the energy is coupled via coils in the side wall of the melting crucible and is transferred from there to the crucible inside. For resistive heating, the energy is coupled through radiation, wherein the solid surface is heated from the outside and the energy is transferred from there to the inside. Preferably, the melting crucible is inductively heated.

According to a preferred embodiment of the present invention, the energy transfer into the melting crucible, in particular for melting a bulk good, is not performed by warming the melting crucible, or a bulk material present therein, or both, using a flame, such as for example a burner flame directed into the melting crucible or onto the melting crucible.

By means of the hanging arrangement, the hanging metal sheet crucible can be moved in the oven. Preferably, the crucible can be at least partially moved into and moved out of the oven. If different heating zones are present in the oven, their temperature profile will be transferred to the crucible which is present in the oven. By changing the position of the crucible in the oven, multiple heating zones, varying heating zones or multiple varying heating zones can be produced in the crucible.

The metal sheet crucible has a nozzle. The nozzle is made of a nozzle material. Preferably, the nozzle material comprises a pre-compactified material, for example with a density in a range of more than 95%, for example from 98 to 100%, particularly preferably from 99 to 99.999%, in each case based on the theoretical density of the nozzle material. Preferably, the nozzle material comprises a refractory metal, for example molybdenum, tungsten or a combination thereof with a further refractory metal. molybdenum is a particularly preferred nozzle material.

Preferably, a nozzle comprising molybdenum can have a density of 100% of the theoretical density. Preferably, the base plate comprised in a metal sheet crucible is thicker than the sides of the metal sheet crucible. Preferably, the base plate is made of the same material as the sides of the metal sheet crucible. Preferably, the base plate of the metal sheet crucible is not a rolled metal sheet. The base plate is for example 1.1 to 5000 times as thick or 2 to 1000 times as thick or 4 to 500 times as thick, particularly preferably 5 to 50 times as thick, each time compared with a wall of the metal sheet crucible.

According to another preferred embodiment of the first aspect of the invention, the oven comprises a hanging or a standing sinter crucible. The silicon dioxide granulate is introduced into the hanging or standing sinter crucible and warmed to obtain a glass melt.

A sinter crucible means a crucible which is made from a sinter material which comprises at least one sinter metal and has a density of not more than 96% of the theoretical density of the metal. Sinter metal means metals or alloys which are obtained by sintering of metal powders. The sinter material and the sinter metal in a sinter crucible are not rolled.

Preferably, the sinter material of the sinter crucible has a density of 85% or more of the theoretical density of the sinter material, for example a density from 85% to 95% or from 90% to 94%, particularly preferably from 91% to 93%.

Preferably, a sinter crucible is made by sintering the sinter material in a mould. The sinter crucible can be made in a mould as a whole. It is also possible for individual parts of the sinter crucible to be made in a mould and subsequently processed to obtain the sinter crucible. Preferably, the crucible is made out of more than one part, for example a base plate and one or more side parts. The side parts are preferably made in one piece, based on the circumference of the crucible. Preferably, the sinter crucible can be made of multiple side parts arranged on top of each other. Preferably, the side parts of the sinter crucible are sealed by means of screwing or by means of a tongue and groove connection. A screwing is preferably achieved by making side parts which have a thread at the borders. In the case of a tongue and groove connection, two side parts which are to be joined each have a notch at the borders into which tongue is introduced as the connecting third part, such that a form-closed connection is formed perpendicular to the plane of the crucible wall. Particularly preferably, a sinter crucible is made of more than one side part, for example of two or more side parts, particularly preferably of three or more side parts. Particularly preferably, the parts of the hanging sinter crucible are screwed. Particularly preferably, the parts of the standing sinter crucible are connected by means of a tongue and groove connection.

The base plate can in principle be connected with the crucible wall by any means known to the skilled person and which is suitable for this purpose. According to a preferred embodiment, the base plate has an outward thread and the base plate is connected with the crucible wall by being screwed into it. According to a further preferred embodiment, the base plate is connected with the crucible wall by means of screws. According to a further preferred embodiment, the base plate is suspended in the sinter crucible, for example by laying the base plate on an inward flange of the crucible wall. According to a further preferred embodiment, at least a part of the crucible wall and a compactified base plate are sintered in one piece. Particularly preferably, the base plate and the crucible wall of the hanging sinter crucible are screwed. Particularly preferably, the base plate and the crucible wall of the standing sinter crucible are connected by means of a tongue and groove connection.

Preferably, the base plate comprised by a sinter crucible is thicker than the sides, for example 1.1 to 20 times as thick or 1.2 to 10 times as thick or 1.5 to 7 times as thick, particularly preferably 2 to 5 times as thick. Preferably, the sides have a constant wall thickness over the circumference and over the height of the sinter crucible.

The sinter crucible has a nozzle. The nozzle is made of a nozzle material. Preferably, the nozzle material comprises a pre-compactified material, for example with a density in a range of more than 95%, for example from 98 to 100%, particularly preferably from 99 to 99.999%, in each case based on the theoretical density of the nozzle material. Preferably, the nozzle material comprises a refractory metal, for example molybdenum, tungsten or a combination therefrom with a refractory metal. Molybdenum is a particularly preferred nozzle material. Preferably, a nozzle comprising molybdenum can have a density of 100% of the theoretical density.

The hanging sinter crucible can be heated in any way known to the skilled person and which appears to him to be suitable. The hanging sinter crucible can for example be heated inductively or resistively. In the case of inductive heating, the energy is introduced directly via coils in the side wall of the sinter crucible and delivered from there to the inside of the crucible. In the case of resistive heating, the energy is introduced by radiation, whereby the solid surface is warmed from the outside and the energy is delivered from there to the inside. Preferably, the sinter crucible is heated inductively. In the case of resistive heating, the energy is introduced by radiation, whereby the solid surface is warmed from the outside and the energy is delivered from there to the inside. Preferably, the melting crucible is heated inductively.

According to a preferred embodiment of the present invention, the energy transfer into the melting crucible, in particular for melting a bulk material, is not performed by warming the melting crucible, or a bulk material present therein, or both, using a flame, such as for example a burner flame directed into the melting crucible or onto the melting crucible.

Preferably, the sinter crucible has one or more than one heating zones, for example one or two or three or more than three heating zones, preferably one or two or three heating zones, particularly preferably one heating zone. The heating zones of the sinter crucible can be brought up to the same temperature or different temperatures. For example, all heating zones can be brought up to one temperature, or all heating zones can be brought up to different temperatures, or two or more heating zones can be brought up to one temperature and one or more heating zones can, independently of each other, be brought up to other temperatures. Preferably, all heating zones are brought up to the different temperatures, for example the temperature of the heating zones increases in the direction of the material transport of the silicon dioxide granulate.

A hanging sinter crucible means a sinter crucible as previously described which is arranged hanging in an oven.

Preferably, the hanging sinter crucible has at least one, for example at least two or at least three or at least four, particularly preferably all of the following features:

{a} a hanging assembly, preferably a height adjustable hanging assembly;
{b} at least two rings sealed together as side parts, preferably at least two rings screwed to each other as side parts;
{c} a nozzle, preferably a nozzle which is permanently attached to the crucible;
{d} a mandrel, for example a mandrel fixed to the nozzle with pins or a mandrel fixed to the lid with a supporting rod or a mandrel attached underneath the crucible with a supporting rod;
{e} at least one gas inlet, e.g. in the form of a filling pipe or as a separate inlet, particularly preferably in the form of a filling pipe;
{f} at least one gas outlet, e.g. at the lid or in the wall of the crucible.
{g} A cooled jacket, particularly preferably a water cooled jacket;
{h} An insulation on the outside of the crucible, for example on the outside of the cooled jacket, preferably an insulation layer made of zirconium oxide.

The hanging assembly is preferably a hanging assembly which is installed during the construction of the hanging sinter crucible, for example a hanging assembly which is provided as an integral component of the crucible, particularly preferably a hanging assembly which is provided out of the sinter material as an integral component of the crucible. Furthermore, the hanging assembly is preferably a hanging assembly which is installed onto the sinter crucible and which is made of a material which is different to the sinter material, for example of aluminium, steel, iron, nickel or copper, preferably of copper, particularly preferably a cooled, for example a water cooled, hanging assembly made of copper which is installed on the sinter crucible.

By virtue of the hanging assembly, the hanging sinter crucible can be moved in the oven. Preferably, the crucible can be at least partially introduced and withdrawn from the oven. If different heating zones are present in the oven, their temperature profile will be transferred to the crucible which is present in the oven. By changing the position of the crucible in the oven, multiple heating zones, varying heating zones or multiple varying heating zones can be produced in the crucible.

A standing sinter crucible means a sinter crucible of the type previously described which is arranged standing in an oven.

Preferably, the standing sinter crucible has at least one, for example at least two or at least three or at least four, particularly preferably all of the following features:

/a/ A region formed as a standing area, preferably a region formed as a standing area on the base of the crucible, further preferably a region formed as a standing area in the base plate of the crucible, particularly preferably a region formed as a standing area at the outer edge of the base of the crucible;
/b/ at least two rings sealed together as side parts, preferably at least two rings sealed together by means of a tongue and groove connection as side parts;
/c/ a nozzle, preferably a nozzle which is permanently attached to the crucible, particularly preferably a region of the base of the crucible which is not formed as a standing area
/d/ a mandrel, for example a mandrel fixed to the nozzle with pins or a mandrel fixed to the lid with pins or a mandrel attached from underneath the crucible with supporting rod;

/e/ at least one gas inlet, e.g. in the form of a filling tube or as a separate inlet;
/f/ at least one gas outlet, e.g. as a separate outlet in the lid or in the wall of the crucible;
/g/ a lid.

The standing sinter crucible preferably has a separation of the gas compartments in the oven and in the region underneath the oven. The region underneath the oven means the region underneath the nozzle, in which the removed glass melt is present. Preferably, the gas compartments are separated by the surface on which the crucible stands. Gas which is present in the gas compartment of the oven between the inner wall of the oven and the outer wall of the crucible, cannot leak down into the region underneath the oven. The removed glass melt does not contact the gases from the gas compartment of the oven. Preferably, glass melts removed from an oven with a sinter crucible in a standing arrangement and quartz glass bodies formed therefrom have a higher surface purity than melts removed from an oven with a sinter crucible in a hanging arrangement and quartz glass bodies formed therefrom.

According to the invention, the melting crucible is made from at least one material comprising molybdenum, tungsten or a combination thereof. Preferably, the material comprises tungsten or molybdenum as a first metal. Furthermore, preferably, the sinter material additionally comprises at least one further refractory metal which is different to the first metal. The further refractory metal is particularly preferably selected from the group consisting of molybdenum, tungsten, rhenium, osmium, iridium, ruthenium or a combination of two or more thereof.

Preferably, the material comprises an alloy of molybdenum with a refractory metal, or an alloy of tungsten with a refractory metal. Particularly preferable alloy metals are rhenium, osmium, iridium, ruthenium or a combination of two or more thereof. According to a further example, the material comprises an alloy of molybdenum with tungsten, rhenium, osmium, iridium, ruthenium or a combination of two or more thereof. For example the material can comprise an alloy of tungsten with molybdenum, rhenium, osmium, iridium, ruthenium or a combination of two or more thereof.

According to a further preferred embodiment, the above described material can comprise a coating. Preferably, the coating comprises a refractory metal, in particular rhenium, osmium, iridium, ruthenium or a combination of two or more thereof. According to a preferred example, the coating comprises rhenium, osmium, iridium, ruthenium, molybdenum or tungsten, or a combination of two or more thereof. Preferably, the material has a coating on the inside of the crucible. The inside of the crucible means the surface of the sinter crucible facing the glass melt.

Preferably, the material and its coating have different compositions. An example is a material comprising molybdenum which is coated with one or more layers comprising ruthenium, tungsten or of a combination of two or more thereof. According to another example, a sinter material comprising tungsten is coated with one or more layers of ruthenium, molybdenum or of a combination thereof. According to another example, the material can be made of molybdenum alloyed with rhenium or of tungsten alloyed with rhenium, and coated on the inner side of the crucible with one or multiple layers comprising ruthenium or comprising a combination of two or more thereof.

Preferably, the sinter crucible has a coating on less than 10% of the surface facing the glass melt, for example on less than 5% or on less than 2% of the surface or on less than 1% of the surface. Particularly preferably, the sinter crucible does not have any coating on the surface facing the glass melt.

Preferably, the sinter crucible has a coating selected from a material comprising rhenium, iridium, osmium or a combination thereof on less than 10% of the surface facing the glass melt, for example on less than 5% or on less than 2% of the surface or on less than 1% of the surface.

According to a preferred embodiment, the sinter crucible does not have a coating selected from a material comprising rhenium, iridium, osmium or a combination thereof on the surface facing the glass melt.

Preferably, the crucible is connected with the inlet and the outlet of the oven in such a way that silicon dioxide granulate can enter into the crucible via the crucible inlet and through the inlet of the oven and glass melt can be removed through the outlet of the crucible and the outlet of the oven.

Preferably, the crucible comprises, in addition to the at least one inlet, at least one opening, preferably multiple openings, through which the gas can be introduced and removed. Preferably, the crucible comprises at least two openings, whereby at least one can be used as a gas inlet and at least one can be used as a gas outlet. Preferably, the use of at least one opening as gas inlet and at least one opening as gas outlet leads to a gas flow in the crucible.

The silicon dioxide granulate is introduced into the crucible through the inlet of the crucible and subsequently warmed in the crucible. The warming can be carried out in the presence of a gas or of a gas mixture of two or more gases. Furthermore, during the warming, water attached to the silicon dioxide granulate can transfer to the gas phase and form a further gas. The gas or the mixture of two or more gases is present in the gas compartment of the crucible. The gas compartment of the crucible means the region inside the crucible which is not occupied by a solid or liquid phase. Suitable gases are for example hydrogen, inert gases as well as two or more thereof.

Inert gases mean those gases which up to a temperature of 2400° C. do not react with the materials present in the crucible. Preferred inert gases are nitrogen, helium, neon, argon, krypton and xenon, particularly preferably argon and helium. Preferably, the warming is carried out in reducing atmosphere. This can be provided by means of hydrogen or a combination of hydrogen and an inert gas, for example a combination of hydrogen and helium, or of hydrogen and nitrogen, or of hydrogen and argon, particularly preferably a combination of hydrogen and helium.

Preferably, an at least partial gas exchange of air, oxygen and water in exchange for hydrogen, at least one inert gas, or in exchange for a combination of hydrogen and at least one inert gas is carried out on the silicon dioxide granulate. The at least partial gas exchange is carried out on the silicon dioxide granulate during introduction of the silicon dioxide granulate, or before the warming, or during the warming, or during at least two of the aforementioned activities. Preferably, the silicon dioxide granulate is warmed to melting in a gas flow of hydrogen and at least one inert gas, for example argon or helium.

Preferably, the dew point of the gas on exiting through the gas outlet is less than 0° C. The dew point means the temperature beneath which at fixed pressure a part of the gas or gas mixture in question condenses. In general, this means the condensation of water. The dew point is measured with a dew point mirror hygrometer according to the test method described in the methods section.

Preferably, the oven has at least one gas outlet, as does preferably also a melting crucible found therein, through which gas introduced into the oven and gas formed during the running of the oven is removed. The oven can additionally have at least one dedicated gas inlet. Alternatively or additionally, gas can be introduced through the inlet, also referred to as the solids inlet, for example together with the silicon dioxide particles, or beforehand, afterwards, or by a combination of two or more of the aforementioned possibilities.

Preferably, the gas which is removed from the oven through the gas outlet has a dew point of less than 0° C., for example of less than −10° C., or less than −20° C. on exiting from the oven through the gas outlet. The dew point is measured according to the test method described in the methods section at a slight overpressure of 5 to 20 mbar. A suitable measuring device is for example an "Optidew" device from the company Michell Instruments GmbH, D-61381 Friedrichsdorf.

The dew point of the gas is preferably measured at a measuring location at a distance of 10 cm or more from the gas outlet of the oven. Often, this distance is between 10 cm and 5 m. In this range of distances—here referred to as "on exiting"—the distance of the measuring location from the gas outlet of the oven is insignificant for the result of the dew point measurement. The gas is conveyed to the measurement location by fluid connection, for example in a hose or a tube. The temperature of the gas at the measurement location is often between 10 and 60° C., for example 20 to 50° C., in particular 20 to 30° C.

Suitable gases and gas mixtures have already been described. It was established in the context of separate tests that the above disclosed values apply to each of the named gases and gas mixtures.

According to a further preferred embodiment, the gas or gas mixture has a dew point of less than −50° C. prior to entering into the oven, in particular into the melting crucible, for example less than −60° C., or less than −70° C., or less than −80° C. A dew point commonly does not exceed −60° C. Also, the following ranges for the dew point upon entering into the oven are preferred: from −50 to −100° C.; from −60 to −100° C. and from −70 to −100° C.

According to a further preferred embodiment, the dew point of the gas prior to entering into the oven is at least 50° C. less than on exiting from the melting crucible, for example at least 60° C., or even 80° C. For measuring the dew point on exiting from the melting crucible, the above disclosures apply. For measuring the dew point prior to entry into the oven, the disclosures apply analogously. Since no source of contribution to moisture is present and there is no possibility of condensing out between the measuring location and the oven, the distance of the measuring location to the gas inlet of the oven is not relevant.

According to a preferred embodiment, the oven, in particular the melting crucible, is operated with a gas exchange rate in a range from 200 to 3000 L/h.

According to a preferred embodiment, the dew point is measured in a measuring cell, the measuring cell being separated by a membrane from the gas passing through the gas outlet. The membrane is preferably permeable to moisture. By these means, the measuring cell can be protected from dust and other particles present in the gas flow and which are conveyed out of the melting oven, in particular out of a melting crucible, along with the gas flow By these means, the working time of a measuring probe can be increased considerably. The working time means the time period of operation of the oven during which neither replacement of the measuring probe, nor cleaning of the measuring probe is required.

According to a preferred embodiment, a dew point mirror measuring device is employed.

The oven temperature for melting the silicon dioxide granulate is preferably in the range from 1700 to 2500° C., for example in the range from 1900 to 2400° C., particularly preferably in the range from 2100 to 2300° C.

Preferably, the holding time in the oven is in a range from 1 hour to 50 hours, for example 1 to 30 hours, particularly preferably 5 to 20 hours. In the context of the present invention, the holding time means the time which is required, when carrying out the process according to the invention, to remove the fill quantity of the melting oven from the melting oven in which the glass melt is formed, in a manner according to the invention. The fill quantity is the entire mass of silicon dioxide in the melting oven. In this connection, the silicon dioxide can be present as a solid and as a glass melt.

Preferably, the oven temperature increases over the length in the direction of the material transport. Preferably, the oven temperature increases over the length in the direction of the material transport by at least 100° C., for example by at least 300° C. or by at least 500° C. or by at least 700° C., particularly preferably by at least 1000° C.

Preferably, the maximum temperature in the oven is 1700 to 2500° C., for example 1900 to 2400° C., particularly preferably 2100 to 2300° C. The increase of the oven temperature can proceed uniformly or according to a temperature profile.

Preferably, the oven temperature decreases before the glass melt is removed from the oven. Preferably, the oven temperature decreases before the glass melt is removed from the oven by 50 to 500° C., for example by 100° C. or by 400° C., particularly preferably by 150 to 300° C. Preferably, the temperature of the glass melt on removal is 1750 to 2100° C., for example 1850 to 2050° C., particularly preferably 1900 to 2000° C.

Preferably, the oven temperature increases over the length in the direction of the material transport and decreases before the glass melt is removed from the oven. In this connection, the oven temperature preferably increases over the length in the direction of the material transport by at least 100° C., for example by at least 300° C. or by at least 500° C. or by at least 700° C., particularly preferably by at least 1000° C. Preferably, the maximum temperature in the oven is 1700 to 2500° C., for example 1900 to 2400° C., particularly preferably 2100 to 2300° C. Preferably, the oven temperature decreases before the glass melt is removed from the oven by 50 to 500° C., for example by 100° C. or by 400° C., particularly preferably by 150 to 300° C.

Pre-Beating Section

Preferably, the oven has at least a first and a further chamber joined to each other by a passage, the first and the further chamber having a different temperature, the temperature of the first chamber being lower than the temperature of the further chamber. In the further chamber, a glass melt is formed from the silicon dioxide granulate.

This chamber is referred to as melting chamber in the following. A chamber which is joined to the melting chambert via a duct but which is upstream of it is also referred to as pre-heating section. An example is those in which at least one outlet is directly connected with the inlet of the melting chamber. The arrangement above may also be made in independent ovens, in which case the melting chamber is a melting oven. In the further description, however, the term 'melting oven' may be taken as being identical to the term 'melting chamber': so what is said concerning the melting oven may also be taken as applying to the melting chamber and vice versa. The term 'pre-heating section' means the same in both cases.

Preferably, the silicon dioxide granulate has a temperature in a range from 20 to 1300° C. on entry into the oven.

According to a first embodiment, the silicon dioxide granulate is not tempered prior to entry into the melting chamber. The silicon dioxide granulate has for example a temperature in a range from 20 to 40° C. on entry into the oven, particularly preferably from 20 to 30° C. If silicon dioxide granulate II is provided according to step i.), it preferably has a temperature on entry into the oven in a range from 20 to 40° C., particularly preferably from 20 to 30° C.

According to another embodiment, the silicon dioxide granulate is tempered up to a temperature in a range from 40 to 1300° C. prior to entry into the oven. Tempering means setting the temperature to a selected value. The tempering can in principle be carried out in any way known to the skilled person and known for the tempering of silicon dioxide granulate. For example, the tempering can be carried out in an oven arranged separate from the melting chamber or in an oven connected to the melting chamber.

Preferably, the tempering is carried out in a chamber connected to the melting chamber. Preferably, the oven therefore comprises a pre-heating section in which the silicon dioxide can be tempered. Preferably, the pre-heating section is itself a feed oven, particularly preferably a rotary kiln. A feed oven means a heated chamber which, in operation, effects a movement of the silicon dioxide from an inlet of the feed oven to an outlet of the feed oven. Preferably, the outlet is directly connected to an inlet of the melting oven. In this way, the silicon dioxide granulate can arrive from the pre-heating section into the melting oven without further intermediate steps or means.

It is further preferred that the pre-heating section comprises at least one gas inlet and at least one gas outlet. Through the gas inlet, the gas can arrive in the interior, the gas chamber of the pre-heating section, and through the gas outlet it can be removed. It is also possible to introduce gas into the pre-heating section via the inlet of the pre-heating section for the silicon dioxide granulate. Also, gas can be removed via the outlet of the pre-heating section and subsequently separated from the silicon dioxide granulate. Furthermore, preferably, the gas can be introduced via the inlet for the silicon dioxide granulate and a gas inlet of the pre-heating section, and removed via the outlet of the pre-heating section and a gas outlet of the pre-heating section.

Preferably, a gas flow is produced in the pre-heating section by use of the gas inlet and of the gas outlet. Suitable gases are for example hydrogen, inert gases as well as two or more thereof. Preferred inert gases are nitrogen, helium, neon, argon, krypton and xenon, particularly preferably nitrogen and helium. Preferably, a reducing atmosphere is present in the pre-heating section. This can be provided in the form of hydrogen or a combination of hydrogen and an inert gas, for example a combination of hydrogen and helium or of hydrogen and nitrogen, particularly preferably a combination of hydrogen and helium. Furthermore, preferably, an oxidising atmosphere is present in the pre-heating section. This can preferably be provided in the form of oxygen or a combination of oxygen and one or more further gases, air being particularly preferable. Further preferably, it is possible of the silicon dioxide to be tempered at reduced pressure in the pre-heating section.

For example, the silicon dioxide granulate can have a temperature on entry into the oven in a range from 100 to 1100° C. or from 300 to 1000 or from 600 to 900° C. If silicon dioxide granulate II is provided according to step i.), it preferably has a temperature on entry into the oven in a range from 100 to 1100° C. or from 300 to 1000 or from 600 to 900° C.

According to a preferred embodiment of the first aspect of the invention, the oven comprises at least two chambers. Preferably, the oven comprises a first and at least one further chamber. The first and the further chamber are connected to each other by a passage.

The at least two chambers can in principle be arranged in the oven in any manner, preferably vertical or horizontal, particularly preferably vertical. Preferably, the chambers are arranged in the oven in such a way that on carrying out the process according to the first aspect of the invention, silicon dioxide granulate passes through the first chamber and is subsequently heated in the further chamber to obtain a glass melt. The further chamber preferably has the above described features of the melting oven and of the crucible arranged therein.

Preferably, each of the chambers comprises an inlet and an outlet. Preferably, the inlet of the oven is connected to the inlet of the first chamber via a passage. Preferably, the outlet of the oven is connected to the outlet of the further chamber via a passage. Preferably, the outlet of the first chamber is connected to the inlet of the further chamber via a passage.

Preferably, the chambers are arranged in such a manner that the silicon dioxide granulate can arrive in the first chamber through the inlet of the oven. Preferably, the chambers are arranged in such a manner that a silicon dioxide glass melt can be removed from the further chamber through the outlet of the oven. Particularly preferably, the silicon dioxide granulate can arrive in the first chamber through the inlet of the oven and a silicon dioxide glass melt can be removed from a further chamber through the outlet of the oven.

The silicon dioxide, in the form of granulate or powder, can go from a first into a further chamber through the passage in the direction of material transport as defined by the process. Reference to chambers connected by a passage includes arrangements in which further intermediate elements arrange in the direction of the material transport between a first and a further chamber. In principle, gases, liquids and solids can pass through the passage. Preferably, silicon dioxide powder, slurries of silicon dioxide powder and silicon dioxide granulate can pass through the passage between a first and a further chamber. Whilst the process according to the invention is carried out, all of the materials introduced into the first chamber can arrive in the further chamber via the passage between the first and the further chamber. Preferably, only silicon dioxide in the form of granulate or powder arrive in the further chamber via the passage between the first and the further chamber. Preferably, the passage between the first and the further chamber is closed up by the silicon dioxide, such that the gas chamber of the first and the further chamber are separated from each other, preferably such that in different gases or gas mixtures, different pressures or both can be present in the gas chambers. According to another preferred embodiment, the passage is formed of a gate, preferably a rotary gate valve.

Preferably, the first chamber of the oven has at least one gas inlet and at least one gas outlet. The gas inlet can in principle have any form which is known to the skilled person and which is suitable for introduction of a gas, for example a nozzle, a vent or a tube. The gas outlet can in principle have any form known to the skilled person and which is suitable for removal of a gas, for example a nozzle, a vent or a tube.

Preferably, silicon dioxide granulate is introduced into the first chamber through the inlet of the oven and warmed. The warming can be carried out in the presence of a gas or of a combination of two or more gases. To this end, the gas or the combination of two or more gases is present in the gas chamber of the first chamber. The gas chamber of the first chamber means the region of the first chamber which is not occupied by a solid or liquid phase. Suitable gases are for example hydrogen, oxygen, inert gases as well as two or more thereof. Preferred inert gases are nitrogen, helium, neon, argon, krypton and xenon, particularly preferred are nitrogen, helium and a combination thereof. Preferably, the warming is carried out in a reducing atmosphere. This can preferably be provided in the form of hydrogen or a combination of hydrogen and helium. Preferably, the silicon dioxide gramlate is warmed in the first chamber in a flow of the gas or of the combination of two or more gases.

It if further preferred that the silicon dioxide granulate is warmed in the first chamber at reduced pressure, for example at a pressure of less than 500 mbar or less than 300 mbar, for example 200 mbar or less.

Preferably, the first chamber has at least one device with which the silicon dioxide granulate is moved. In principle, all devices can be selected which are known to the skilled person for this purpose and which appear suitable.

Preferably, stirring, shaking and slewing devices.

According to a preferred embodiment of the first aspect of the invention, the temperatures in the first and in the further chamber are different. Preferably, the temperature in the first chamber is lower than the temperature in the further chamber. Preferably, the temperature difference between the first and the further chamber is in a range from 600 to 2400° C., for example in a range from 1000 to 2000° C. or from 1200 to 1800° C., particularly preferably in a range from 1500 to 1700° C. Furthermore, preferably, the temperature the first chamber is 600 to 2400° C., for example 1000 to 2000° C. or 1200 to 1800° C., particularly preferably 1500 to 1700° C. lower than the temperature in the further chamber.

According to a preferred embodiment, the first chamber of the oven is a pre-heating section, particularly preferably a pre-heating section as described above, which has the features as described above. Preferably, the pre-heating section is connected to the further chamber via a passage. Preferably, silicon dioxide goes from the pre-heating section via a passage into the further chamber. The passage between the pre-heating section and the further chamber can be closed off, so that no gases introduces into the pre-heating section go through the passage into the further chamber. Preferably, the passage between the pre-heating section and the further chamber is closed off, so that the silicon dioxide does not come into contact with water. The passage between the pre-heating section and the further chamber can be closed off, so that the gas chamber of the pre-heating section and the first chamber are separated from each other in such a way that different gases or gas mixtures, different pressures or both can be present in the gas chambers. A suitable passage is preferably as per the above described embodiments.

According to a further preferred embodiment, the first chamber of the oven is not a pre-heating section. For example, the first chamber can be a levelling chamber. A levelling chamber is a chamber of the oven in which variations in throughput in a pre-heating section upstream thereof, or throughput differences between a pre-heating section and the further chamber are levelled. For example, as described above a rotary kiln can be arranged upstream of the first chamber. This commonly has a throughput which can vary by an amount up to 6% of the average throughput. Preferably, silicon dioxide is held in a levelling chamber at the temperature at which it arrives in the levelling chamber.

It is also possible for the oven to have a first chamber and more than one further chambers, for example two further chambers or three further chambers or four further chambers or five further chambers or more than five further chambers, particularly preferably two further chambers. If the oven has two further chambers, the first chamber is preferably a pre-heating section, the first of the further chambers a levelling chamber and the second of the further chambers the melting chamber, based on the direction of the material transport.

According to a further preferred embodiment, an additive is present in the first chamber. The additive is preferably selected from the group consisting of halogens, inert gases, bases, oxygen or a combination of two or more thereof.

In principle, halogens in elemental form and halogen compounds are suitable additives. Preferred halogens are selected from the group consisting of chlorine, fluorine, chlorine containing compounds and fluorine containing compounds. Particularly preferable are elemental chlorine and hydrogen chloride.

In principle, all inert gases as well as mixtures of two or more thereof are suitable additives. Preferred inert gases are nitrogen, helium or a combination thereof.

In principle bases are also suitable additives. Preferred bases for use as additives are inorganic and organic bases.

Further, oxygen is a suitable additive. The oxygen is preferably present as an oxygen containing atmosphere, for example in combination with an inert gas or a mixture of two or more inert gases, particularly preferably in combination with nitrogen, helium or nitrogen and helium.

The first chamber can in principle comprise any material which is known to the skilled person and which is suitable for heating silicon dioxide. Preferably, the first chamber comprises at least one element selected from the group consisting of quartz glass, a refractory metal, aluminium and a combination of two or more thereof, particularly preferably, the first chamber comprises quartz glass or aluminium.

Preferably, the temperature in the first chamber does not exceed 600° C. if the first chamber comprises a polymer or aluminium. Preferably, the temperature in the first chamber is 100 to 1100° C., if the first chamber comprises quartz glass. Preferably, the first chamber comprises mainly quartz glass.

In the transportation of the silicon dioxides from the first chamber to the further chamber through the passage between the first and the further chamber, the silicon dioxide can in principle be present in any state. Preferably, the silicon dioxide is present as a solid, for example as particles, powder or granulate. According to a preferred embodiment of the first aspect of the invention, the transportation of the silicon dioxide from the first to the further chamber is carried out as granulate.

According to a further preferred embodiment, the further chamber is a crucible made of a metal sheet or of a sinter material, wherein the sinter material comprises a sinter metal, wherein the metal sheet or the sinter metal is selected from the group consisting of molybdenum, tungsten and a combination thereof.

The glass melt is removed from the oven through the outlet, preferably via a nozzle.

Step iii.)

A quartz glass body is made out of at least a part of the glass melt. For this, preferably at least a part of the glass melt made in step ii) is removed and the quartz glass body is made out of it.

The removal of the part of the glass melt made in step ii) can in principle be carried out continuously from the melting oven or the melting chamber or after the production of the glass melt has been finished. Preferably, a part of the glass melt is removed continuously. The glass melt is removed through the outlet of the oven or through the outlet of the melting chamber, in each case preferably via a nozzle.

The glass melt can be cooled before, during or after the removal, to a temperature which enables the forming of the glass melt. A rise in the viscosity of the glass melt is connected to the cooling of the glass melt. The glass melt is preferably cooled to such an extent that in the forming, the produced form holds and the forming is at the same time as easy and reliable as possible and can be carried out with little effort. The skilled person can easily establish the viscosity of the glass melt for forming by varying the temperature of the glass melt at the forming tool. Preferably, the glass melt has a temperature on removal in the range from 1750 to 2100° C., for example 1850 to 2050° C., particularly preferably 1900 to 2000° C. Preferably, the glass melt is cooled to a temperature of less than 500° C. after removal, for example of less than 200° C. or less than 100° C. or less than 50° C., particularly preferably to a temperature in the range from 20 to 30° C.

The quartz glass body which is formed can be a solid body or a hollow body. A solid body means a body which is mainly made out of a single material. Nevertheless, a solid body can have one or more inclusions, e.g. gas bubbles. Such inclusions in a solid body commonly have a size of 65 $mm^3$ or less, for example of less than 40 $mm^3$, or of less than 20 $mm^3$, or of less than 5 $mm^3$, or of less than 2 $mm^3$, particularly preferably of less than 0.5 $mm^3$. Preferably, a solid body comprises less than 0.02 vol.-% of its volume as inclusion, for example less than 0.01 vol.-% or less than 0.001 vol.-%, in each case based on the total volume of the solid body.

The quartz glass body has an exterior form. The exterior form means the form of the outer edge of the cross section of the quartz glass body. The exterior form of the quartz glass body in cross-section is preferably round, elliptical or polygonal with three or more corners, for example 4, 5, 6, 7 or 8 corners, particularly preferably the quartz glass body is round.

Preferably, the quartz glass body has a length in the range from 100 to 10000 mm, for example from 1000 to 4000 mm, particularly preferably from 1200 to 3000 mm.

Preferably, the quartz glass body has an exterior diameter in the range from 1 to 500 mm, for example in a range from 2 to 400 mm, particularly preferably in a range from 5 to 300 mm.

The forming of the quartz glass body is performed by means of a nozzle. The glass melt is sent through the nozzle. The exterior form of a quartz glass body formed through the nozzle is determined by the form of the nozzle opening. If the opening is round, a cylinder will be made in forming the quartz glass body. If the opening of the nozzle has a structure, this structure will be transferred to the exterior form of the quartz glass body. A quartz glass body which is made by means of a nozzle with structure at the opening, has an image of the structure in the length direction along the glass strand.

The nozzle is integrated in the melting oven. Preferably, it is integrated in the melting oven as part of the crucible, particularly preferably as part of the outlet of the crucible.

Preferably, the at least part of the glass melt is removed through the nozzle. The exterior form of the quartz glass body is formed by the removal of the at least part of the glass melt through the nozzle.

Preferably, the quartz glass body is cooled after the forming, so that it maintains its form. Preferably, the quartz glass body is cooled after the forming to a temperature which is at least 1000° C. below the temperature of the glass melt in the forming, for example at least 1500° C. or at least 1800° C., particularly preferably 1900 to 1950° C. Preferably, the quartz glass body is cooled to a temperature of less than 500° C., for example of less than 200° C. or less than 100° C. or less than 50° C., particularly preferably to a temperature in the range from 20 to 30° C.

According to a preferred embodiment of the first aspect of the invention, the obtained quartz glass body can be treated with at least one procedure selected from the group consisting of chemical, thermal or mechanical treatment.

Preferably, the quartz glass body is chemically post treated. Post treatment relates to treatment of a quartz glass body which has already been made. Chemical post treatment of the quartz glass body means in principle any procedure which is known to the skilled person and appears suitable for employing materials for changing the chemical structure of the composition of the surface of the quartz glass body, or both. Preferably, the chemical post treatment comprises at least one means selected from the group consisting of treatment with fluorine compounds and ultrasound cleaning.

Possible fluorine compounds are in particular hydrogen fluoride and fluorine containing acids, for example hydrofluoric acid. The liquid preferably has a content of fluorine compounds in a range from 35 to 55 wt.-%, preferably in a range from 35 to 45 wt.-%, the wt.-% in each case based on the total amount of liquid. The remainder up to 100 wt.-% is usually water. Preferably, the water is fully desalinated water or deionised water.

Ultrasound cleaning is preferably performed in a liquid bath, particularly preferably in the presence of detergents.

In the case of ultrasound cleaning, commonly no fluorine compounds, for example neither hydrofluoric acid nor hydrogen fluoride.

The ultrasound cleaning of the quartz glass body is preferably carried out under at least one, for example at least two or at least three or at least four or at least five, particularly preferably all of the following conditions:

The ultrasound cleaning performed in a continuous process.

The equipment for the ultrasound cleaning has six chambers connected to each other by tubes.

The holding time for the quartz glass body in each chamber can be set. Preferably, the holding time of the quartz glass body in each chamber is the same. Preferably, the holding time in each chamber is in a range from 1 to 120 min, for example of less than 5 min or from 1 to 5 min or from 2 to 4 min or of less than 60 min or from 10 to 60 min or from 20 to 50 min, particularly preferably in a range from 5 to 60 min.

The first chamber comprises a basic medium, preferably containing water and a base, and an ultrasound cleaner.

The third chamber comprises an acidic medium, preferably containing water and an acid, and an ultrasound cleaner.

In the second chamber and in the fourth to sixth chamber, the quartz glass body is cleaned with water, preferably with desalinated water.

The fourth to sixth chambers are operated with cascades of water. Preferably, the water is only introduced in the sixth chamber and funs from the sixth chamber into the fifth and from the fifth chamber into the fourth.

Preferably, the quartz glass body is thermally post treated. Thermal post treatment of the quartz glass body means in principle a procedure known to the skilled person and which appears suitable for changing the form or structure or both of the quartz glass body by means of temperature. Preferably, the thermal post treatment comprises at least a one means selected from the group consisting of tempering, compressing, inflating, drawing, welding, and a combination of two or more thereof. Preferably, the thermal post treatment is not performed for the purpose of removing material.

The tempering is preferably performed by heating the quartz glass body in an oven, preferably at a temperature in a range from 900 to 1300° C., for example in a range from 900 to 1250° C. or from 1040 to 1300° C., particularly preferably in a range from 1000 to 1050° C. or from 1200 to 1300° C. Preferably, in the thermal treatment, a temperature of 1300° C. is not exceeded for continuous period of more than 1 h, particularly preferably a temperature of 1300° C. is not exceeded during the entire duration of the thermal treatment. The tempering can in principle be performed at reduced pressure, at normal pressure or at increased pressure, preferably at reduced pressure, particularly preferably in a vacuum.

The compressing is preferably performed by heating the quartz glass body, preferably to a temperature of about 2100° C., and subsequent forming during a rotating turning motion, preferably with a rotation speed of about 60 rpm. For example, a quartz glass body in the form of a rod can be formed into a cylinder.

Preferably, a quartz glass body can be inflated by injecting a gas into the quartz glass body. For example, a quartz glass body can by formed into a large-diameter tube by inflating. For this, preferably the quartz glass body is heated to a temperature of about 2100° C., whilst a rotating turning motion is performed, preferably with a rotation speed of about 60 rpm, and the interior is flushed with a gas, preferably at a defined and controlled inner pressure of up to about 100 mbar. A large-diameter tube means a tube with an outer diameter of at least 500 mm.

A quartz glass body can preferably be drawn. The drawing is preferably performed by heating the quartz glass body, preferably to a temperature of about 2100° C., and subsequently pulling with a controlled pulling speed to the desired outer diameter of the quartz glass body. For example lamp tubes can be formed from quartz glass bodies by drawing.

Preferably, the quartz glass body is mechanically post treated. A mechanic post treatment of the quartz glass body means in principle any procedure known to the skilled person and which appears suitable for using an abrasive means to change the shape of the quartz glass body or to split the quartz glass body into multiple pieces. In particular, the mechanical post treatment comprises at least one means selected from the group consisting of grinding, drilling, honing, sawing, waterjet cutting, laser cutting, roughening by sandblasting, milling and a combination of two or more thereof.

Preferably, the quartz glass body is treated with a combination of these procedures, for example with a combination of a chemical and a thermal post treatment or a chemical and a mechanical post treatment or a thermal and a mechanical post treatment, particularly preferably with a combination of a chemical, a thermal and a mechanical post treatment. Furthermore, preferably, the quartz glass body can subjected to several of the above mentioned procedures, each independently from the others.

According to an embodiment of the first aspect of the invention, the process comprises the following process step:

iv.) Making a hollow body with at least one opening from the quartz glass body.

The hollow body which is made, has an interior and an exterior form. Interior form means the form of the inner edge of the cross section of the hollow body. The interior and exterior form in cross section of the hollow body can be the same or different. The interior and exterior form of the hollow body in cross section can be round, elliptical or polygonal with three or more corners, for example 4, 5, 6, 7 or 8 corners.

Preferably, the exterior form of the cross section corresponds to the interior form of the hollow body. Particularly preferably, the hollow body has in cross section a round interior and a round exterior form.

In another embodiment, the hollow body can differ in the interior and exterior form. Preferably, the hollow body has in cross section a round exterior form and a polygonal interior form. Particularly preferably, the hollow body in cross section has a round exterior form and a hexagonal interior form.

Preferably, the hollow body has a length in the range from 100 to 10000 mm, for example from 1000 to 4000 mm, particularly preferably from 1200 to 2000 mm.

Preferably, the hollow body has a wall thickness in a range from 0.8 to 50 mm, for example in a range from 1 to 40 mm or from 2 to 30 mm or from 3 to 20 mm, particularly preferably in a range from 4 to 10 mm.

Preferably, the hollow body has an outer diameter of 2.6 to 400 mm, for example in a range from 3.5 to 450 mm, particularly preferably in a range from 5 to 300 mm.

Preferably, the hollow body has an inner diameter of 1 to 300 mm, for example in a range from 5 to 280 mm or from 10 to 200 mm, particularly preferably in a range from 20 to 100 mm.

The hollow body comprises one or more openings. Preferably, the hollow body comprises one opening. Preferably, the hollow body has an even number of openings, for example 2, 4, 6, 8, 10, 12, 14, 16, 18 or 20 openings.

Preferably, the hollow body comprises two openings. Preferably, the hollow body is a tube. This form of the hollow body is particularly preferred if the light guide comprises only one core. The hollow body can comprise more than two openings. The openings are preferably located in pairs situated opposite each other at the ends of the quartz glass body. For example, each end of the quartz glass body can have 2, 3, 4, 5, 6, 7 or more than 7 openings, particularly preferably 5, 6 or 7 openings. Preferred forms are for example tubes, twin tubes, i.e. tubes with two parallel channels, and multi-channel tubes, i.e. Tubes with more than two parallel channels.

The hollow body can in principle be formed by any method known to the skilled person. Preferably, the hollow body is formed by means of a nozzle. Preferably, the nozzle comprises in the middle of its opening a device which deviates the glass melt in the forming. In this way, a hollow body can be formed from a glass melt.

A hollow body can be made by the use a nozzle and subsequent post treatment. Suitable post treatments are in principle all process known to the skilled person for making a hollow body out of a solid body, for example compressing channels, drilling, honing or grinding. Preferably, a suitable post treatment is to send the solid body over one or multiple mandrels, whereby a hollow body is formed. Also, the mandrel can be introduced into the solid body to make a hollow body. Preferably, the hollow body is cooled after the forming.

Preferably, the hollow body is cooled to a temperature of less than 500° C. after the forming, for example less than 200° C. or less than 100° C. or less than 50° C., particularly preferably to a temperature in the range from 20 to 30° C.

Pre-Compacting

It is in principle possible to subject the silicon dioxide granulate provided in step i.) to one or multiple pre-treatment steps, before it is warmed in step ii.) to obtain a glass melt. Possible pre-treatment steps are for example thermal or mechanical treatment steps. For example the silicon dioxide granulate can be compactified before the warming in step ii.). "Compacting" means a reduction in the BET surface area and a reduction of the pore volume.

The silicon dioxide granulate is preferably compactified by heating the silicon dioxide granulate or mechanically by exerting a pressure to the silicon dioxide granulate, for example rolling or pressing of the silicon dioxide granulate. Preferably, the silicon dioxide granulate is compactified by heating. Particularly preferably, the compacting of the silicon dioxide granulate is performed by heating by means of a pre-heating section which is connected to the melting oven.

Preferably, the silicon dioxide is compactified by heating at a temperature in a range from 800 to 1400° C., for example at a temperature in a range from 850 to 1300° C., particularly preferably at a temperature in a range from 900 to 1200° C.

In a preferred embodiment of the first aspect of the invention, the BET surface area of the silicon dioxide granulate is not reduced to less than 5 $m^2/g$ prior to the warming in step ii.), preferably not to less than 7 $m^2/g$ or not to less than 10 $m^2/g$, particularly preferably not to less than 15 $m^2/g$. Furthermore, it is preferred, that the BET surface area of the silicon dioxide granulate is not reduced prior to the warming in step ii.) compared with the silicon dioxide granulate provided in step i.).

In a preferred embodiment of the first aspect of the invention, the BET surface area of the silicon dioxide granulate is reduced to less than 20 $m^2/g$, for example to less than 15 $m^2/g$, or to less than 10 $m^2/g$, or to a range of more than 5 to less than 20 $m^2/g$ or from 7 to 15 $m^2/g$, particularly preferably to a range of 9 to 12 $m^2/g$. Preferably, the BET surface area of the silicon dioxide granulate is reduced prior to the heating in step ii.) in comparison to the silicon dioxide granulate provided in step i.) by less than 40 $m^2/g$, for example by 1 to 20 $m^2/g$ or by 2 to 10 $m^2/g$, particularly preferably by 3 to 8 $m^2/g$, the BET surface area after the compactification being more than 5 $m^2/g$.

The compactified silicon dioxide granulate is referred to in the following as silicon dioxide granulate III. Preferably, the silicon dioxide granulate III has at least one, for example at least two or at least three or at least four, particularly preferably at least five of the following features:

A. a BET surface area in a range of more than 5 to less than 40 $m^2/g$, for example from 10 to 30 $m^2/g$, particularly preferably in a range of 15 to 25 $m^2/g$,
B. a particle size $D_{10}$ in a range from 100 to 300 µm, particularly preferably in a range from 120 to 200 µm;
C. a particle size $D_{50}$ in a range from 150 to 550 µm, particularly preferably in a range from 200 to 350 µm;
D. a particle size $D_{90}$ in a range from 300 to 650 µm, particularly preferably in a range from 400 to 500 µm;
E. a bulk density in a range from 0.8 to 1.6 $g/cm^3$, particularly preferably from 1.0 to 1.4 $g/cm^3$;
F. a tamped density in a range from 1.0 to 1.4 $g/cm^3$, particularly preferably from 1.15 to 1.35 $g/cm^3$;
G. a carbon content of less than 5 ppm, for example of less than 4.5 ppm, particularly preferably of less than 4 ppm;
H. a Cl content of less than 500 ppm, particularly preferably from 1 ppb to 200 ppm, wherein the ppm and ppb are each based on the total weight of the silicon dioxide granulate III.

The silicon dioxide granulate III preferably has the feature combination A./F./J./G. or A./F./H. or A./J./G./J./H., further preferably the feature combination A./F./G./H.

The silicon dioxide granulate III preferably has the feature combination A./F./G., wherein the BET surface area is in a range from 10 to 30 $m^2/g$, the tamped density is in a range from 1.15 to 1.35 g/mL and the carbon content is less than 4 ppm.

The silicon dioxide granulate III preferably has the feature combination A./F./H., wherein the BET surface area is in a range from 10 to 30 m/g, the tamped density is in a range from 1.15 to 1.35 g/mL and the chlorine content is in a range from 1 ppb to 200 ppm.

The silicon dioxide granulate III preferably has the feature combination A./G./H., wherein the BET surface area is in a range from 10 to 30 $m^2/g$, the carbon content is less than 4 ppm and the chlorine content is in a range from 1 ppb to 200 ppm.

The silicon dioxide granulate III preferably has the feature combination A./F./G./H., wherein the BET surface area is in a range from 10 to 30 $m^2/g$, the tamped density is in a range from 1.15 to 1.35 g/mL, the carbon content is less than 4 ppm and the chlorine content is in a range from 1 ppb to 200 ppm.

Preferably, in at least one process step, a silicon component different to silicon dioxide is introduced. The introduction of silicon components different to silicon dioxide is also referred to in the following as Si-doping. In principle, the Si-doping can be performed in any process step. Preferably, the Si-doping is preferred in step i.) or in step ii.).

The silicon component which is different to silicon dioxide can in principle be introduced in any form, for example as a solid, as a liquid, as a gas, in solution or as a dispersion. Preferably, the silicon component different to silicon dioxide is introduced as a powder. Also, preferably, the silicon component different to silicon dioxide can be introduced as a liquid or as a gas.

The silicon component which is different to silicon dioxide is preferably introduced in an amount in a range from 1 to 100,000 ppm, for example in a range from 10 to 10,000 ppm or from 30 to 1000 ppm or in a range from 50 to 500 ppm, particularly preferably in a range from 80 to 200 ppm, further particularly preferably in a range from 200 to 300 ppm, in each case based on the total weight of silicon dioxide.

The silicon component which is different to silicon dioxide can be solid, liquid or gaseous. If it is solid, it preferably has a mean particle size of up to 10 mm, for example of up to 1000 µm of up to 400 µm or in a range from 1 to 400 µm, for example 2 to 200 µm or 3 to 100 µm, particularly preferably in a range from 5 to 50 µm. The particle size values are based on the state of the silicon component which is different to silicon dioxide at room temperature.

The silicon component preferably has a purity of at least 99.5 wt.-%, for example at least 99.8 wt.-% or at least 99.9 wt.-%, or at least 99.99 wt.-%, particularly preferably at least 99.999 wt.-%, in each case based on the total weight of the silicon component. Preferably, the silicon component has a carbon content of not more than 10 ppm, for example not more than 50 ppm, particularly preferably not more than 1 ppm, in each case based on the total weight the silicon component. Particularly preferably, this applies to silicon employed as the silicon component. Preferably, the silicon component has an amount of impurities selected from the group consisting of Al, Ca, Co, Cr, Cu, Fe, Ge, Hf, K, Li, Mg, Mn, Mo, Na, Nb, Ni, Ti, V, W, Zn, Zr of not more than 250 ppm, for example not more than 150 ppm, particularly preferably not more than 100 ppm, in each case based on the total weight of the silicon component. Particularly preferably, this applies where silicon is employed as the silicon component.

Preferably, a silicon component which is different to silicon dioxide is introduced in process step i.). Preferably, the silicon component which is different to silicon dioxide is introduced during the processing of the silicon dioxide powder to obtain a silicon dioxide granulate (step II.). For example the silicon component which is different to silicon dioxide can be introduced before, during or after the granulation.

Preferably, the silicon dioxide can be Si-doped by introducing the silicon component which is different to silicon dioxide to the slurry comprising silicon dioxide powder. For example, the silicon component which is different to silicon dioxide can be mixed with silicon dioxide powder and subsequently slurried, or the silicon component which is different to silicon dioxide can be introduced into a slurry of silicon dioxide powder a liquid and then slurried, or the silicon dioxide powder can be introduced into a slurry or solution of the silicon component which is different to silicon dioxide in a liquid and then slurried.

Preferably, the silicon dioxide can be Si-doped by introduction of the silicon component which is different to silicon dioxide during granulation. It is in principle possible to introduce the silicon component which is different to silicon dioxide at any point in time during the granulation. In the case of spray granulation, the silicon component which is different to silicon dioxide can for example be sprayed through the nozzle into the spray tower together with the slurry. In the case of roll granulation, the silicon component which is different to silicon dioxide can preferably be introduced in solid form or as a slurry, for example after introducing the slurry into the stirring vessel.

Furthermore, preferably, the silicon dioxide can be Si-doped by introduction of the silicon component which is different to silicon dioxide after the granulation. For example, the silicon dioxide can be doped during the treatment of the silicon dioxide granulate I to obtain silicon dioxide granulate II, preferably by introducing the silicon component which is different to silicon dioxide during the thermal or mechanical treatment of the silicon dioxide granlate I.

Preferably, the silicon dioxide granulate II is doped with the silicon component which is different to silicon dioxide.

Furthermore, preferably, the silicon component which is different to silicon dioxide can also be introduced during several of the above mentioned sections, in particular during and after the thermal or mechanical treatment of the silicon dioxide granulate I to obtain the silicon dioxide granulate II.

The silicon component which is different to silicon dioxide can in principle be silicon or any silicon containing compound known to the skilled person and which has a reducing effect. Preferably, the silicon component which is different to silicon dioxide is silicon, a silicon-hydrogen compound, for example a silane, a silicon-oxygen compound, for example silicon monoxide, or a silicon-hydrogen-oxygen compound, for example disiloxane. Examples of preferred silanes are monosilane, disilane, trisilane, tetrasilane, pentasilane, hexasilane, heptasilane, higher homologous compounds as well as isomers of the aforementioned, and cyclic silanes like cyclopentasilane.

Preferably, a silicon component which is different to silicon dioxide is introduced in process step ii.).

Preferably, the silicon component which is different to silicon dioxide can be introduced directly into the melting crucible with the silicon dioxide granulate. Preferably, silicon as the silicon component which is different from silicon dioxide can be introduced into the melting crucible with the silicon dioxide granulate. The silicon is preferably introduced as powder, in particular with the particle size previously given for the silicon component which is different to silicon dioxide.

Preferably, the silicon component which is different to silicon dioxide is added to the silicon dioxide granulate before introduction into the melting crucible. The addition can in principle be performed at any time after the formation of the granulate, for example in the pre-heating section, before or during the pre-compacting of the silicon dioxide granulate II, or to the silicon dioxide granulate III.

A silicon dioxide granulate obtained by addition of a silicon component which is different to silicon dioxide is referred to in the following as "Si-doped granulate". Preferably, the Si-doped granulate has at least one, for example at least two or at least three or at least four, particularly preferably at least five of the following features:

[1] a BET surface area in a range of more than 5 to less than 40 m$^2$/g, for example from 10 to 30 m$^2$/g, particularly preferably in a range from 15 to 25 m$^2$/g;
[2] a particle size $D_{10}$ in a range from 100 to 300 μm, particularly preferably in a range from 120 to 200 μm;
[3] a particle size $D_{50}$ in a range from 150 to 550 μm, particularly preferably in a range from 200 to 350 μm;
[4] a particle size $D_{90}$ in a rage from 300 to 650 μm, particularly preferably in a range from 400 to 500 μm;
[5] a bulk density in a range from 0.8 to 1.6 g/cm$^3$, particularly preferably from 1.0 to 1.4 g/cm$^3$;
[6] a tamped density in a range from 1.0 to 1.4 g/cm$^3$, particularly preferably from 1.15 to 1.35 g/cm$^3$;
[7] a carbon content of less than 5 ppm, for example of less than 4.5 ppm, particularly preferably of less than 4 ppm;
[8] a Cl content of less than 500 ppm, particularly preferably from 1 ppb to 200 ppm;
[9] an Al content of less than 200 ppb, particularly preferably from 1 ppb to 100 ppb;
[10] a metal content of metals which are different to aluminium, of less than 1000 ppb, for example in a range from 1 to 400 ppb, particularly preferably in a range from 1 to 200 ppb;
[11] a residual moisture content of less than 3 wt.-%, for example in a range from 0.001 wt.-% to 2 wt.-%, particularly preferably from 0.01 to 1 wt.-%;
wherein the wt.-%, ppm and ppb are each based on the total weight of the Si-doped granulate.

In a preferred embodiment of the first aspect of the invention, the melting energy is transferred to the silicon dioxide granulate via a solid surface.

A solid surface means a surface which is different to the surface of the silicon dioxide granulate and which does not melt or collapse at the temperatures to which the silicon dioxide granulate is heated for melting. Suitable materials for the solid surface are for example the materials which are suitable as crucible material.

The solid surface can in principle be any surface which is known to the skilled person and which is suitable for this purpose. For example the crucible or a separate component which is not the crucible can be used as the solid surface.

The solid surface can in principle be heated in any manner known to the skilled person and which is suitable for this purpose, in order to transfer the melting energy to the silicon dioxide granulate. Preferably, the solid surface is heated by resistive heating or inductive heating. In the case of inductive heating, the energy is directly coupled into the solid surface by means of coils and delivered from there to its inner side. In the case of resistive heating, the solid surface is warmed from the outer side and passes the energy from there to its inner side. In this connection, a heating chamber gas with low heat capacity is advantageous, for example an argon atmosphere or an argon containing atmosphere. For example, the solid surface can be heated electrically or also by firing the solid surface with a flame from the outside. Preferably, the solid surface is heated to a temperature which can transfer an amount of energy to the silicon dioxide granulate and/or part melted silicon dioxide granulate which is sufficient for melting the silicon dioxide granulate.

According to a preferred embodiment of the present invention, the energy transfer into the crucible is not performed by warming the crucible, or a bulk material present therein, or both, using a flame, such as for example a burner flame directed into the crucible or onto the crucible.

If a separate component is used as the solid surface, this can be brought into contact with the silicon dioxide granulate in any manner, for example by laying the component on the silicon dioxide granulate or by introducing the component between the granules of the silicon dioxide granulate or by inserting the component between the crucible and the silicon dioxide granulate or by a combination of two or more thereof. The component can be heated before, or during or before and during the transfer of the melting energy..

Preferably, the melting energy is transferred to the silicon dioxide granulate via the inner side of the crucible. In this case, the crucible is heated enough so that the silicon dioxide granulate melts. The crucible is preferably heated resistively or inductively. The warmth is transferred from the outer side to the inner side of the crucible. The solid surface of the inner side of the crucible transfers the melting energy to the silicon dioxide granulate.

According to a further preferred embodiment of the present invention, the melting energy is not transferred to the silicon dioxide granulate via a gas compartment. Furthermore, preferably, the melting energy is not transferred to the silicon dioxide granulate by firing of the silicon dioxide granulate with a flame. Examples of these excluded means of transferring energy are directing one or multiple burner flames from above in the melting crucible, or onto the silicon dioxide, or both.

The above described process according to the first aspect of the invention relates to the preparation of a quartz glass body with the following characteristics:
- A] an OH content of less than 500 ppm, for example of less than 400 ppm, particularly preferably of less than 300 ppm;
- B] a chlorine content of less than 60 ppm, preferably of less than 40 ppm, for example of less than 20 ppm, or less than 2 ppm, particularly preferably less than 0.5 ppm, particularly preferably less than 0.1 ppm;
- C] a tungsten content of less than 1000 ppb, for example of less than 500 ppb or of less than 300 ppb or less than 100 ppb or in a range from 1 to 500 ppb or from 1 to 300 ppb, particularly preferably in a range from 1 to 100 ppb;
- D] a molybdenum content of less than 1000 ppb, for example of less than 500 ppb or of less than 300 ppb or of less than 100 ppb or in a range from 1 to 500 ppb or from 1 to 300 ppb, particularly preferably in a range from 1 to 100 ppb, wherein the ppb and ppm are each based on the total weight of the quartz glass body.

Preferably, the quartz glass body has at least one of the following features, for example at least two or at least three or at least four, particularly preferably at least five of the following features;
- E] An aluminium content of less than 200 ppb, for example of less than 100 ppb, particularly preferably of less than 80 ppb;
- F] An ODC content of less than $5 \cdot 10^{15}/cm^3$, for example in a range from $0.1 \cdot 10^{15}$ to $3 \cdot 10^{15}/cm^3$, particularly preferably in a range from $0.5 \cdot 10^{15}$ to $2.0 \cdot 10^{15}/cm^3$;
- G] A metal content of metals which are different from aluminium of less than 1 ppm, for example of less than 0.5 ppm, particularly preferably of less than 0.1 ppm;
- H] A viscosity (p=1013 hPa) in a range from $\log_{10} (\eta (1250°\ C.)/dPas)=11.4$ to $\log_{10} (\eta (1250°\ C.)/dPas)= 12.9$ and/or $\log_{10} (\eta (1300°\ C.)/dPas)=11.1$ to $\log_{10} (\eta (1300°\ C.)/dPas)=12.2$ and/or $\log_{10} (\eta (1350°\ C.)/dPas)=10.5$ to $\log_{10} (\eta (1350°\ C.)/dPas)=11.5$;
- I] A standard deviation of the OH content of not more than 10%, preferably not more than 5%, based on the OH content A] of the quartz glass body;
- J] A standard deviation of the chlorine content of not more than 10% preferably not more than 5%, based on the chlorine content B] of the quartz glass body;
- K] A standard deviation of the aluminium content of not more than 10%, preferably not more than 5%, based on the aluminium content E] of the quartz glass body;
- L] A refractive index homogeneity of less than $10^{-4}$;
- M] A cylindrical form;

wherein the ppb and ppm are based on the total weight of the quartz glass body in each case.

Preferably, the quartz glass body has a metal content of metals different to aluminium of less than 1000 ppb, for example of less than 500 ppb, particularly preferably of less than 100 ppb, in each case based on the total weight of the quartz glass body. Often however, the quartz glass body has a content of metals different to aluminium of at least 1 ppb. Such metals are for example sodium, lithium, potassium, magnesium, calcium, strontium, germanium, copper, molybdenum, titanium, iron and chromium. This can for example be present as an element, as an ion, or as part of a molecule or of an ion or of a complex.

The quartz glass body can comprise further constituents. Preferably, the quartz glass body comprises less than 500 ppm, for example less than 450 ppm, particularly preferably less than 400 ppm of further constituents, the ppm in each case being base on the total weight of the quartz glass body. Possible other constituents are for example carbon, fluorine, iodine, bromine and phosphorus. These can for example be present as an element, as an ion or as part of a molecule, an ion or a complex. Often however, the quartz glass body has a content of further constituents of at least 1 ppb.

Preferably, the quartz glass body comprises less than 5 ppm carbon, for example less than 4.5 ppm, particularly preferably less than 4 ppm, in each case based on the total weight of the quartz glass body. Often however, the quartz glass body has a carbon content of at least 1 ppb.

Preferably, the quartz glass body has a homogeneously distributed OH content, Cl content or Al content. An indicator of the homogeneity of the quartz glass body can be expressed as the standard deviation of OH content, Cl content or Al content. The standard deviation is the measure of the spread of the values of a variable from their arithmetic mean, here the OH content, chlorine content or aluminium content. For measuring the standard deviation, the content in the sample of the component in question e.g. OH, chlorine or aluminium, is measured at least seven measuring locations.

The quartz glass body preferably has the feature combination A]-D]/E] or A]-D]/F] or A]-D]/H], further preferred the feature combination A]-D]/E]/F] or A]-D]/E]/H] or A]-D]/F]/H], further preferably the feature combination A]-D]/E]/F]/H].

The quartz glass body preferably has the feature combination A]-D]/E], wherein the OH content is less than 400 ppm, the chlorine content is less than 40 ppm, the tungsten content is less than 300 ppb, the molybdenum content is less than 300 ppb and the aluminium content is less than 80 ppb.

The quartz glass body preferably has the feature combination A]-D]/F], the OH content is less than 400 ppm, the chlorine content is less than 40 ppm, the tungsten content is less than 300 ppb, the molybdenum content is less than 300 ppb and the ODC content is in a range from $0.1 \cdot 10^{15}$ to $3 \cdot 10^{15}/cm^3$.

The quartz glass body preferably has the feature combination A]-D]/H], wherein the OH content is less than 400 ppm, the chlorine content is less than 40 ppm, the tungsten content is less than 300 ppb, the molybdenum content is less than 300 ppb and the viscosity (p=1013 hPa) is in a range from $\log_{10}(\eta\ (1250°\ C.)/dPas)=11.4$ to $\log_{10}(\eta\ (1250°\ C.)/dPas)=12.9$.

The quartz glass body preferably has the feature combination A]-D]/E]/F], wherein the OH content is less than 400 ppm, the chlorine content is less than 40 ppm, the tungsten content is less than 300 ppb, the molybdenum content is less than 300 ppb, the aluminium content is less than 80 ppb and the ODC content is in a range from $0.1 \cdot 10^{15}$ to $3 \cdot 10^{15}/cm^3$.

The quartz glass body preferably has the feature combination A]-D]/E]/H], wherein the OH content is less than 400 ppm, the chlorine content is less than 40 ppm, the tungsten content is less than 300 ppb, the molybdenum content is less than 300 ppb, the aluminium content is less than 80 ppb and the viscosity (p=1013 hPa) is in a range from $\log_{10}(\eta\ (1250°\ C.)/dPas)=11.4$ to $\log_{10}(\eta\ (1250°\ C.)/dPas)=12.9$.

The quartz glass body preferably has the feature combination A]-D]/F]/H], wherein the OH content is less than 400 ppm, the chlorine content is less than 40 ppm, the tungsten content is less than 300 ppb, the molybdenum content is less than 300 ppb, the ODC content is in a range from $0.1 \cdot 10^{15}$ to $3 \cdot 10^{15}/cm^3$ and the viscosity (p=1013 hPa) is in a range from $\log_{10}(\eta\ (1250°\ C.)/dPas)=11.4$ to $\log_{10}(\eta\ (1250°\ C.)/dPas)=12.9$.

The quartz glass body preferably has the feature combination A]-D]/E]/F]/H], wherein the OH content is less than 400 ppm, the chlorine content is less than 40 ppm, the tungsten content is less than 300 ppb, the molybdenum content is less than 300 ppb, the aluminium content is less than 80 ppb and the ODC content is in a range from $0.1 \cdot 10^{15}$ to $3 \cdot 10^{15}/cm^3$ and the viscosity (p=1013 hPa) is in a range from $\log_{10}(\eta\ (1250°\ C.)/dPas)=11.4$ to $\log_{10}(\eta\ (1250°\ C.)/dPas)=12.9$.

A second aspect of the present invention is a quartz glass body obtainable by the process according to the first aspect of the invention.

According to the invention, the quartz glass body has the following features:

A] an OH content of less than 500 ppm, for example of less than 400 ppm, particularly preferably of less than 300 ppm;

B] a chlorine content of less than 60 ppm, preferably of less than 40 ppm, for example of less than 40 ppm, or less than 2 ppm, or less than 0.5 ppm particularly preferably of less than 0.1 ppm;

C] a tungsten content of less than 1000 ppb, for example of less than 500 ppb or of less than 300 ppb or of less than 100 ppb or in a range from 1 to 500 ppb or from 1 to 300 ppb, particularly preferably in a range from 1 to 100 ppb;

D] a molybdenum content of less than 1000 ppb, for example of less than 500 ppb or of less than 300 ppb or of less than 100 ppb or in a range from 1 to 500 ppb or from 1 to 300 ppb, particularly preferably in a range from 1 to 100 ppb, wherein the ppb and ppm are each based on the total weight of the quartz glass body.

Preferably, the quartz glass body has at least one of the following features, for example at least two or at least three or at least four, particularly preferably at least five of the following features:

E] an aluminium content of less than 200 ppb, for example of less than 100 ppb, particularly preferably of less than 80 ppb;

F] an ODC content of less than $5 \cdot 10^{15}/cm^3$, for example in a range from $0.1 \times 10^{15}$ to $3 \times 10^{15}/cm^3$, particularly preferably in a range from $0.5 \times 10^{15}$ to $2.0 \times 10^{15}/cm^3$;

G] a metal content of metals which are different from aluminium of less than 1 ppm, for example of less than 0.5 ppm, particularly preferably of less than 0.1 ppm;

H] a viscosity (p=1013 hPa) in a range from $\log_{10}(\eta\ (1250°\ C.)/dPas)=11.4$ to $\log_{10}(\eta\ (1250°\ C.)/dPas)=12.9$ and/or $\log_{10}(\eta\ (1300°\ C.)/dPas)=11.1$ to $\log_{10}(\eta\ (1300°\ C.)/dPas)=12.2$ and/or $\log_{10}(\eta\ (1350°\ C.)/dPas)=10.5$ to $\log_{10}(\eta\ (1350°\ C.)/dPas)=11.5$;

I] a standard deviation of the OH content of not more than 10%, preferably not more than 5% based on the OH content A] of the quartz glass body;

J] a standard deviation of the chlorine content of not more than 10%, preferably not more than 5%, based on the chlorine content B] of the quartz glass body;

K] a standard deviation of the aluminium content of not more than 10%, preferably not more than 5%, based on the aluminium content E] of the quartz glass body;

L] a refractive index homogeneity of less than $1*10^{-4}$;

M] a cylindrical form;

wherein the ppb and ppm are each based on the total weight of the quartz glass body.

A third aspect of the present invention is a quartz glass body comprising pyrogenic silicon dioxide, wherein the quartz glass body has the following characteristics:

A] an OH content of less than 500 ppm;

B] a chlorine content of less than 60 ppm;

C] a tungsten content of less than 1000 ppb, for example of less than 500 ppb or of less than 300 ppb or of less than 100 ppb or in a range from 1 to 500 ppb or von I to 300 ppb, particularly preferably in a range from 1 to 100 ppb;

D] a molybdenum content of less than 1000 ppb, for example of less than 500 ppb or of less than 300 ppb or of less than 100 ppb or in a range from 1 to 500 ppb or from 1 to 300 ppb, particularly preferably in a range from 1 to 100 ppb;

wherein the ppb and ppm are based on the total weight of the quartz glass body in each case.

Preferably, the quartz glass body has at least one of the following features, for example at least two or at least three or at least four, particularly preferably at least five of the following features:

E] an aluminium content of less than 200 ppb, for example of less than 100 ppb, particularly preferably of less than 80 ppb;

F] an ODC content of less than $5 \cdot 10^{15}/cm^3$, for example in a range from $0.1 \times 10^{15}$ to $3 \times 10^{15}/cm^3$, particularly preferably in a range from $0.5 \times 10^{15}$ to $2.0 \times 10^{15}/cm^3$;

G] a metal content of metals which are different from aluminium of less than 1 ppm, for example of less than 0.5 ppm, particularly preferably of less than 0.1 ppm;

H] a viscosity (p=1013 hPa) in a range from $\log_{10}$ ($\eta$ (1250° C.)/dPas)=11.4 to $\log_{10}$ ($\eta$ (1250° C.)/dPas)= 12.9 and/or $\log_{10}$ ($\eta$ (1300° C.)/dPas)=11.1 to $\log_{10}$ ($\eta$ (1300° C.)/dPas)=12.2 and/or $\log_{10}$ ($\eta$ (1350° C.)/dPas)=10.5 to $\log_{10}$ ($\eta$ (1350° C.)/dPas)=11.5;

I] a standard deviation of the OH content of not more than 10%, preferably not more than 5%, based on the OH content A] of the quartz glass body;

J] a standard deviation of the chlorine content of not more than 10%, preferably not more than 5%, based on the chlorine content B] of the quartz glass body;

K] a standard deviation of the aluminium content of not more than 10%, preferably not more than 5% based on the aluminium content E] of the quartz glass body;

L] a refractive index homogeneity of less than $1*10^{-4}$;

M] a cylindrical form;

wherein the ppb and ppm are each based on the total weight of the quartz glass body.

A fourth aspect of the present invention is a process for the peparation of a light guide comprising the following steps:

A/ Providing

A1/ a hollow body with at least one opening obtainable by a process according to the first aspect of the invention comprising step iv.), or A2/ a quartz glass body according to the third aspect of the invention, wherein the quartz glass body is first processed to obtain a hollow body with at least one opening, B/ Introduction of one or multiple core rods into the quartz glass body through the at least one opening to obtain a precursor, C/ Drawing the precursor from step B/ in the warm to obtain a light guide with one or multiple cores and a jacket M1.

Step A/

The quartz glass body provided in step A/ is a hollow body with at least one opening. The quartz glass body provided in step A/ is preferably characterised by the features according to the third aspect of the invention. The quartz glass body provided in step A/ is preferably obtainable by a process according to the first aspect of the invention comprising as step iv.) the preparation of a hollow body out of the quartz glass body. Particularly preferably, the quartz glass body thus obtained has the features according to the third aspect of the invention.

Step B/

One or multiple core rods are introduced through the at least one opening of the quartz glass body (step B/). A core rod in the context of the present invention means an object which is designed to be introduced into a jacket, for example a jacket M1, and processed to obtain a light guide. The core rod has a core of quartz glass. Preferably, the core rod comprises a core of quartz glass and jacket layer M0 which surrounds the core.

Each core rod has a form which is selected such that it fits into the quartz glass body. Preferably, the exterior form of the core rod corresponds to the form of the opening of the quartz glass body. Particularly preferably, the quartz glass body is a tube and the core rod is a rod with a round cross section.

The diameter of the core rod is smaller than the inner diameter of the hollow body. Preferably, the diameter of the core rod is 0.1 to 3 mm smaller than the inner diameter of the hollow body, for example 0.3 to 2.5 mm smaller or 0.5 to 2 mm smaller or 0.7 to 1.5 mm smaller, particularly preferably 0.8 to 1.2 mm smaller.

Preferably, the ratio of the inner diameter of the quartz glass body to the diameter of the core rod is in the range from 2:1 to 1.0001:1, for example in the range from 1.8:1 to 1.01:1 or in the range from 1.6:1 to 1.005:1 or in the range from 1.4:1 to 1.01:1, particularly preferably in the range from 1.2:1 to 1.05:1.

Preferably, a region inside the quartz glass body which is not filled by the core rod can be filled with at least one further component, for example with a silicon dioxide powder or with a silicon dioxide granulate.

It is also possible for a core rod which is already present in a further quartz glass body to be introduced into a quartz glass body. The further quartz glass body in this case has an outer diameter which is smaller than the inner diameter of the quartz glass body. The core rod which is introduced into the quartz glass body can also be present in two or more further quartz glass bodies, for example in 3 or 4 or 5 or 6 or more further quartz glass bodies. A quartz glass body with one or multiple core rods obtainable in this way will be referred to in the following as "precursor".

Step C/

The precursor is drawn in the warm (step C/). The obtained product is a light guide with one or multiple cores and at least one jacket M1.

Preferably, the drawing of the precursor is performed with a speed in the range from 1 to 100 m/h, for example with a speed in the range from 2 to 50 m/h or from 3 to 30 m/h. Particularly preferably, the drawing of the quartz glass body is performed with a speed in the range from 5 to 25 m/h.

Preferably, the drawing is performed in the warm at a temperature of up to 2500° C., for example at a temperature in the range from 1700 to 2400° C., particularly preferably at a temperature in the range from 2100 to 2300° C.

Preferably, the precursor is sent through an oven which heats the precursor from the outside.

Preferably, the precursor is stretched until the desired thickness of the light guide is achieved. Preferably, the precursor is stretched to 1,000 to 6,000,000 times the length, for example to 10,000 to 500,000 times the length or to 30,000 to 200,000 times the length, in each case based on the length of the quartz glass body provided in step A/. Particularly preferably, the precursor is stretched to 100,000 to 10,000,000 times the length, for example to 150,000 to 5,800,000 times the length or to 160,000 to 640,000 times the length or to 1,440,000 to 5,760,000 times the length or to 1,440,000 to 2,560,000 times the length, in each case based on the length of the quartz glass body provided in step A/.

Preferably, the diameter of the precursor is reduced by the stretching by a factor in a range from 100 to 3,500, for example in a range from 300 to 3,000 or from 400 to 800 or from 1,200 to 2,400 or from 1,200 to 1,600, in each case based on the diameter of the quartz glass body provided in step A/.

The light guide, also referred to as light wave guide, can comprises any material which is suitable for conducting or guiding electromagnetic radiation, in particular light.

Conducting or guiding radiation means propagating the radiation over the length extension of the light guide without significant obstruction or attenuation of the intensity of the radiation. For this, the radiation is coupled into the guide via one end of the light guide. Preferably, the light guide conducts electromagnetic radiation in a wavelength range from 170 to 5000 nm. Preferably, the attenuation of the radiation by the light guide in the wavelength range in question is in a range from 0.1 to 10 dB/km. Preferably, the light guide has a transfer rate of up to 50 Tbit/s.

Der light guide preferably has a curl parameter of more than 6 min. The curl parameter in the context of the invention means the bending radius of a fibre, e.g. of a light guide or of a jacket M1, which is present as a freely moving fibre free from external forces.

The light guide is preferably made to be pliable. Pliable in the context of the invention means that the light guide is characterised by a bending radius of 20 mm or less, for example of 10 mm or less, particularly preferably less than 5 mm or less. A bending radius means the smallest radius which can be formed without fracturing the light guide and without impairing the ability of the light guide to conduct radiation. An impairment is present where there is attenuation of more than 0.1 dB of light sent through a bend in the light guide. The attenuation is preferably mentioned at a reference wavelength of 1550 nm.

Preferably, the quartz is composed of silicon dioxide with less than 1 wt.-% of other substances, for example with less than 0.5 wt.-% of other substances, particularly preferably with less than 0.3 wt.-% of other substances, in each case based on the total weight of the quartz. Furthermore, preferably, the quartz comprises at least 99 wt.-% silicon dioxide, based on the total weight of the quartz.

The light guide preferably has an elongate form. The form of the light guide is defined by its length extension L and its cross section Q. The light guide preferably has a round outer wall along its length extension L. A cross section Q of the light guide is always determined in a plane which is perpendicular to the outer wall of the light guide. If the light guide is curved in the length extension L, then the cross section Q is determined perpendicular to the tangent at a point on the outer wall of the light guide. The light guide preferably has a diameter $d_L$ in a range from 0.04 to 1.5 mm. The light guide preferably has a length in a range from 1 m to 100 km.

According to the invention, the light guide comprises one or multiple cores, for example one core or two cores or three cores or four cores or five cores or six cores or seven cores or more than seven cores, particularly preferably one core. Preferably, more than 90%, for example more than 95%, particularly preferably more than 98%, of the electromagnetic radiation which is conducted through the light guide is conducted in the cores. For the transport of light in the cores, the preferred wavelength ranges apply, as already given for the light guide. Preferably, the material of the core is selected from the group consisting of glass or quartz glass, or a combination of both, particularly preferably quartz glass. The cores can, independently of each other, be made of the same material or of different materials. Preferably, all of the cores are made of the same material, particularly preferably of quartz glass.

Each core has a, preferably round, cross section $Q_K$ and has an elongate form with length $L_K$. The cross section $Q_K$ of a core is independent from the cross section $Q_K$ of each other core. The cross section $Q_K$ of the cores can be the same or different. Preferably, the cross sections $Q_K$ of all the cores am the same. A cross section $Q_K$ of a core is always determined in a plane which is perpendicular to the outer wall of the core or the outer wall of the light guide. If the core is curved in length extension, then the cross section $Q_K$ will be perpendicular to the tangent at a point on the outer wall of the core. The length $L_K$ of a core is independent of the length $L_K$ of each other core. The lengths $L_K$ of the cores can be the same or different. Preferably, the lengths $L_K$ of all the cores are the same. Each core preferably has a length $L_K$ in a range from 1 m to 100 km. Each core has a diameter $d_K$. The diameter $d_K$ of a core is independent of the diameter $d_K$ of each other core. The diameters $d_K$ of the cores can be the same or different. Preferably, the diameters $d_K$ of all the cores are the same. Preferably, the diameter dr of each core is in a range from 0.1 to 1000 μm, for example from 0.2 to 100 μm or from 0.5 to 50)μm, particularly preferably from 1 to 30 μm.

Each core has at least one distribution of refractive index perpendicular to the maximum extension of the core. "Distribution of refractive index" means the refractive index is constant or changes in a direction perpendicular to the maximum extension of the core. The preferred distribution of refractive index corresponds to a concentric distribution of refractive index, for example to a concentric profile of refractive index in which a first region with the maximum refractive index is present in the centre of the core and which is surrounded by a further region with a lower refractive index. Preferably, each core has only one refractive index distribution over its length $L_K$. The distribution of refractive index of a core is independent of the distribution of refractive index in each other core. The distributions of refractive index of the cores can be the same or different. Preferably, the distributions of refractive index of all the cores am the same. In principle, it is also possible for a core to have multiple different distributions of refractive index.

Each distribution of refractive index perpendicular to the maximum extension of the core has a maximum refractive index $n_k$. Each distribution of refractive index perpendicular to the maximum extension of the core can also have further lower refractive indices. The lowest refractive index of the distribution of refractive index is preferably not more than 0.5 smaller than the maximum refractive index $n_K$ of the distribution of refractive index. The lowest refractive index of the distribution of refractive index is preferably 0.0001 to 0.15, for example 0.0002 to 0.1, particularly preferably 0.0003 to 0.05, less than the maximum refractive index $n_K$ of the distribution of refractive index.

Preferably, the core has a refractive index $n_K$ in a range from 1.40 to 1.60, for example in a range from 1.41 to 1.59, particularly preferably in a range from 1.42 to 1.58, in each case measured at a reference wavelength of $\lambda_r$=589 nm (sodium D-line), at a temperature of 20° C. and at normal pressure (p=1013 hPa). For further details in this regard, see the test methods section. The refractive index $n_K$ of a core is independent of the refractive index $n_K$ of each other core. The refractive indices $n_K$ of the cores can be the same or different. Preferably, the refractive indices $n_K$ of all the cores are the same.

Preferably, each core of the light guide has a density in a range from 1.9 to 2.5 g/cm$^3$, for example in a range from 2.0 to 2.4 g/cm$^3$, particularly preferably in a range from 2.1 to 2.3 g/cm$^3$. Preferably, the cores have a residual moisture content of less than 100 ppb, for example of less than 20 ppb or of less than 5 ppb, particularly preferably of less than 1 ppb, in each case based on the total weight of the core. The density of a core is independent of the density of the each other core. The densities of the cores can be the same or different. Preferably, the densities of all cores are the same.

If a light guide comprises more than one core, then each core is, independently of the other cores, characterised by the above features. It is preferred for all cores to have the same features.

According to the invention, the cores are surrounded by at least one jacket M1. The jacket M1 preferably surrounds the cores over the entire length of the cores. Preferably, the jacket M1 surrounds the cores for at least 95%, for example at least 98% or at least 99%, particularly preferably 100% of the exterior surface, that is to say the entire outer wall, of the cores. Often, the cores are entirely surrounded by the jacket M1 up until the ends (in each case the last 1-5 cm). This serves to protect the cores from mechanical impairment.

The jacket M1 can comprise any material, including silicon dioxide, which has a lower refractive index than at least one point P along the profile of the cross section $Q_K$ of the core. Preferably, this at least one point in the profile of the cross section $Q_K$ of the core is the point which lies at the centre of the core. Furthermore, preferably, the point P in the profile of the cross section of the core is the point which has a maximum refractive index $n_{Kmax}$ in the core. Preferably, the jacket M1 has a refractive index $n_{M1}$ which is at least 0.0001 lower than the refractive index of the core $n_K$ at the at least one point in the profile of the cross section $Q_K$ of the core. Preferably, the jacket M1 has a refractive index $n_{M1}$ which is lower than the refractive index of the core $n_K$ by an amount in the range from 0.0001 to 0.5, for example in a range from 0.0002 to 0.4, particularly preferably in a range from 0.0003 to 0.3.

The jacket M1 preferably has a refractive index $n_{M1}$ in a range from 0.9 to 1.599, for example in a range from 1.30 to 1.59, particularly preferably in a range from 1.40 to 1.57. Preferably, the jacket M1 forms a region of the light guide with a constant refractive index $n_{M1}$. A region with constant refractive index means a region in which the refractive index does not deviate from the mean of $n_{M1}$ by more than 0.0001.

In principle, the light guide can comprise further jackets. Particularly preferably at least one of the further jackets, preferably several or all of them, a refractive index which is lower than the refractive index $n_K$ of each core. Preferably, the light guide has one or two or three or four or more than four further jackets which surround the jacket M1. Preferably, the further jackets which surround the jacket M1 have a refractive index which is lower than the refractive index $n_{M1}$ of the jacket M1.

Preferably, the light guide has one or two or three or four or more than four further jackets which surround the cores and which are surrounded by the jacket M1, i.e. situated between the cores and the jacket M1. Furthermore, preferably, the further jackets situated between the cores and the jacket M1 have a refractive index which is higher than the refractive index $n_{M1}$ of the jacket M1.

Preferably, the refractive index decreases from the core of the light guide to the outermost jacket. The reduction in the refractive index from the core to the outermost jacket can occur in steps or continuously. The reduction in the refractive index can have different sections. Furthermore, preferably, the refractive index can be stepped in at least one section and be continuous in at least one other section. The steps can be of the same or different height.

It is certainly possible to arrange sections with increasing refractive index between sections with decreasing refractive index.

The different refractive indices of the different jackets can for example be configured by doping of the jacket M1, of the further jackets and/or of the cores.

Depending on the manner of preparation of a core, a core can already have a first jacket layer M0 following it preparation. This jacket layer M0 which directly neighbours the core is sometimes also called an integral jacket layer. The jacket layer M0 is situated closer to the middle point of the core than the jacket M1 and, if they are present, the further jackets. The jacket layer M0 commonly does not serve for light conduction or radiation conduction. Rather, the jacket layer M0 serves more to keep the radiation inside the core where it is transported. The radiation which is conducted in the core is thus preferably reflected at the interface from the core to the jacket layer M0. This interface from the core to the jacket layer M0 is preferably characterised by a change in refractive index. The refractive index of the jacket layer M0 is preferably lower than the refractive index $n_k$ of the core. Preferably, the jacket layer M0 comprises the same material as the core, but has a lower refractive index to the core on account of doping or of additives.

Preferably, at least the jacket M1 is made out of silicon dioxide and has at least one, preferably several or all of the following features:

a) an OH content of less than 10 ppm, for example of less than 5 ppm, particularly preferably of less than 1 ppm;
b) a chlorine content of less than 60 ppm, preferably of less than 40 ppm, for example of less than 20 or less than 2 ppm, particularly preferably of less than 0.5 ppm;
c) an aluminium content of less than 200 ppb, preferably of less than 100 ppb, for example of less than 80 ppb, particularly preferably of less than 60 ppb;
d) an ODC content of less than $5\times10^{15}/cm^3$, for example in a range from $0.1\times10^{15}$ to $3\times10^{15}/cm^3$, particularly preferably in a range from $0.5\times10^{15}$ to $2.0\times10^{15}/cm^3$;
e) a metal content of metals which are different to aluminum, of less than 1 ppm, for example of less than 0.5 ppm, particularly preferably of less than 0.1 ppm;
f) a viscosity (p=1013 hPa) in a range from $\log_{10}$ (η (1250° C.)/dPas)=11.4 to $\log_{10}$ (η (1250° C.)/dPas)= 12.9 and/or $\log_{10}$ (η (1300° C.)/dPas)=11.1 to $\log_{10}$ (η (1300° C.)/dPas)=12.2 and/or $\log_{10}$ (η (1350° C.)/ dPas)=10.5 to $\log_{10}$ (η (1350° C.)/dPas)=11.5;
g) a curl parameter of more than 6 m;
h) a standard deviation of the OH content of not more than 10%, preferably not more than 5%, based on the OH content a) of the jacket M1;
i) a standard deviation of the Cl content of not more than 10%, preferably not more than 5%, based on the Cl content b) of the jacket M1;
j) a standard deviation of the Al content of not more than 10%, preferably not more than 5%, based on the Al content c) of the jacket M1;
k) a refractive index homogeneity of less than $1\cdot10^{-4}$;
l) a transformation point Tg in a range from 1150 to 1250° C., particularly preferably in a range from 1180 to 1220° C., wherein the ppb and ppm are each based on the total weight of the jacket M1.

Preferably, the jacket has a refractive index homogeneity of less than $1\cdot10^{-4}$. The refractive index homogeneity indicates the maximum deviation of the refractive index at each position of a sample, for example of a jacket M1 or of a quartz glass body, based on the mean value of all the refractive indices measured in the sample. For measuring the mean value, the refractive index is measured at least seven measuring locations.

Preferably, the jacket M1 has a metal content of metals different to aluminium of less than 1000 ppb, for example of less than 500 ppb, particularly preferably of less than 100 ppb, in each case based on the total weight of the jacket M1. Often however, the jacket M1 has a content of metals different to aluminium of at least 1 ppb. Such metals are for example sodium, lithium, potassium, magnesium, calcium, strontium, germanium, copper, molybdenum, titanium, iron and chromium. These can be present, for example, as an element, as an ion or as part of a molecule or of an ion or of a complex.

The jacket M1 can comprise further constituents. Preferably, the jacket comprises less than 500 ppm, for example less than 450 ppm, particularly preferably less than 400 ppm of further constituents, the ppm in each case based on the total weight of the jacket M1. Possible further constituents are for example carbon, fluorine, iodine, bromine and phosphorus. These can be present for example as an element, as an ion or as part of a molecule, of an ion or of a complex. Often however, the jacket M1 has a content of further constituents of at least 1 ppb.

Preferably, the jacket M1 comprises less than 5 ppm carbon, for example less than 4 ppm or less than 3 ppm, particularly preferably less than 2 ppm, in each case based on the total weight of the jacket M1. Often however, the jacket M1 has a carbon content of at least 1 ppb.

Preferably, the jacket M1 has a homogeneous distribution of OH content, Cl content or Al content.

In a preferred embodiment of the light guide, the jacket M1 contributes by weight at least 80 wt.-%, for example at least 85 wt.-%, particularly preferably at least 90 wt.-%, in each case based on the total weight of the jacket M1 and the cores. Preferably, the jacket M1 contributes by weight at least 80 wt.-%, for example at least 85 wt.-%, particularly preferably at least 90 wt.-%, in each case based on the total weight of the jacket M1, the cores and the further jackets situated between the jacket M1 and the cores. Preferably, the jacket M1 contributes by weight at least 80 wt.-%, for example at least 85 wt.-%, particularly preferably at least 90 wt.-%, in each case based on the total weight of the light guide.

Preferably, the jacket M1 has a density in a range from 2.1 to 2.3 g/cm$^3$, particularly preferably in a range from 2.18 to 2.22 g/cm$^3$.

A fifth aspect of the invention relates to a light guide, obtainable by a process comprising the following steps:
A/ Provision
    A1/ of a hollow body with at least one opening obtainable by a process according to the first aspect of the invention comprising step iv.), or
    A2/ of a quartz glass body according to the third aspect of the invention, wherein the quartz glass body is first processed to obtain a hollow body with at least one opening,
B/ Introduction of one or multiple core rods into the quartz glass body through the at least one opening to obtain a precursor,
C/ Drawing the precursor of step B/ in the warm to obtain a light guide with one or multiple cores and a jacket M1.

The steps A/, B/ and C/ are preferably characterised by the features described in the context of the fourth aspect of the invention.

The light guide is preferably characterised by the features described in the context of the fourth aspect of the invention.

A sixth aspect of the present invention relates to a process for the preparation of an illuminant comprising the following steps:
(i) Provision
    (i-1) of a hollow body with at least one opening obtainable by a process according to the first aspect of the invention comprising step iv.); or
    (i-2) of a quartz glass body according to the third aspect of the invention, wherein the quartz glass body is first processed to obtain a hollow body;
(ii) Optionally fitting the hollow body with electrodes;
(iii) Filling the hollow body with a gas.

Step (i)

In step (i), a hollow body is provided. The hollow body provided in step (i) comprises at least one opening, for example one opening or two opening or three openings or four opening, particularly preferably one opening or two openings.

Preferably, a hollow body with at least one opening is provided in step (i) which is obtainable by a process according to the first aspect of the invention comprising step iv.), (step (i-1)). Preferably, the hollow body has the features described in the context of the first or third aspect of the invention.

Preferably, a hollow body is provided in step (i) which is obtainable from a quartz glass body according to the third aspect of the invention, (step (i-2)). There are many possibilities for processing a quartz glass body according to the third aspect of the invention to obtain a hollow body.

Preferably, a hollow body with two openings can be formed out of a quartz glass body analogue to step iv.) of the first aspect of the invention.

The processing of the quartz glass body to obtain a hollow body with an opening can in principle be performed by means of any process known to the skilled person and which are suitable for the preparation of glass hollow bodies with an opening. For example, processes comprising a pressing, blowing, sucking or a combination thereof are suitable. It is also possible to form a hollow body with one opening from a hollow body with two openings by closing an opening, for example by melting shut.

The obtained hollow body preferably has the features described in the context of the first and third aspect of the invention.

The hollow body is made of a material which comprises silicon dioxide, preferably in in a range from 98 to 100 wt.-%, for example in a range from 99.9 to 100 wt.-%, particularly preferably 100 wt.-%, in each case based on the total weight of the hollow body.

The material out of which the hollow body is prepared preferably has at least one, preferably several, for example two, or preferably all of the following features:
    HK1. a silicon dioxide content of preferably more than 95 wt.-%, for example more than 97 wt.-%, particularly preferably more than 99 wt.-%, based on the total weight of the material;
    HK2. a density in a range from 2.1 to 2.3 g/cm$^3$, particularly preferably in a range from 2.18 to 2.22 g/cm$^3$;
    HK3. a light transmissibility at at least one wavelength in the visible range from 350 to 750 nm in a range from 10 to 100%, for example in a range from 30 to 99.99%, particularly preferably in a range from 50 to 99.9%, based on the amount of light which is produced inside the hollow body;

HK4. an OH content of less than 500 ppm, for example of less than 400 ppm, particularly preferably of less than 300 ppm;

HK5. a chlorine content of less than 60 ppm, preferably of less than 40 ppm, for example less than 20 or less than 2 ppm, particularly preferably of less than 0.5 ppm;

HK6. an aluminium content of less than 200 ppb, for example of less than 100 ppb, particularly preferably of less than 80 ppb;

HK7. a carbon content of less than 5 ppm, for example of less than 4.5 ppm, particularly preferably of less than 4 ppm;

HK8. an ODC content of less than $5 \cdot 10^{15}/cm^3$;

HK9. a metal content of metals which are different to aluminium, of less than 1 ppm, for example of less than 0.5 ppm, particularly preferably of less than 0.1 ppm;

HK10. a viscosity (p=1013 hPa) in a range from $\log_{10} \eta$ (1250° C.)=11.4 to $\log_{10} \eta$ (1250° C.)=12.4 and/or $\log_{10} \eta$ (1300° C.)=11.1 to $\log_{10} \eta$ (1350° C.)=11.7 and/or $\log_{10} \eta$ (1350° C.)=10.5 to $\log_{10} \eta$ (1350° C.)=11.1;

HK11. A transformation point Tg in a range from 1150 to 1250° C., particularly preferably in a range from 1180 to 1220° C.;

wherein the ppm and ppb are each based on the total weight of the hollow body.

Step (ii)

Preferably, the hollow body of step (i) is fitted with electrodes, preferably with two electrodes, before filling with a gas. Preferably, the electrodes are connected to a source of electrical current. Preferably, the electrodes are connected to an illuminant socket.

The material of the electrodes is preferably selected from the group of metals. In principle the electrode material can be selected from any metal which does not oxidise, corrode, melt or otherwise become impaired in its form or conductivity as electrode under the operative conditions of the illuminant. The electrode material is preferably selected from the group consisting of iron, molybdenum, copper, tungsten, rhenium, gold and platinum or at least two selected therefrom, tungsten, molybdenum or rhenium being preferred.

Step (iii)

The hollow body provided in step (i) and optionally fitted with electrodes in step (ii) is filled with a gas.

The filling can be performed in any process known to the skilled person and which is suitable for the filling. Preferably, a gas is fed into the hollow body through the at least one opening.

Preferably, the hollow body is evacuated prior to filling with the gas, preferably evacuated to a pressure of less than 2 mbar. By subsequent introduction of a gas, the hollow body is filled with the gas. These steps can be repeated in order to reduce air impurities, in particular oxygen. Preferably, these steps are repeated at least twice, for example at least thrice or at least four times, particularly preferably at least five times until the amount of other gas impurities such as air, in particular oxygen, is sufficiently low. This procedure is particularly preferred for filling hollow bodies with one opening.

In the hollow body comprises two or more openings, the hollow body is preferably filled through one of the openings. The air present in the hollow body prior to filling with the gas can exit through the at least one further opening. The gas is fed through the hollow body until the amount of other gas impurities such as air, in particular oxygen, is sufficiently low.

Preferably, the hollow body is filled with an inert gas or with a combination of two or more inert gases, for example with nitrogen, helium, neon, argon, krypton, xenon or a combination of two or more thereof, particularly preferably with krypton, xenon or a combination of nitrogen and argon. Further preferred filling materials for the hollow body of illuminants are deuterium and mercury.

Preferably, the hollow body is closed after filling a gas, so that the gas does not exit during the further processing, so that no air enters from outside during the further processing, or both. The closing can be performed by melting or placing a cap. Suitable caps are for example quartz glass caps, which are for example melted onto the hollow body, or illuminant sockets. Preferably, the hollow body is closed by melting.

The illuminant according to the sixth aspect of the invention comprises a hollow body and optionally electrodes. The illuminant preferably has at least one, for example at least two or at least three or at least four, particularly preferably at least five of the following features:

i. a volume in a range from 0.1 cm³ to 10 m³, for example in a range from 0.3 cm³ to 8 m³, particularly preferably in a range from 0.5 cm³ to 5 m³;

ii. a length in a range from 1 mm to 100 m, for example in a range from 3 mm to 80 m, particularly preferably in a range from 5 mm to 50 m;

iii. an angle of radiation in a range from 2 to 360°, for example in a range from 10 to 360°, particularly preferably in a range from 30 to 360°;

iv. a radiation of light in a wavelength range from 145 to 4000 nm, for example in a range from 150 to 450 nm, or from 800 to 4000 nm, particularly preferably in a range from 160 to 280 nm v. a power in a range from 1 mW to 100 kW, particularly preferably in a range from 1 kW to 100 kW, or in a range from 1 to 100 Watt.

A seventh aspect of the invention relates to an illuminant, obtainable by a process comprising the following steps:

(i) Providing:
   (i-1) a hollow body with at least one opening obtainable by a process according to the first aspect of the invention comprising step iv.); or
   (i-2) a quartz glass body according to the third aspect of the invention, wherein the quartz glass body is first processed to obtain a hollow body;
(ii) Optionally fitting the hollow body with electrodes;
(iii) Filling the hollow body with a gas.

The steps (i), (ii) and (iii) are preferably characterised by the features described in the context of the sixth aspect.

The illuminant is preferably characterised by the features described in the context of the sixth aspect.

An eighth aspect of the present invention relates to a process for the preparation of a formed body comprising the following steps:

(1) Providing a quartz glass body according to the first or third aspect of the invention;
(2) Forming the quartz glass body to obtain the formed body.

The quartz glass body provided in step (1) is a quartz glass body according to the third aspect of the invention or obtainable by a process according to the first aspect of the invention. Preferably, the provided quartz glass body has the features of the first or third aspect of the invention.

Step (2)

For forming the quartz glass body provided in step (1), in principle any processes known to the skilled person and which are suitable for forming quartz glass are possible. Preferably, the quartz glass body is formed as described in the context of the first, fourth and sixth aspect of the invention to obtain a formed body. Furthermore, preferably, the formed body can be formed by means of techniques known to glass blowers.

The formed body can in principle take any shape which is formable out of quartz glass. Preferred formed bodies are for example:
- hollow bodies with at least one opening such as round bottomed flasks and standing flasks,
- fixtures and caps for such hollow bodies,
- open articles such as bowls and boats (wafer carrier),
- crucibles, arranged either open or closable,
- sheets and windows,
- cuvettes,
- tubes and hollow cylinders, for example reaction tubes, section tubes, cuboid chambers,
- rods, bars and blocks, for example in round or angular, symmetric or asymmetric format,
- tubes and hollow cylinders closed off at one end or both ends,
- domes and bells,
- flanges,
- lenses and prisms,
- parts welded to each other,
- curved parts, for example convex or concave surfaces and sheets, curved rods and tubes.

According to a preferred embodiment, the formed body can be treated after the forming. For this, in principle all processes described in connection with the first aspect of the invention which are suitable for post treatment of the quartz glass body are possible. Preferably, the formed body can be mechanically processed, for example by drilling, honing, external grinding, reducing in size or drawing.

A ninth aspect of the invention relates to a formed body obtainable by a process comprising the following steps:
(1) Providing a quartz glass body according to the first or third aspect of the invention,
(2) Forming the quartz glass body to obtain the formed body.

The steps (1) and (2) are preferably characterised by the features described in the context of the eighth aspect.

The formed body is preferably characterised by the features described in the context of the eighth aspect.

A tenth aspect of the present invention is a process for configuring the dew point at the outlet of an oven comprising:
I) Providing an input material in an oven, wherein the input material has a residual moisture;
II) Operating the oven, wherein a gas flow is passed through the oven, and
III) Varying the residual moisture of the input material, or the gas replacement rate of the gas flow.

Preferably, the tenth aspect of the invention relates to a process for setting the dew point to a range less than 0° C., for example less than −10° C., particularly preferably less than −20° C. Further preferably, the dew point can be configured to a range of less than 0° C. to −100° C., for example less than −10° C. to −80° C., particularly preferably less than −20° C. to −60° C.

For the preparation of a quartz glass body, "Input material" means silicon dioxide particles which are provided, preferably silicon dioxide granulate, silicon dioxide grain, or combinations thereof. The silicon dioxide particles, the granulate and the grain are preferably characterised by the features described in the context of the seventh aspect.

The oven and the gas flow are preferably characterised by the features described in the context of the seventh aspect. Preferably, the gas flow is formed by introducing a gas into the oven through an inlet and by removing a gas out of the oven through an outlet. The "gas replacement rate" means the volume of gas which is passed out of the oven through the outlet per unit time. The gas replacement rate is also called the throughput of the gas flow or volume throughput.

The configuration of the dew point can in particular be performed by varying the residual moisture of the input material or the gas replacement rate of the gas flow. For example, the dew point can be increased by residual moisture of the input material. By decreasing the residual moisture of the input material, the dew point can be reduced. An increase in the gas replacement rate can lead to a reduction in the dew point. A reduced gas replacement rate on the other hand can yield an increased dew point.

Preferably, the gas replacement rate of the gas flow is in a range from 200 to 3000 L/h, for example 200 to 2000 L/h, particularly preferably 200 to 1000 l/h.

The residual moisture of the input material is preferably in a range from 0.001 wt. % to 5 wt. %, for example from 0.01 to 1 wt. %, particularly preferably 0.03 to 0.5 wt. %, in each case based on the total weight of the input material.

Preferably, the dew point can also be affected by further factors. Examples of such factors are the dew point of the gas flow on entry into the oven, the oven temperature and the composition of the gas flow. A reduction of the dew point of the gas flow on entry into the oven, a reduction of the oven temperature or a reduction of the temperature of the gas flow at the outlet of the oven can lead to a reduction of the dew point of the gas flow at the outlet. The temperature of the gas flow at the outlet of the oven has no effect on the dew point, as long as it is above the dew point.

Particularly preferably, the dew point is configured by varying the gas replacement rate of the gas flow.

Preferably, the process is characterised by at least one, for example at least two or at least three, particularly preferably at least four of the following feature:
- I} A residual moisture of the input material in a range from 0.001 to 5 wt. %, for example from 0.01 to 1 wt. %, particularly preferably from 0.03 to 0.5 wt. %, in each case based on the total weight of the input material.
- II} A gas replacement rate of the gas flow in a range from 200 to 3000 L/h, for example from 200 to 2000 L/h, particularly preferably from 200 to 1000 L/h;
- III} An oven temperature in a range from 1700 to 2500° C., for example in a range from 1900 to 2400° C., particularly preferably in a range from 2100 to 2300° C.;
- IV} A dew point of the gas flow on entry into the oven in a range from −50° C. to −100° C., for example from −60° C. to −100° C., particularly preferably from −70° C. to −100° C.;
- V} The gas flow comprises helium, hydrogen or a combination thereof, preferably helium and hydrogen in a ratio from 20:80 to 95:5;
- VI} A temperature of the gas at the outlet in a range from 10 to 60° C., for example from 20 to 50° C., particularly preferably from 20 to 30° C.

It is particularly preferred, when employing a silicon dioxide granulate with a high residual moisture, to employ a gas flow with a high gas replacement rate and a low dew point at the inlet of the oven. By contrast, when employing a silicon dioxide granulate with a low residual moisture, a gas flow with a low gas replacement rate and a high dew point at the inlet of the oven can be used.

Particularly preferably, when employing a silicon dioxide granulate with a residual moisture of less than 3 wt. %, the gas replacement rate of a gas flow comprising helium and hydrogen can be in a range from 200 to 3000 L/h.

If a silicon dioxide granulate with a residual moisture of 0.1% is fed to the oven at 30 kg/h, a gas replacement rate of the gas flow in a range from 2800 to 3000 l/h is selected in the case of $He/H_2=50:50$ and in a range from 2700 to 2900 l/h is selected in the case of $He/H_2=30:70$, and a dew point of the gas flow before entry into the oven of −90° C. is selected. A dew point of less than 0° C. is thereby obtained at the gas outlet.

If a silicon dioxide granulate with a residual moisture of 0.05% is fed to the oven at 30 kg/h, a gas replacement rate of the gas flow in a range from 1900 to 2100 l/h is selected in the case of $He/H_2=50:50$ and in a range from 1800 to 200 l/h is selected in the case of $He/H_2=30:70$, and a dew point of the gas flow before entry into the oven of −90° C. is selected. A dew point of less than 0° C. is thereby obtained at the gas outlet.

If a silicon dioxide granulate with a residual moisture of 0.03% is fed to the oven at 30 kg/h, a gas replacement rate of the gas flow in a range from 1400 to 1600l/h is selected in the case of $He/H_2=50:50$ and in a range from 1200 to 1400 l/h is selected in the case of $He/H_2=30:70$, and a dew point of the gas flow before entry into the oven of −90° C. is selected. A dew point of less than 0° C. is thereby obtained at the gas outlet.

FIGURES

FIG. 1 flow diagram (process for the preparation of a quartz glass body)

FIG. 2 flow diagram (process for the preparation of a silicon dioxide granulate I)

FIG. 3 flow diagram (process for the preparation of a silicon dioxide granulate II)

FIG. 4 flow diagram (process for the preparation of a light guide)

FIG. 5 flow diagram (process for the preparation of an illuminant)

FIG. 6 schematic representation of a hanging crucible in an oven

FIG. 7 schematic representation of a standing crucible in an oven

FIG. 8 schematic representation of a crucible with a flushing ring

FIG. 9 schematic representation of a spray tower

FIG. 10 schematic representation of a cross section of a light guide

FIG. 11 schematic representation of a view of a light guide

FIG. 12 schematic representation of a crucible with a dew point measuring device FIG. 13 schematic representation of a gas pressure sinter oven (GDS oven)

FIG. 14 flow diagram (process for the preparation of a formed body)

FIG. 15*a* Section of a first wall strength measurement of a quartz glass tube FIG. 15*b* Section of a second wall strength measurement of a quartz glass tube

Preferably, moulds are used for the melting which can be introduced into and removed from an oven. Such moulds are often made of graphite. They provide a negative form for the caste item. The silicon dioxide granulate is filled into the mould and is first melted in the mould in step 103. Subsequently, the quartz glass body is formed in the same mould by cooling the melt. It is then freed from the mould and processed further, for example in an optional step 104. This procedure is discontinuous. The forming of the melt is preferably performed at reduced pressure, in particular in a vacuum. Further, it is possible during step 103 to charge the oven intermittently with a reducing, hydrogen containing atmosphere.

In another procedure, hanging or standing crucibles are preferably employed. The melting is preferably performed in a reducing, hydrogen containing atmosphere. In a third step 103, a quartz glass body is formed. The formation of the quartz glass body is preferably performed by removing at least a part of the glass melt from the crucible and cooling. The removal is preferably performed through a nozzle at the lower end of the crucible. In this case, the form of the quartz glass body can be determined by the design of the nozzle. In this way, for example, solid bodies can be obtained. Hollow bodies are obtained for example if the nozzle additionally has a mandrel. This example of a process for the preparation of quartz glass bodies, and in particular step 103, is preferably performed continuously. In an optional step 104, a hollow body can be formed from a solid quartz glass body.

Figure 1:
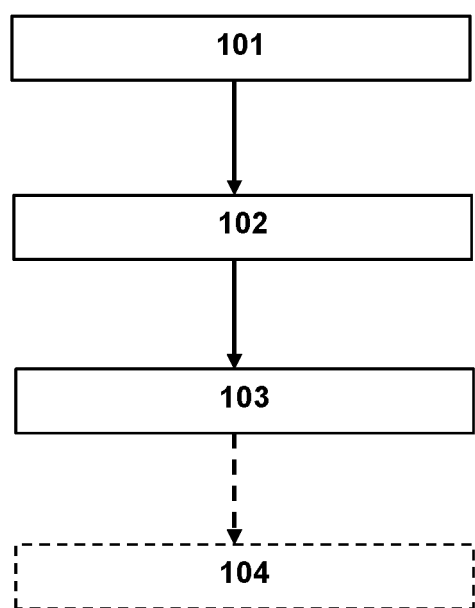
FIG. 1 shows a flow diagram containing the steps 101 to 104 of a process 100 for the preparation of a quartz glass body according to the present invention. In a first step 101, a silicon dioxide granulate is provided. In a second step 102, a glass melt is made from the silicon dioxide granulate.
Figure 2:
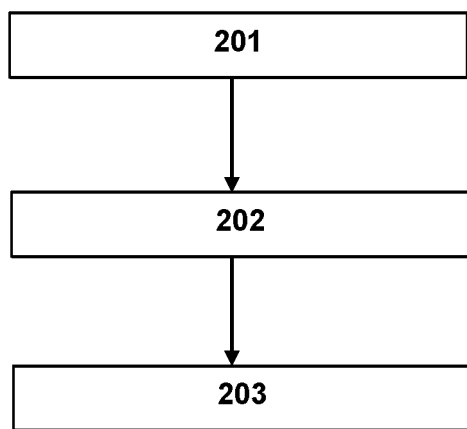

FIG. 2 shows a flow diagram containing the steps 201, 202 and 203 of a process 200 for the preparation of a silicon dioxide granulate I. In a first step 201, a silicon dioxide powder is provided. A silicon dioxide powder is preferably obtained from a synthetic process in which a silicon containing material, for example a siloxane, a silicon alkoxide or a silicon halide is converted into silicon dioxide in a pyrogenic process. In a second step 202, the silicon dioxide powder is mixed with a liquid, preferably with water, to obtain a slurry. In a third step 203, the silicon dioxide contained in the slurry is transformed into a silicon dioxide granulate. The granulation is performed by spray granulation. For this, the slurry is sprayed through a nozzle into a spray tower and dried to obtain granules, wherein the contact surface between the nozzle and the slurry comprises a glass or a plastic.

Figure 3:
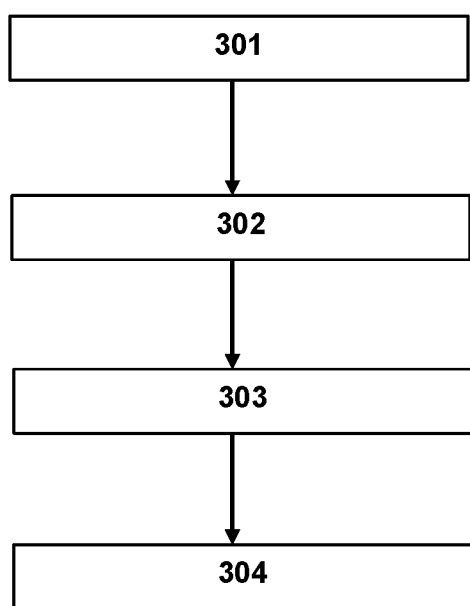

FIG. 3 shows a flow diagram containing the steps 301, 302, 303 and 304 of a process 300 for the preparation of a silicon dioxide granulate II. The steps 301, 302 and 303 proceed corresponding to the steps 201, 202 and 203 according to FIG. 2. In step 304, the silicon dioxide granulate I obtained in step 303 is processed to obtain a silicon dioxide granulate II. This is preferably performed by warming the silicon dioxide granulate I in a chlorine containing atmosphere.

Figure 4:
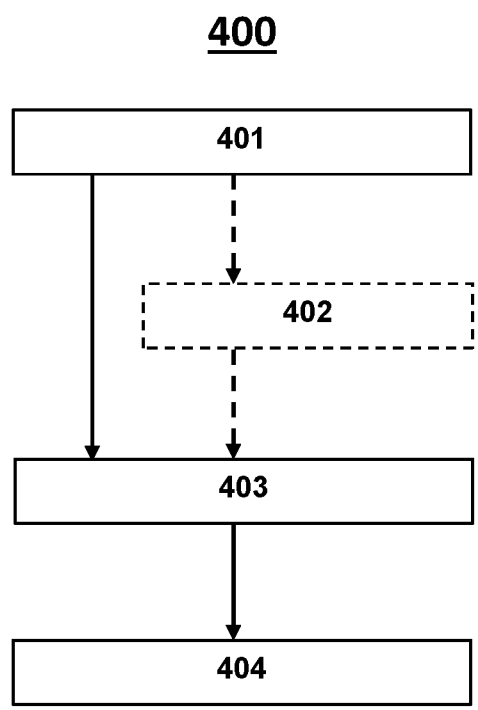

FIG. 4 shows a flow diagram containing the steps 401, 403 and 404 as well as the optional step 402 of the process for the preparation of a light guide. In the first step 401, a quartz glass body is provided, preferably a quartz glass body prepared according to process 100. Such a quartz glass body can be a solid or a hollow quartz glass body. In a second step 402, a hollow quartz glass body corresponding to step 104 is formed from a solid quartz glass body provided in step 401. In a third step 403, one or more than one core rods are introduced into the hollow. In a fourth step 404, the quartz glass body fitted with one or more than one core rods is processed to obtain a light guide. For this, the quartz glass body fitted with one or more than one core rods is preferably softened by warming and stretched until the desired thickness of the light guide is achieved.

Figure 5:
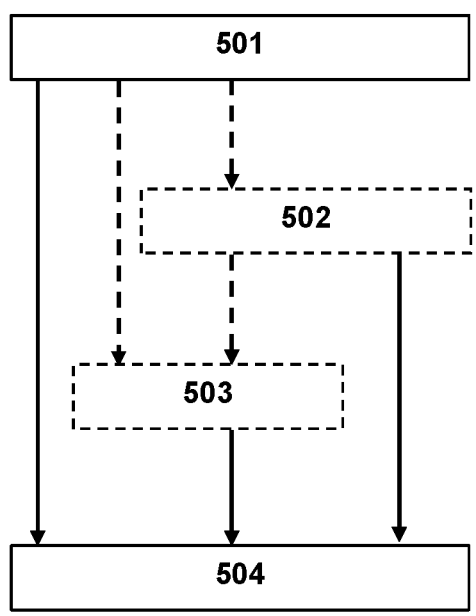

FIG. 5 shows a flow diagram containing the steps 501, 503 and 504 as well as the optional step 502 of a process for the preparation of an illuminant. In the first step 501, a quartz glass body is provided, preferably a quartz glass body prepared according to process 100. Such a quartz glass body can be a solid or a hollow quartz glass body. If the quartz glass body provided in step 501 is solid, it is optionally formed in a second step 502 to obtain a hollow quartz glass body corresponding to step 104. In an optional third step, the hollow quartz glass body is fitted with electrodes. In a fourth step 504, the hollow quartz glass body is filled with a gas, preferably with argon, krypton, xenon or a combination thereof. Preferably, a solid quartz glass body is first provided (501), formed to obtain a hollow body (502), fitted with electrodes (503) and filled with a gas (504).

Figure 6:
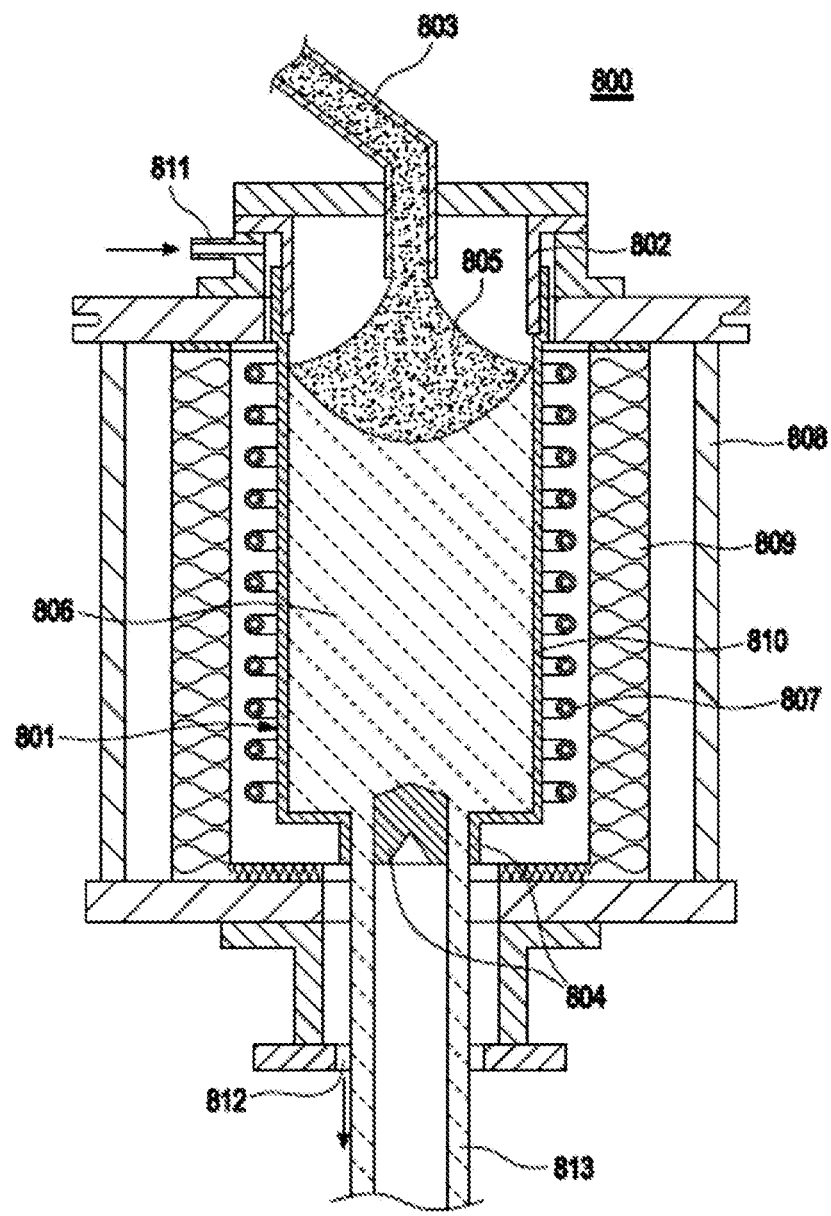

In FIG. 6, a preferred embodiment of an oven 800 with a hanging crucible is shown. The crucible 801 is arranged hanging in the oven 800. The crucible 801 has a hanger assembly 802 in its upper region, as well as a solids inlet 803 and a nozzle 804 as outlet. The crucible 801 is filled via the solids inlet 803 with silicon dioxide granulate 805. In operation, silicon dioxide granulate 805 is present in the upper region of the crucible 801, whilst a glass melt 806 is present in the lower region of the crucible. The crucible 801 can be heated by heating elements 807 which are arranged on the outer side of the crucible wall 810. The oven also has an insulation layer 809 between the heating elements 807 and the outer wall 808 of the oven. The space in between the insulation layer 809 and the crucible wall 810 can be filled with a gas and for this purpose has a gas inlet 811 and a gas outlet 812. A quartz glass body 813 can be removed from the oven through the nozzle 804.

Figure 7:
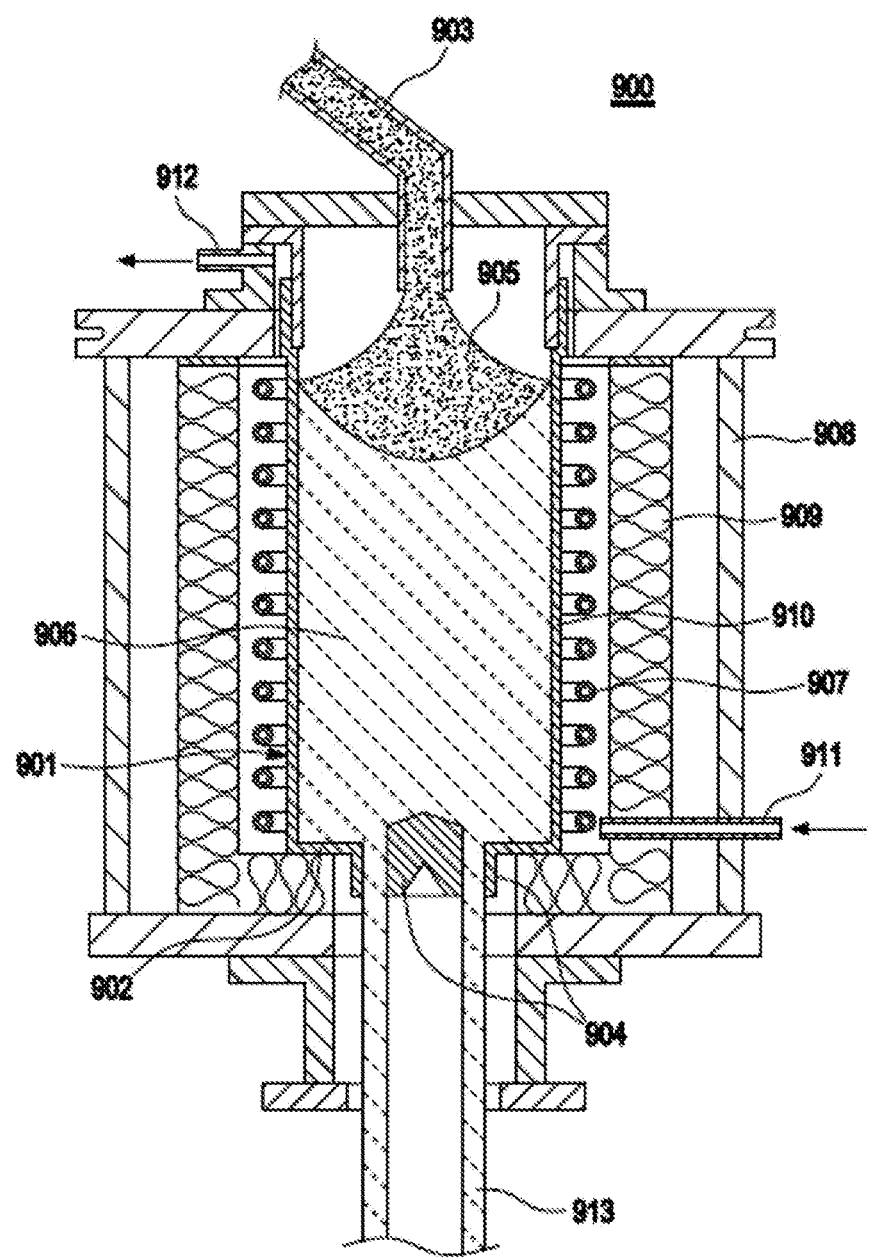

In FIG. 7 a preferred embodiment of an oven 900 with a standing crucible is shown. The crucible 901 is arranged standing in the oven 900. The crucible 901 has a standing area 902, a solids inlet 903 and a nozzle 904 as outlet. The crucible 901 is filled with silicon dioxide granulate 905 via the inlet 903. In operation, silicon dioxide granulate 905 is present in the upper region of the crucible, whilst a glass melt 906 is present in the lower region of the crucible. The crucible can be heated by heating elements 907 which are arranged on the outer side of the crucible wall 910. The oven also has an insulation layer 909 between the heating elements 907 and the outer wall 908. The space between the insulation layer 909 and the crucible wall 910 can be filled with a gas and for this purpose has a gas inlet 911 and a gas outlet 912. A quartz glass body 913 can be removed from the crucible 901 through the nozzle 904.

Figure 8:
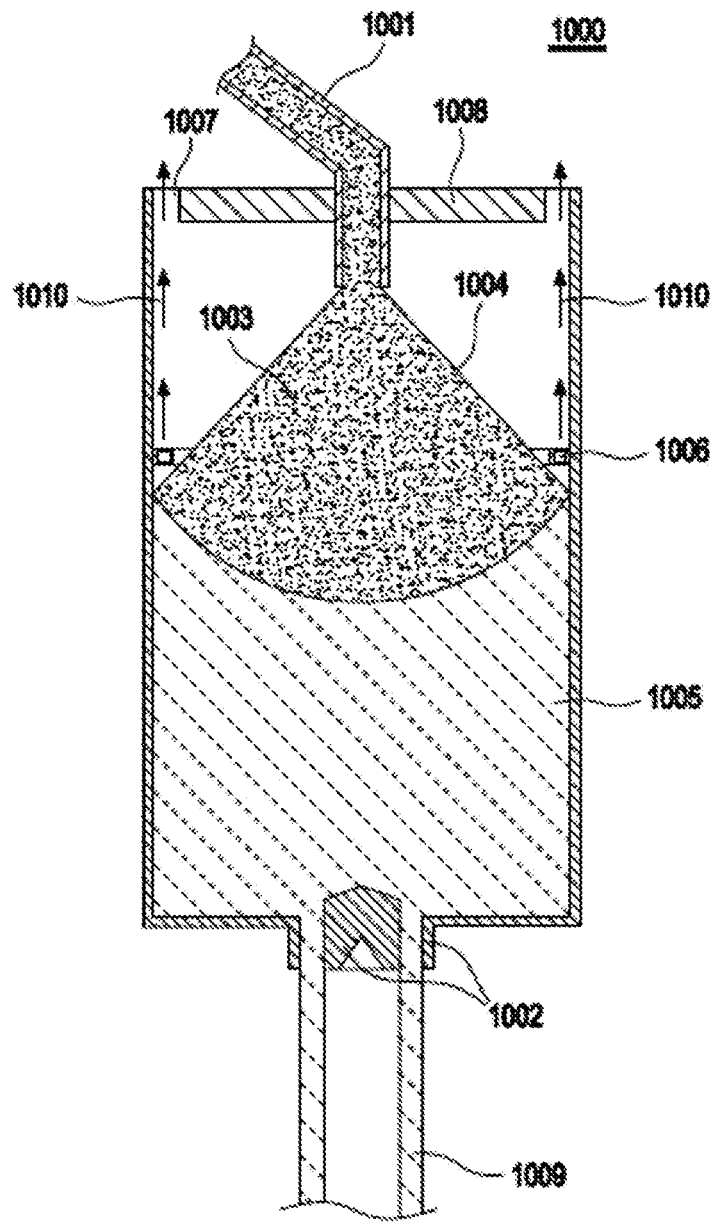

In FIG. 8 is shown a preferred embodiment of a crucible 1000. The crucible 1000 has a solids inlet 1001 and a nozzle 1002 as outlet. The crucible 1000 is filled with silicon dioxide granulate 1003 via the solids inlet 1001. In operation, silicon dioxide granulate 1003 is present as a reposing cone 1004 in the upper region of the crucible 1000, whilst a glass melt 1005 is present in the lower region of the crucible. The crucible 1000 can be filled with a gas. It has a gas inlet 1006 and a gas outlet 1007. The gas inlet is a flushing ring mounted on the crucible wall above the silicon dioxide granulate. The gas in the interior of the crucible is released through the flushing ring (with a gas feed not shown here) close above the melting level and/or the reposing cone near the crucible wall and flows in the direction of the gas outlet 1007 which is arranged as a ring in the lid 1008 of the crucible 1000. The gas flow 1010 which is produced in this way moves along the crucible wall and submerges it. A quartz glass body 1009 can be removed from the crucible 1000 through the nozzle 1002.

Figure 9:
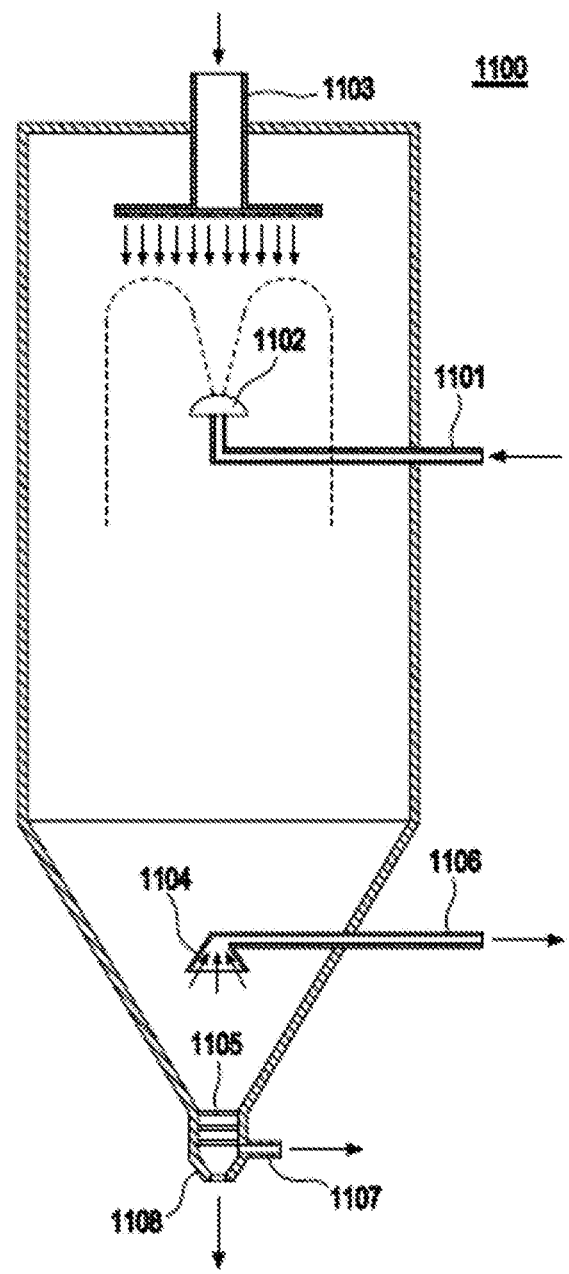

In FIG. 9 is shown a preferred embodiment of a spray tower 1100 for spray granulating silicon dioxide. The spray tower 1100 comprises a feed 1101 through which a pressurised slurry containing silicon dioxide powder and a liquid are fed into the spray tower. At the end of the pipeline is a nozzle 1102 through which the slurry is introduced into the spray tower as a finely spread distribution. Preferably, the nozzle slopes upward, so that the slurry is sprayed into the spray tower as fine droplets in the nozzle direction and then falls down in an arc under the influence of gravity. At the upper end of the spray tower there is a gas inlet 1103. By introduction of a gas through the gas inlet 1103, a gas flow is created in the opposite direction to the exit direction of the slurry out of the nozzle 1102. The spray tower 1100 also comprises a screening device 1104 and a sieving device 1105. Particles which are smaller than a defined particle size are extracted by the screening device 1104 and removed through the discharge 1106. The extraction strength of the screening device 1104 can be configured to correspond to the particle size of the particles to be extracted. Particles above a defined particle size are sieved off by the sieving device 1105 and removed through the discharge 1107. The sieve permeability of the sieving device 1105 can be selected to correspond to the particle size to be sieved off. The remaining particles, a silicon dioxide granulate having the desired particle size, is removed through the outlet 1108.

Figure 10:
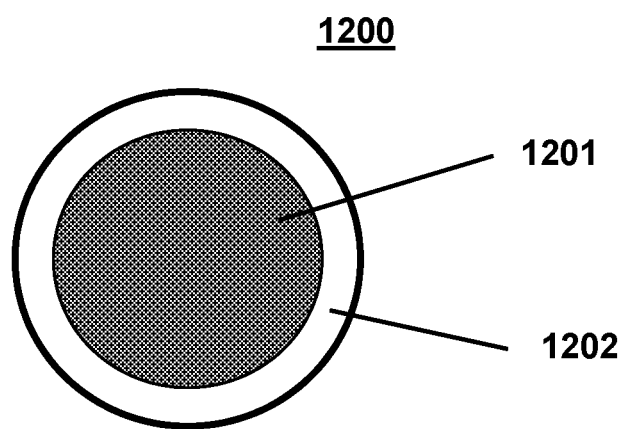

In FIG. 10 is shown a schematic cross section through a light guide 1200 according to the invention which has a core 1201 and a jacket M1 1202 which surrounds the core 1201.

Figure 11:
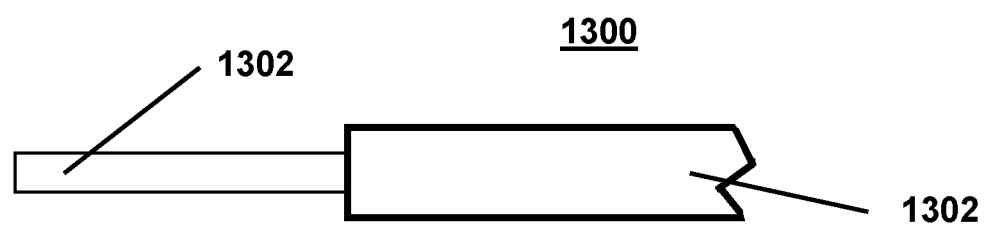

FIG. 11 shows schematically a top view of a guide 1300 which has cable structure. In order to represent the arrangement of the core 1301 and the jacket M1 1302 around the core 1301, a part of the core 1301 is shown without the jacket M1 1302. Typically however, the core 1301 is sheathed over its entire length by the jacket M1 1302.

Figure 12:
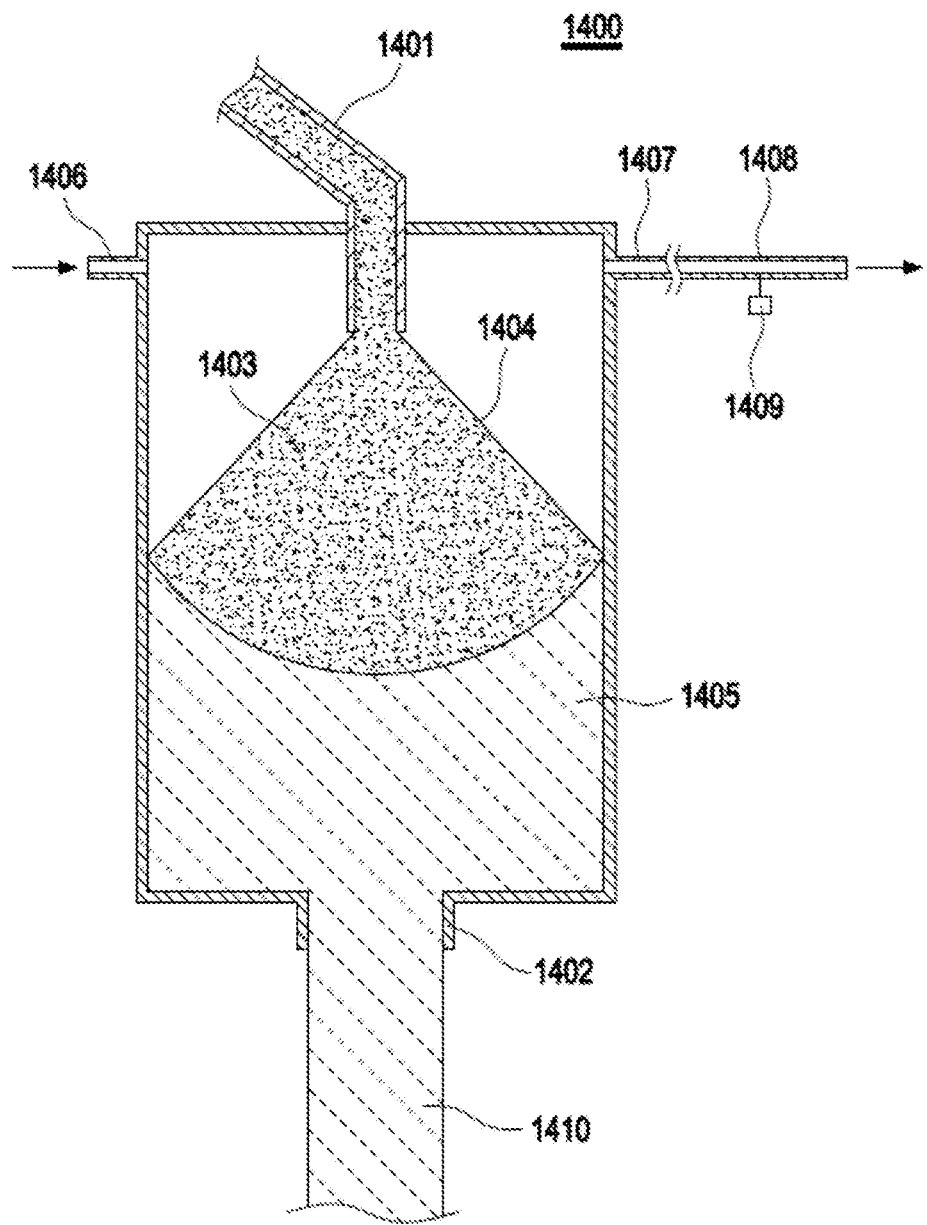

FIG. 12 shows a preferred embodiment of a crucible 1400. The crucible has a solids inlet 1401 and an outlet 1402. In operation, silicon dioxide granulate 1403 is present in a reposing cone 1404 in the upper region of the crucible 1400, whilst a glass melt 1405 is present in the lower region of the crucible. The crucible 1400 has a gas inlet 1406 and a gas outlet 1407. The gas inlet 1406 and the gas outlet 1407 are arranged above the reposing cone 1404 of the silicon dioxide granulate 1403. The gas outlet 1406 comprises a pipeline for the gas feed 1408 and a device 1409 for measuring the dew point of the exiting gas. The device 1409 comprises a dew point mirror hygrometer (not shown here). The separation between the crucible and the device 1409 for measuring the dew point can vary. A quartz glass body 1410 can be removed through the outlet 1402 of the crucible 1400.

Figure 13:
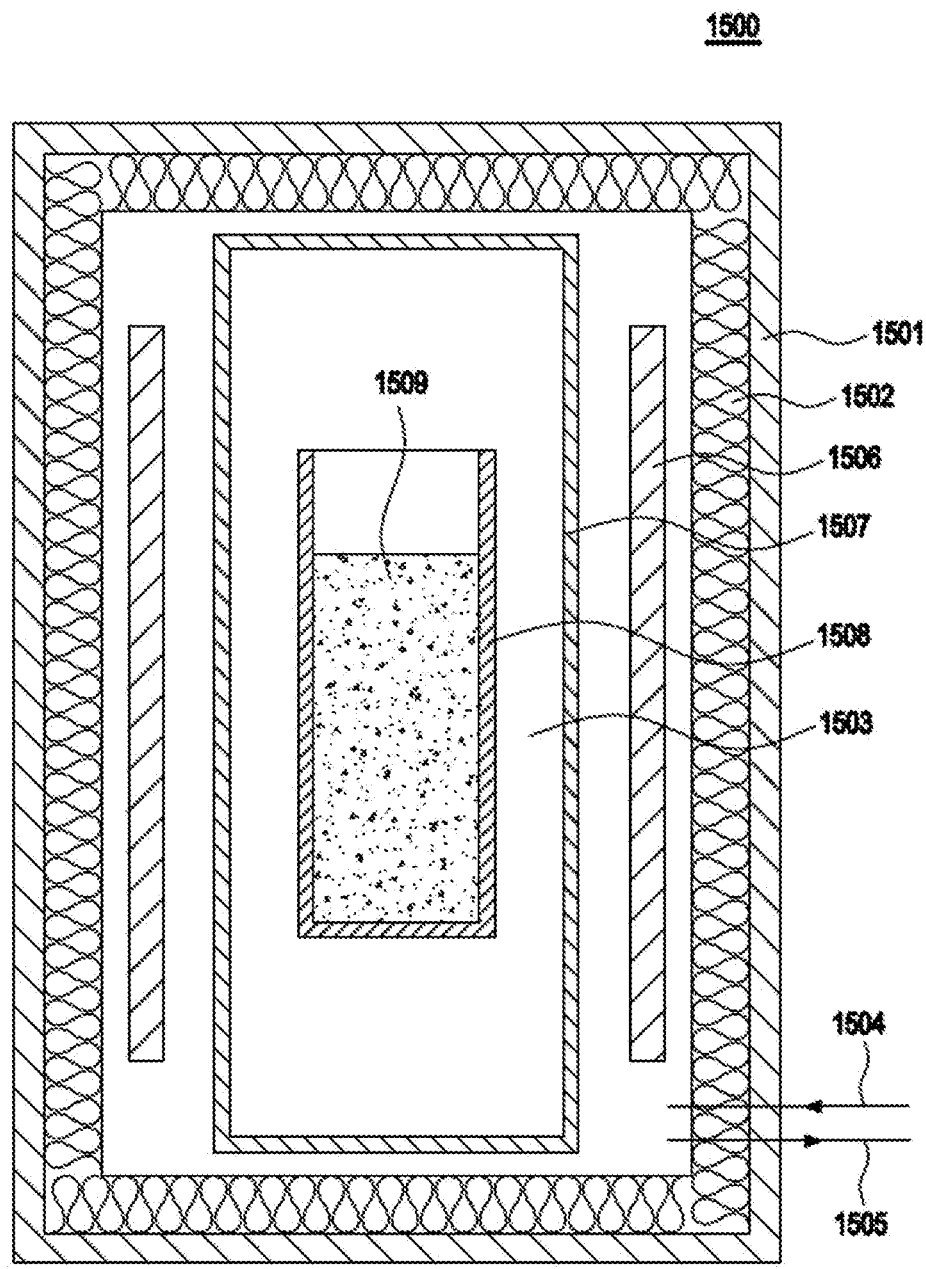

FIG. 13 shows a preferred embodiment of the oven 1500 which is suitable for a vacuum sintering process, a gas pressure sinter process and in particular a combination thereof. The oven has from outside inward a pressure resistant jacket 1501 and a thermal insulating layer 1502. The space enclosed thereby, referred to as the oven interior, can be charged with a gas or a gas mixture via a gas feed 1504. Further, the oven interior has a gas outlet 1505 via which gas can be removed. According to the gas transport balance between gas feed 1504 and gas removal at 1505 an over pressure, a vacuum or also a gas flow can be produced in the interior of the oven 1500. Further, heating elements 1506 are present in the oven interior 1500. These are often mounted on the insulation layer 1502 (not shown here). For protecting the melt material from contamination, there is a so-called "liner" 1507 in the interior of the oven, which separates the oven chamber 1503 from the heating elements 1506. Moulds 1508 with material to be melted 1509 can be introduced into the oven chamber 1503. The mould 1508 can be open on a side (shown here) or can completely enclose the melt material 1509 (not shown).

Figure 14:
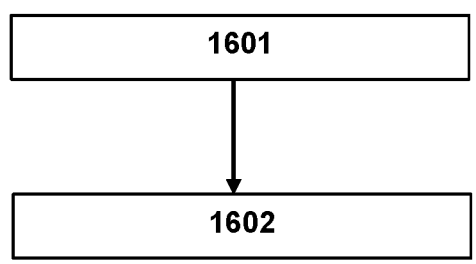

FIG. 14 shows a flow diagram containing the steps 1601 and 1602 of a process for the preparation of a formed body. In the first step 1601, a quartz glass body is provided, preferably a quartz glass body prepared according to process 100. Such a quartz glass body can be a solid or hollow body quartz glass body. In a second step 1602, a formed body is formed from a solid quartz glass body provided in step 1601.

FIG. 15a shows a section of a wall strength measurement through a cross section of a quartz glass tube at a tungsten rich point. The upper line shows the profile of the wall strength in mm for a quartz glass tube broadened by 50 mm to 250 mm (original diameter 200 mm). The second highest line shows the wall strength after a second broadening of 50 mm. The diameter is then 300 mm. The third line shows the wall strength after a third broadening of 50 mm. The diameter is then 350 mm. The fourth line shows the wall strength after a third broadening of 50 mm. The diameter is then 400 mm. For the first line, the spatial variation is roughly 0.1 mm, for the second line ca. 0.2 mm, for the third line ca. 0.35 mm and for the fourth line ca. 0.5 mm.

FIG. 15b shows a section of a wall strength measurement through a cross section of a quartz glass tube with low tungsten content. The uppermost line shows the profile of the wall strength in mm for a quartz glass tube which has been broadened by 50 mm to 250 mm (original diameter 200 mm). The second highest line shows the wall strength after a second broadening of 50 mm. The diameter is then 300 mm. The third line shows the wall strength after a third broadening of 50 mm. The diameter is then 350 mm. The fourth line shows the wall strength after a third broadening of 50 mm. For a quartz glass tube with low tungsten content, profiles as shown in FIG. 17a do not occur.

Test Methods a. Fictive Temperature

The fictive temperature is measured by Raman spectroscopy using the Raman scattering intensity at about 606 $cm^{-1}$. The procedure and analysis described in the contribution of Pflesderer et. al., "The UV-induced 210 nm absorption band in fused Silica with different thermal history and stoichiometry"; Journal of Non-Crystalline Solids, volume 159 (1993), pages 145-153.

b. OH Content

The OH content of the glass is measured by infrared spectroscopy. The method of D. M. Dodd & D. M. Fraser "Optical Determinations of OH in Fused Silica" (J.A.P. 37, 3991 (1966)) is employed. Instead of the device named therein, an FTIR-spectrometer (Fourier transform infrared spectrometer, current System 2000 of Perkin Elmer) is employed. The analysis of the spectra can in principle be performed on either the absorption band at ca. 3670 $cm^{-1}$ or on the absorption band at ca. 7200 $cm^{-1}$. The selection of the band is made on the basis that the transmission loss through OH absorption is between 10 and 90%.

c. Oxygen Deficiency Centers (ODCs)

For the quantitative detection, the ODC(I) absorption is measured at 165 nm by means of a transmission measurement at a probe with thickness between 1-2 mm using a vacuum UV spectrometer, model VUVAS 2000, of McPherson, Inc. (USA).

Then:

$N = \alpha/\sigma$ with $N$=defect concentration [$1/cm^3$]
$\alpha$=optical absorption [1/cm, base e] of the ODC(I) band
$\sigma$=effective cross section [$cm^2$]

wherein the effective cross section is set to $\sigma = 7.5 \cdot 10^{-17}$ $cm^2$ (from L. Skuja, "Color Centers and Their Transformations in Glassy $SiO_2$", Lectures of the summer school "Photosensitivity in optical Waveguides and glasses", Jul. 13-18, 1998, Vitznau, Switzerland).

d. Elemental Analysis d-1) Solid samples are crushed. Then, ca. 20 g of the sample is cleaned by introducing it into a HF-resistant vessel fully, covering it with HF and thermally treating at 100° C. for an hour. After cooling, the acid is discarded and the sample cleaned several times with high purity water. Then, the vessel and the sample are dried in the drying cabinet.

Next, ca. 2 g of the solid sample (crushed material cleaned as above; dusts etc. without pre-treatment) is weighed into an HF resistant extraction vessel and dissolved in 15 ml HF (50 wt.-%). The extraction vessel is closed and thermally treated at 100° C. until the sample is completely dissolved. Then, the extraction vessel is opened and further thermally treated at 100° C., until the solution is completely evaporated. Meanwhile, the extraction vessel is filled 3x with 15 ml of high purity water. 1ml $HNO_3$ is introduced into the extraction vessel, in order to dissolve separated impurities and filled up to 15 ml with high purity water. The sample solution is then ready.

d-2) ICP-MS/ICP-OES Measurement

Whether OES or MS is employed depends on the expected elemental concentrations. Typically, measurements of MS are 1 ppb, and for OES they are 10 ppb (in each case based on the weighed sample). The measurement of the elemental concentration with the measuring device is performed according to the stipulations of the device manufacturer (ICP-MS: Agilent 7500ce; ICP-OES: Perkin Elmer 7300 DV) and using certified reference liquids for calibration. The elemental concentrations in the solution (15 ml) measured by the device are then converted based on the original weight of the probe (2 g).

Note: It is to be kept in mind that the acid, the vessels, the water and the devices must be sufficiently pure in order to measure the elemental concentrations in question. This is checked by extracting a blank sample without quartz glass.

The following elements are measured in this way: Li, Na, Mg, K, Ca, Fe, Ni, Cr, Hf, Zr, Ti, (Ta), V, Nb, W, Mo, Al.

d-3) The measurement of samples present as a liquid is carried out as described above, wherein the sample preparation according to step d-1) is skipped. 15 ml of the liquid sample are introduced into the extraction flask. No conversion based on the original sample weight is made.

e. Determination of Density of a Liquid

For measuring the density of a liquid, a precisely defined volume of the liquid is weighed into a measuring device which is inert to the liquid and its constituents, wherein the empty weight and the filled weight of the vessel are measured. The density is given as the difference between the two weight measurements divided by the volume of the liquid introduced.

f. Fluoride Determination 15 g of a quartz glass sample is crushed and cleaned by treating in nitric acid at 70° C. The sample is then washed several times with high purity water and then dried. 2 g of the sample is weighed into a nickel crucible and covered with 10 g $Na_2CO_3$ and 0.5 g ZnO. The crucible is closed with a Ni-lid and roasted at 1000° C. for an hour. The nickel crucible is then filled with water and boiled up until the melt cake has dissolved entirely. The solution is transferred to a 200 ml measuring flask and filled up to 200 ml with high purity water. After sedimentation of undissolved constituents, 30 ml am taken and transferred to a 100 ml measuring flask, 0.75 ml of glacial acetic acid and 60 ml TISAB are added and filled up with high purity water. The sample solution is transferred to a 150 ml glass beaker.

The measurement of the fluoride content in the sample solution is performed by means of an ion sensitive (fluoride) electrode, suitable for the expected concentration range, and display device as stipulated by the manufacturer, here a fluoride ion selective electrode and reference electrode F-500 with R503/D connected to a pMX 3000/pH/ION from Wissenschaftlich-Technische Werkstätten GmbH. With the fluoride concentration in the solution, the dilution factor and the sample weight, the fluoride concentration in the quartz glass is calculated.

g. Determination of chlorine (>=50 ppm)

15 g of a quartz glass sample is crushed and cleaned by treating with nitric acid at ca. 70° C. Subsequently, the sample is rinsed several times with high purity water and then dried. 2 g of the sample are then filled into a PTFE-insert for a pressure container, dissolved with 15 ml NaOH (c=10 mol/l), closed with a PTFE lid and placed in the pressure container. It is closed and thermally treated at ca. 155° C. for 24 hours. After cooling, the PTFE insert is removed and the solution is transferred entirely to a 100 ml measuring flask. There, 10 ml $HNO_3$ (65 wt.-%) and 15 ml acetate buffer and added, allowed to cool and filled to 100 ml with high purity water. The sample solution is transferred to a 150 ml glass beaker. The sample solution has a pH value in the range between 5 and 7.

The measurement of the chloride content in the sample solution is performed by means of an ion sensitive (Chloride) electrode which is suitable for the expected concentration range, and a display device as stipulated by the manufacturer, here an electrode of type Cl-500 and a reference electrode of type R-503/D attached to a pMX 3000/pH/ION from Wissenschaftlich-Technische Werkstätten GmbH.

h. Chlorine content (<50 ppm)

Chlorine content <50 ppm up to 0.1 ppm in quartz glass is measured by neutron activation analysis (NAA). For this, 3 bores, each of 3 mm diameter and 1 cm long are taken from the quartz glass body under investigation. These are given to a research institute for analysis, in this case to the institute for nuclear chemistry of the Johannes-Gutenberg University in Mainz, Germany. In order to exclude contamination of the sample with chlorine, a thorough cleaning of the sample in an HF bath on location directly before the measurement was arranged. Each bore is measured several times. The results and the bores are then sent back by the research institute.

i. Optical Properties

The transmission of quartz glass samples is measured with the commercial grating- or FTIR-spectrometer from Perkin Elmer (Lambda 900 [190-3000 nm] or System 2000 [1000-5000 nm]). The selection is determined by the required measuring range.

For measuring the absolute transmission, the sample bodies ame are polished on parallel planes (surface roughness RMS<0.5 nm) and the surface is cleared off all residues by ultrasound treatment. The sample thickness is 1 cm. In the case of an expected strong transmission loss due to impurities, dopants etc., a thicker or thinner sample can be selected in order to stay within the measuring range of the device. A sample thickness (measuring length) is selected at which only slight artefacts are produced on account of the passage of the radiation through the sample and at the same time a sufficiently detectable effect is measured.

The measurement of the opacity, the sample is placed in front of an integrating sphere. The opacity is calculated using the measured transmission value T according to the formula: $O=1/T=I_0/I$.

j. Refractive Index and Distribution of Refractive Index in a Tube or Rod

The distribution of refractive index of tubes/rods can be characterised by means of a York Technology Ltd. Preform Profiler P102 or P104. For this, the rod is placed lying in the measuring chamber the chamber is closed tight. The measuring chamber is then filled with an immersion oil which has a refractive index at the test wavelength of 633 nm which is very similar to that of the outermost glass layer at 633 nm. The laser beam then goes through the measuring chamber. Behind the measuring chamber (in the direction of the of the radiation) is mounted a detector which measures the angle of deviation (of the radiation entering the measuring chamber compared to the radiation exiting the measuring chamber). Under the assumption of radial symmetry of the distribution of refractive index of the rod, the diametral distribution of refractive index can be reconstructed by means of an inverse Abel transformation. These calculations are performed by the software of the device manufacturer York.

The refractive index of a sample is measured with the York Technology Ltd. Preform Profiler P104 analogue to the above description. In the case of isotropic samples, measurement of distribution of refractive index gives only one value, the refractive index.

k. Carbon Content

The quantitative measurement of the surface carbon content of silicon dioxide granulate and silicon dioxide powder is performed with a carbon analyser RC612 from Leco Corporation, USA, by the complete oxidation of all surface carbon contamination (apart from SiC) with oxygen to obtain carbon dioxide. For this, 4.0 g of a sample are weighed and introduced into the carbon analyser in a quartz glass dish. The sample is bathed in pure oxygen and heated for 180 seconds to 900° C. The $CO_2$ which forms is measured by the infrared detector of the carbon analyser. Under these measuring conditions, the detection limit lies at ≤1 ppm (weight-ppm) carbon.

A quartz glass boat which is suitable for this analysis using the above named carbon analyser is obtainable as a consumable for the LECO analyser with LECO unmber 781-335 on the laboratory supplies market, in the present case from Deslis Laborhandel, Flurstraße 21, D-40235 Dusseldorf (Germany), Deslis-No. LQ-130XL. Such a boat has width/length/height dimensions of ca. 25 mm/60 mm/15 mm. The quartz glass boat is filled up to half its height with sample material. For silicon dioxide powder, a sample weight of 1.0 g sample material can be reached. The lower detection limit is then <1 weight ppm carbon. In the same boat, a sample weight of 4 g of a silicon dioxide granulate is reached for the same filling height (mean particle size in the range from 100 to 500 μm). The lower detection limit is then about 0.1 weight ppm carbon. The lower detection limit is reached when the measurement surface integral of the sample is not greater than three times the measurement surface integral of an empty sample (empty sample=the above process but with an empty quartz glass boat).

l. Curl Parameter

The curl parameter (also called: "Fibre Curl") is measured according to DIN EN 60793-1-34:2007-01 (German version of the standard IEC 60793-1-34:2006). The measurement is made according to the method described in Annex A in the sections A.2.1, A.3.2 and A.4.1 ("extrema technique").

m. Attenuation

The attenuation is measured according to DIN EN 60793-1-40:2001 (German version of the standard IEC 60793-1-40:2001). The measurement is made according to the method described in the annex ("cut-back method") at a wavelength of $\lambda=1550$ nm.

n. Viscosity of the Slurry

The slurry is set to a concentration of 30 weight-% solids content with demineralised water (Direct-Q 3UV, Millipore, Water quality: 18.2 MΩcm). The viscosity is then measured with a MCR102 from Anton-Paar. For this, the viscosity is measured at 5 rpm. The measurement is made at a temperature of 23° C. and an air pressure of 1013 hPa.

o. Thixotropy

The concentration of the slurry is set to a concentration of 30 weight-% of solids with demineralised water (Direct-Q 3UV, Millipore, water quality: 18.2 MΩcm). The thixotropy is then measured with an MCR102 from Anton-Paar with a cone and plate arrangement. The viscosity is measured at 5 rpm and at 50 rpm. The quotient of the first and the second value gives the thixotropic index. The measurement is made at a temperature of 23° C.

p. Zeta Potential of the Slurry

For zeta potential measurements, a zeta potential cell (Flow Cell, Beckman Coulter) is employed. The sample is dissolved in demineralised water (Direct-Q 3UV, Millipore, water quality: 18.2 MΩcm) to obtain a 20 mL solution with a concentration of 1 g/L. The pH is set to 7 through addition of $HNO_3$ solutions with concentrations of 0.1 mol/L and 1 mol/L and an NaOH solution with a concentration of 0.1 mol/L. The measurement is made at a temperature of 23° C.

q. Isoelectric Point of the Slurry

The isoelectric point, a zeta potential measurement cell (Flow Cell, Beckman Coulter) and an auto titrator (DelsaNano AT, Beckman Coulter) is employed. The sample is dissolved in demineralised water (Direct-Q 3UV, Millipore, water quality: 18.2 MΩcm) to obtain a 20 mL solution with a concentration of 1 g/L. The pH is varied by adding $HNO_3$ solutions with concentrations of 0.1 mol/L and 1 mol/L and an NaOH solution with a concentration of 0.1 mol/L. The isoelectric point is the pH value at which the zeta potential is equal to 0. The measurement is made at a temperature of 23° C.

r. pH Value of the Slurry

The pH value of the slurry is measured using a WTW 3210 from Wissenschaftlich-Technische-Werkstätten GmbH. The pH 3210 Set 3 from WTW is employed as electrode. The measurement is made at a temperature of 23° C.

s. Solids Content

A weighed portion $m_1$ of a sample is heated for 4 hours to 500° C. reweighed after cooling ($m_2$). The solids content w is given as $m_2/m_1*100$ [Wt. %].

t. Bulk Density

The bulk density is measured according to the standard DIN ISO 697:1984-01 with an SMG 697 from Powtec. The bulk material (silicon dioxide powder or granulate) does not clump.

u. Tamped Density (Granulate)

The tamped density is measured according to the standard DIN ISO 787:1995-10.

v. Measurement of the Core Size Distribution

The pore size distribution is measured according to DIN 66133 (with a surface tension of 480 mN/m and a contact angle of 140°). For the measurement of pore sizes smaller than 3.7 nm, the Pascal 400 from Porotec is used. For the measurement of pore sizes from 3.7 nm to 100 μm, the Pascal 140 from Porotec is used. The sample is subjected to a pressure treatment prior to the measurement. For this a manual hydraulic press is used (Order-No. 15011 from Specac Ltd., River House, 97 Cray Avenue, Orpington, Kent BR5 4HE, U.K.). 250 mg of sample material is weighed into a pellet die with 13 mm inner diameter from Specac Ltd. and loaded with 1 t, as per the display. This load is maintained for 5 s and readjusted if necessary. The load on the sample is then released and the sample is dried for 4 h at 105±2° C. in a recirculating air drying cabinet.

The sample is weighed into the penetrometer of type 10 with an accuracy of 0.001 g and in order to give a good reproducibility of the measurement it is selected such that the stem volume used, i.e. the percentage of potentially used Hg volume for filling the penetrometer is in the range between 20% to 40% of the total Hg volume. The penetrometer is then slowly evacuated to 50 μm Hg and left at this pressure for 5 min. The following parameters are provided directly by the software of the measuring device: total pore volume, total pore surface area (assuming cylindrical pores), average pore radius, modal pore radius (most frequently occurring pore radius), peak n. 2 pore radius (pun).

w. Primary Particle Size

The primary particle size is measured using a scanning electron microscope (SEM) model Zeiss Ultra 55. The sample is suspended in demineralised water (Direct-Q 3UV, Millipore, water quality: 18.2 MΩcm), to obtain an extremely dilute suspension. The suspension is treated for 1 min with the ultrasound probe (UW 2070, Bandelin electronic, 70 W, 20 kHz) and then applied to a carbon adhesive pad.

x. Mean Article Size in Suspension

The mean particle size in suspension is measured using a Mastersizer 2000, available from Malvern Instruments Ltd., UK, according to the user manual, using the laser deflection method. The sample is suspended in demineralised water (Direct-Q 3UV, Millipore, water quality: 18.2 MΩcm) to obtain a 20 mL suspension with a concentration of 1 g/L. The suspension is treated with the ultrasound probe (UW 2070, Bandelin electronic, 70 W, 20 kHz) for 1 min.

y. Particle Size and Core Size of the Solid

The particle size and core size of the solid are measured using a Camsizer XT, available from Retsch Technology GmbH, Deutschland according to the user manual. The software gives the D10, D50 and D90 values for a sample.

z. BET Measurement

For the measurement of the specific surface area, the static volumetric BET method according to DIN ISO 9277:2010 is used. For the BET measurement, a "NOVA 3000" or a "Quadrasorb" (available from Quantachrome), which operate according to the SMART method ("Sorption Method with Adaptive dosing Rate"), is used. The micropore analysis is performed using the t-plot process ($p/p0=0.1-0.3$) and the mesopore analysis is performed using the MBET process (p/p0=0.0–0.3). As reference material, the standards alumina SARM-13 and SARM-214, available from Quantachrome are used. The tare weight of the measuring cell (clean and dry) is weighed. The type of measuring cell is selected such that the sample material which is introduced and the filler rod fill the measuring cell as much as possible and the dead space is reduced to a minimum. The sample material is introduced into the measuring cell. The amount of sample material is selected so that the expected value of the measurement value corresponds to 10-20 m$^2$/g. The measuring cells are fixed in the baking positions of the BET measuring device (without filler rod) and evacuated to <200 mbar. The speed of the evacuation is set so that no material leaks from the measuring cell. Baking is performed in this state at 200° C. for 1 h. After cooling, the measuring cell filled with the sample is weighed (raw value). The tare weight is then subtracted from the raw value of the weight=nett weight=weight of the sample. The filling rod is then introduced into the measuring cell this is again fixed at the measuring location of the BET measuring device. Prior to the start of the measurement, the sample identifications and the sample weights are entered into the software. The measurement is started. The saturation pressure of nitrogen gas (N2 4.0) is measured. The measuring cell is evacuated and cooled down to 77 K using a nitrogen bath. The dead space is measured using helium gas (He 4.6). The measuring cell is evacuated again. A multi-point analysis with at least 5 measuring points is performed. N2 4.0 is used as absorptive. The specific surface area is given in m$^2$/g.

Za. Viscosity of Alass Bodies

The viscosity of the glass is measured using the beam bending viscosimeter of type 401—from TA Instruments with the manufacturer's software WinTA (current version 9.0) in Windows 10 according to the DIN ISO 7884-4:1998-02 standard. The support width between the supports is 45 mm. Sample rods with rectangular cross section are cut from regions of homogeneous material (top and bottom sides of the sample have a finish of at least 1000 grain). The sample surfaces after processing have a grain size=9 μm & RA=0.15 μm. The sample rods have the following dimensions: length=50 mm, width=5 mm & height=3 mm (ordered: length, width, height, as in the standards document). Three samples are measured and the mean is calculated. The sample temperature is measured using a thermocouple tight against the sample surface. The following parameters are used: heating rate=25 K up to a maximum of 1500° C., loading weight=100 g, maximum bending=3000 μm (deviation from the standards document).

Zb. Dew Point Measurement

The dew point is measured using a dew point mirror hygrometer called "Optidew" of the company Michell Instmments GmbH, D-61381 Friedrichsdorf. The measuring cell of the dew point mirror hygrometer is arranged at a distance of 100 cm from the gas outlet of the oven. For this, the measuring device with the measuring cell is connected in gas communication to the gas outlet of the oven via a T-piece and a hose (Swagelok PFA, Outer diameter 6 mm). The over pressure at the measuring cell is 10±2 mbar. The through flow of the gas through the measuring cell is 1-2 standard litre/min. The measuring cell is in a room with a temperature of 25° C., 30% relative air humidity and a mean pressure of 1013 hPa.

Zc. Residual Moisture (Water Content)

The measurement of the residual moisture of a sample of silicon dioxide granulate is performed using a Moisture Analyzer HX204 from Mettler Toledo. The device functions using the principle of thermogravimetry. The HX204 is equipped with a halogen light source as heating element. The drying temperature is 220° C. The starting weight of the sample is 10 g+10%. The "Standard" measuring method is selected. The drying is carried out until the weight change reaches not more than 1 mg/140 s. The residual moisture is given as the difference between the initial weight of the sample and the final weight of the sample, divided by the initial weight of the sample.

The measurement of residual moisture of silicon dioxide powder is performed according to DIN EN ISO 787-2:1995 (2 h, 105° C.).

EXAMPLES

The example is further illustrated in the following through examples. The invention is not limited by the examples.

A. 1. Preparation of Silicon Dioxide Powder (OMCTS Route)

An aerosol formed by atomising a siloxane with air (A) is introduced under pressure into a flame which is formed by igniting a mixture of oxygen enriched air (B) and hydrogen. Furthermore, a gas flow (C) surrounding the flame is introduced and the process mixture is then cooled with process gas. The product is separated off at a filter. The process parameters are given in table 1 and the specifications of the resulting product are given in table 2. Experimental data for this example are indicated with A1-x.

2. Modification 1: Increased Carbon Content

A process was carried out as described in A.1., but the burning of the siloxane was performed in such a way that an amount of carbon was also formed. Experimental data for this example are indicated with A2-x.

TABLE 1

| Example | | A1-1 | A2-1 | A2-2 |
|---|---|---|---|---|
| Aerosol formation | | | | |
| Siloxane | | OMCTS* | OMCTS* | OMCTS* |
| Feed rate | kg/h | 10 | 10 | 10 |
| | (kmol/h) | (0.0337) | (0.0337) | (0.0337) |
| Feed rate of air (A) | Nm$^3$/h | 14 | 10 | 12 |
| Pressure | barO | 1.2 | 1.2 | 1.2 |
| Burner feed | | | | |
| Oxygen enriched air (B) | Nm$^3$/h | 69 | 65 | 68 |
| O$_2$-content | Vol. % | 32 | 30 | 32 |
| total O$_2$ feed rate | Nm$^3$/h | 25.3 | 21.6 | 24.3 |
| | kmol/h | 1.130 | 0.964 | 1.083 |
| Hydrogen feed rate | Nm$^3$/h | 27 | 27 | 12 |
| | kmol/h | 1.205 | 1.205 | 0.536 |
| Feed Carbon compound | | — | — | |
| Material | | | | methane |
| Amount | Nm$^3$/h | | | 5.5 |
| Air flow (C) | Nm$^3$/h | 60 | 60 | 60 |
| Stoichiometric ratio | | | | |
| V | | 2.099 | 1.789 | 2.011 |
| X | | 0.938 | 0.80 | 2.023 |
| Y | | 0.991 | 0.845 | 0.835 |

V = molar ratio of employed O$_2$/O$_2$ required for completed oxidation of the siloxane;
X = molar ratio O$_2$/H$_2$;
Y = (molar ratio of employed O$_2$/O$_2$ required for stoichiometric conversion OMCTS+ fuel gas);
barO = over pressure; *OMCTS = Octamethylcyclotetrasiloxane.

TABLE 2

| Example | | A1-1 | A2-1 | A2-2 |
|---|---|---|---|---|
| BET | m²/g | 30 | 33 | 34 |
| Bulk density | g/ml | 0.114 +− 0.011 | 0.105 +− 0.011 | 0.103 +− 0.011 |
| tamped density | g/ml | 0.192 +− 0.015 | 0.178 +− 0.015 | 0.175 +− 0.015 |
| Primary particle size | nm | 94 | 82 | 78 |
| particle size distribution D10 | μm | 3.978 ± 0.380 | 5.137 ± 0.520 | 4.973 ± 0.455 |
| particle size distribution D50 | μm | 9.383 ± 0.686 | 9.561 ± 0.690 | 9.423 ± 0.662 |
| particle size distribution D90 | μm | 25.622 ± 1.387 | 17.362 ± 0.921 | 18.722 ± 1.218 |
| C content | ppm | 34 ± 4 | 73 ± 6 | 80 ± 6 |
| Cl content | ppm | <60 | <60 | <60 |
| Al content | ppb | 20 | 20 | 20 |
| Total content of metals other than Al | ppb | <700 | <700 | <700 |
| residual moisture content | wt.-% | 0.02-1.0 | 0.02-1.0 | 0.02-1.0 |
| pH value in water 4% (IEP) | — | 4.8 | 4.6 | 4.5 |
| Viscosity at 5 rpm, aqueous suspension 30 Wt-%, 23° C. | mPas | 753 | 1262 | 1380 |
| Alkali earth metal content | ppb | 538 | 487 | 472 |

B. 1. Preparation of Silicon Dioxide Powder (Silicon Source: SiCl$_4$)

A portion of silicon tetrachloride (SiCl$_4$) is evaporated at a temperature T and introduced with a pressure P into a flame of a burner which is formed by igniting a mixture of oxygen enriched air and hydrogen. The mean normalised gas flow to the outlet is held constant. The process mixture is then cooled with process gas. The product was separated off at a filter. The process parameters are given in table 3 and the specifications of the resulting products are given in table 4. They are indicated with B1-x.

2. Modification 1: Increased Carbon Content

A process was carried out as described in B.1, but the burning of the silicon tetrachloride was performed such that an amount of carbon was also formed. Experimental data for this example are indicated with B2-x.

TABLE 3

| Example | | B1-1 | B2-1 |
|---|---|---|---|
| Aerosol formation | | | |
| Silicon tetrachloride feed | kg/h | 50 | 50 |
| | (kmol) | (0.294) | (0.294) |
| Temperature T | ° C. | 90 | 90 |
| Pressure p | barO | 1.2 | 1.2 |
| Burner feed | | | |
| Oxygen enriched air, | Nm³/h | 145 | 115 |
| O$_2$ content therein | Vol. % | 45 | 30 |
| Feed Carbon compound | | | |
| Material | | | methane |
| Amount | Nm³/h | | 2.0 |
| Hydrogen feed | Nm³/h | 115 | 60 |
| | kmol/h | 5.13 | 2.678 |
| Stoichiometric ratios | | | |
| X | | 0.567 | 0.575 |
| Y | | 0.946 | 0.85 |

X = as molar ratio O$_2$/H$_2$;
Y = molar ratio of employed O$_2$/O$_2$ required for stoichiometric reaction with SiCl4 + H2 + CH4);
barO = Over pressure.

TABLE 4

| Example | | B1-1 | B2-1 |
|---|---|---|---|
| BET | m²/g | 49 | 47 |
| Bulk density | g/ml | 0.07 ± 0.01 | 0.06 ± 0.01 |
| tamped density | g/ml | 0.11 ± 0.01 | 0.10 ± 0.01 |
| Primary particle size | nM | 48 | 43 |
| particle size distribution D10 | μm | 5.0 ± 0.5 | 4.5 ± 0.5 |
| particle size distribution D50 | μm | 9.3 ± 0.6 | 8.7 ± 0.6 |
| particle size distribution D90 | μm | 16.4 ± 0.5 | 15.8 ± 0.7 |
| C content | ppm | <4 | 76 |
| Cl content | ppm | 280 | 330 |
| Al content | ppb | 20 | 20 |
| Total of the concentrations of Ca, Co, Cr, Cu, Fe, Ge, Hf, K, Li, Mg, Mn, Mo, Na, Nb, Ni, Ti, V, W, Zn, Zr | ppb | <1300 | <1300 |
| residual moisture content | wt.-% | 0.02-1.0 | 0.02-1.0 |
| pH value in water 4% (IEP) | pH | 3.8 | 3.8 |
| Viscosity at 5 rpm, aqueous suspension 30 Wt-%, 23° C. | mPas | 5653 | 6012 |
| Alkali earth metal content | ppb | 550 | 342 |

C. Steam Treatment

A particle flow of silicon dioxide powder is introduced via the top of a standing column. Steam at a temperature (A) and air are fed via the bottom of the column. The column is maintained at a temperature (B) at the top of the column and at a second temperature (C) at the bottom of the column by an internally situated heater. After leaving the column (holding time (D)) the silicon dioxide powder has in particular the properties shown in Table 6. The process parameters are given in Table 5.

TABLE 5

| Example | | C-1 | C-2 |
|---|---|---|---|
| Educt: Product of | | B1-1 | B2-1 |
| Educt feed | kg/h | 100 | 100 |
| Steam feed | kg/h | 5 | 5 |
| Steam temperature (A) | ° C. | 120 | 120 |
| Air feed | Nm³/h | 4.5 | 4.5 |
| Column | | | |
| height | m | 2 | 2 |
| Inner diameter | mm | 600 | 600 |
| T (B) | ° C. | 260 | 260 |
| T (C) | ° C. | 425 | 425 |
| Holding time (D) silicon dioxide powder | s | 10 | 10 |

TABLE 6

| Example | | C-1 | C-2 |
|---|---|---|---|
| pH value in water 4% (IEP) | — | 4.6 | 4.6 |
| Cl content | ppm | <60 | <60 |
| C content | ppm | <4 | 36 |
| Viscosity at 5 rpm, aqueous suspension 30 Wt-%, 23° C. | mPas | 1523 | 1478 |

The silicon dioxide powders obtained in the examples C-1 and C-2 each have a low chlorine content as well as a moderate pH value in suspension. The carbon content of example C-2 is higher as for C-1.

D. Treatment with a Neutralising Agent

A particle flow of silicon dioxide powder is introduced via the top of a standing column. A neutralising agent and air are fed via the bottom of the column. The column is maintained at a temperature (B) at the top of the column and at a second temperature (C) at the bottom of the column by an internally situated heater. After leaving the column (holding time (D)) the silicon dioxide powder has in particular the properties shown in table 8. The process parameters are given in table 7.

TABLE 7

| Example | | D-1 |
|---|---|---|
| Educt: Product from | | B1-1 |
| Educt feed | kg/h | 100 |
| Neutralising agent | | Ammonia |
| Neutralising agent feed | kg/h | 1.5 |
| Neutralising agent specifications | | Obtainable from Air Liquide: Ammonia N38, purity ≥ 99.98 Vol. % |
| Air feed | Nm³/h | 4.5 |
| Column | | |
| height | m | 2 |
| inner diameter | mm | 600 |

TABLE 7-continued

| Example | | D-1 |
|---|---|---|
| T (B) | ° C. | 200 |
| T (C) | ° C. | 250 |
| Holding time (D) of silicon dioxide powder | s | 10 |

TABLE 8

| Example | | D-1 |
|---|---|---|
| pH value in water 4% (IEP) | — | 4.8 |
| Cl content | ppm | 210 |
| C content | ppm | <4 |
| Viscosity at 5 rpm, aqueous suspension 30 Wt-%, 23 ° C. | mPas | 821 |

E.1. Preparation of Silicon Dioxide Granulate from Silicon Dioxide Powder

A silicon dioxide powder is dispersed in fully desalinated water. For this, an intensive mixer of type R from the Gustav Eirich machine factory is used. The resulting suspension is pumped with a membrane pump and thereby pressurised and converted into droplets by a nozzle. These are dried in a spray tower and collect on the floor of the tower. The process parameters are given in Table 9 and the properties of the obtained granulate in Table 10. Experimental data for this example are indicated with E1-x.

2. Modification 1: Increased Carbon Content

The process is analogous to that described in E.1. Additionally, carbon powder is dispersed into the suspension. Experimental data for these examples are indicated with E2-x.

3. Modification 2: Addition of Silicon

The process is analogous to that described in E.1. Additionally, a silicon component is dispersed into the suspension. Experimental data for these examples are identified with E3-1.

TABLE 9

| Example | | E1-1 | E1-2 | E1-3 | E1-4 | E1-5 | E2-1 | E3-1 | E3-2 |
|---|---|---|---|---|---|---|---|---|---|
| Educt = Product from | | A1-1 | A2-1 | B1-1 | C-1 | C-2 | A1-1 | A1-1 | A2-1 |
| Amount of educt | Kg | 10 | 10 | 10 | 10 | 10 | 10 | 10 | 10 |
| Carbon powder | | | | | | | | | |
| Material | | — | — | — | — | — | C** | — | — |
| Max. Particle size | | | | | | | 75 μm | | |
| Amount | | | | | | | 1 g | | |
| Silicon component | | | | | | | | | |
| Material | | — | — | — | — | — | — | silicon powder*** | — |
| Grain size (d50) | | | | | | | | 8 μm | |
| Amount | | | | | | | | 1000 ppm | |
| Carbon content | | | | | | | | 0.5 ppm | |
| Total of the concentrations of Ca, Co, Cr, Cu, Fe, Ge, Hf, K, Li, Mg, Mn, Mo, Na, Nb, Ni, Ti, V, W, Zn, Zr | | | | | | | | 5 ppm | |
| Water | Rating* | FD | FD | FD | FD | FD | FD | FD | FD |
| | Litre | 5.4 | 5.4 | 5.4 | 5.4 | 5.4 | 5.4 | 5.4 | 5.4 |
| Dispersion | | | | | | | | | |
| Solids content | Wt. % | 65 | 65 | 65 | 65 | 65 | 65 | 65 | 65 |
| Nozzle | | | | | | | | | |
| Diameter | mm | 2.2 | 2.2 | 2.2 | 2.2 | 2.2 | 2.2 | 2.2 | 2.2 |
| Temperature | ° C. | 25 | 25 | 25 | 25 | 25 | 25 | 25 | 25 |
| Pressure | Bar | 16 | 16 | 16 | 16 | 16 | 16 | 16 | 16 |
| Installation height | m | 6.5 | 6.5 | 6.5 | 6.5 | 6.5 | 6.5 | 6.5 | 6.5 |

TABLE 9-continued

| Spray tower | | | | | | | | | |
|---|---|---|---|---|---|---|---|---|---|
| Height | m | 18.20 | 18.20 | 18.20 | 18.20 | 18.20 | 18.20 | 18.20 | 18.20 |
| Inner diameter | m | 6.30 | 6.30 | 6.30 | 6.30 | 6.30 | 6.30 | 6.30 | 6.30 |
| T (introduced gas) | ° C. | 380 | 380 | 380 | 380 | 380 | 380 | 380 | 380 |
| T (exhaust) | ° C. | 110 | 110 | 110 | 110 | 110 | 110 | 110 | 110 |
| Air flow | m³/h | 6500 | 6500 | 6500 | 6500 | 6500 | 6500 | 6500 | 6500 |

Installation height = distance between nozzle and lowest point of the spray tower interior in the direction of gravity.
*FD = fully desalinated, conductance ≤ 0.1 µS;
**C 006011: Graphite powder, max. particle size: 75 µm, high purity (available from Goodfellow GmbH, Bad Nauheim (Germany);
***available from Wacker Chemie AG (Munich, Germany).

| Example | | E8-5 | E8-6 | E8-7 | E8-8 |
|---|---|---|---|---|---|
| Educt = product from | | A1-1 | A1-1 | A1-1 | A1-1 |
| Amount of educt | kg | 10 | 10 | 10 | 10 |
| Carbon powder | | | | | |
| Material | | — | — | — | — |
| Max. particle size | | | | | |
| Amount | | | | | |
| Silicon component | | | | | |
| Material | | — | — | — | — |
| Water | Rating* | FD | FD | FD | FD |
| | Litre | 5.4 | 5.4 | 5.4 | 5.4 |
| Dispersion | | | | | |
| Solids content | Wt. % | 65 | 65 | 65 | 65 |
| Nozzle | | | | | |
| Diameter | mm | 2.2 | 2.2 | 2.2 | 2.2 |
| Temperature | ° C. | 25 | 25 | 25 | 25 |
| Pressure | Bar | 16 | 16 | 16 | 16 |
| Installation height | m | 6.5 | 6.5 | 6.5 | 6.5 |
| Spray tower | | | | | |
| Height | m | 18.2 | 18.2 | 18.2 | 18.2 |
| Inner diameter | m | 6.3 | 6.3 | 6.3 | 6.3 |
| T (Introduced gas) | ° C. | 380 | 380 | 380 | 380 |
| T (Exhaust) | ° C. | 110 | 110 | 110 | 110 |
| Air flow | m³/h | 6500 | 6500 | 6500 | 6500 |

Installation height = Distance between nozzle and lowest point of the spray tower interior in the direction of gravity.
*FD = fully desalinated, conductivity ≤ 0.1 µS;

TABLE 10

| Example | | E1-1 | E1-2 | E1-3 | E1-4 | E1-5 | E2-1 | E3-1 | E3-2 |
|---|---|---|---|---|---|---|---|---|---|
| BET | m²/g | 30 | 33 | 49 | 49 | 47 | 28 | 31 | 35 |
| Bulk density | g/ml | 0.8 ± 0.1 | 0.8 ± 0.1 | 0.8 ± 0.1 | 0.8 ± 0.1 | 0.8 ± 0.1 | 0.8 ± 0.1 | 0.8 ± 0.1 | 0.8 ± 0.1 |
| tamped density | g/ml | 0.9 ± 0.1 | 0.9 ± 0.1 | 0.9 ± 0.1 | 0.9 ± 0.1 | 0.9 ± 0.1 | 0.9 ± 0.1 | 0.9 ± 0.1 | 0.9 ± 0.1 |
| mean particle size | µm | 255 | 255 | 255 | 255 | 255 | 255 | 255 | 255 |
| particle size distribution D10 | µm | 110 | 110 | 110 | 110 | 110 | 110 | 110 | 110 |
| particle size distribution D50 | µm | 222 | 222 | 222 | 222 | 222 | 222 | 222 | 222 |
| particle size distribution D90 | µm | 390 | 390 | 390 | 390 | 390 | 390 | 390 | 390 |
| SPHT3 | Dim-less | 0.64-0.98 | 0.64-0.98 | 0.64-0.98 | 0.64-0.98 | 0.64-0.98 | 0.64-0.98 | 0.64-0.98 | 0.64-0.98 |
| Aspect ratio W/L (width to length) | Dim-less | 0.64-0.94 | 0.64-0.94 | 0.64-0.94 | 0.64-0.94 | 0.64-0.94 | 0.64-0.94 | 0.64-0.94 | 0.64-0.94 |
| C content | ppm | <4 | 39 | <4 | <4 | 32 | 100 | <4 | 39 |
| Cl content | ppm | <60 | <60 | 280 | <60 | <60 | <60 | <60 | <60 |
| Al content | ppb | 20 | 20 | 20 | 20 | 20 | 20 | 20 | 20 |
| Total of the concentrations of Ca, Co, Cr, Cu, Fe, Ge, Hf, K, Li, Mg, Mn, Mo, Na, Nb, Ni, Ti, V, W, Zn, Zr | ppb | <700 | <700 | <1300 | <1300 | <1300 | <700 | <700 | <700 |
| residual moisture content | wt.-% | <3 | <3 | <3 | <3 | <3 | <3 | <3 | <3 |
| Alkaline earth metal content | ppb | 538 | 487 | 550 | 550 | 342 | 538 | 538 | 487 |

TABLE 10-continued

| | | | | | | | | | |
|---|---|---|---|---|---|---|---|---|---|
| pore volume | ml/g | 0.33 | 0.33 | 0.45 | 0.45 | 0.45 | 0.33 | 0.33 | 0.33 |
| angle of repose | ° | 26 | 26 | 26 | 26 | 26 | 26 | 26 | 26 |

| Example | | E8-5 | E8-6 | E8-7 | E8-8 |
|---|---|---|---|---|---|
| BET | m²/g | 28 | 26 | 28 | 27 |
| Bulk density | g/ml | 0.8 ± 0.1 | 0.8 ± 0.1 | 0.8 ± 0.1 | 0.8 ± 0.1 |
| Tamped density | g/ml | 0.9 ± 0.1 | 0.9 ± 0.1 | 0.9 ± 0.1 | 0.9 ± 0.1 |
| mean particle size | μm | 255 | 255 | 255 | 255 |
| Particle size distribution D10 | μm | 110 | 110 | 110 | 110 |
| Particle size distribution D50 | μm | 222 | 222 | 222 | 222 |
| Particle size distribution D90 | μm | 390 | 390 | 390 | 390 |
| SPHT3 | Dim. Less | 0.64-0.98 | 0.64-0.98 | 0.64-0.98 | 0.64-0.98 |
| Aspect ratio W/L (Width to length) | Dim. Less | 0.64-0.94 | 0.64-0.94 | 0.64-0.94 | 0.64-0.94 |
| C content | ppm | 100 | 100 | 100 | 100 |
| Cl content | ppm | <60 | <60 | <60 | <60 |
| Al content | ppb | 20 | 20 | 20 | 20 |
| Total of the concentrations of Ca, Co, Cr, Cu, Fe, Ge, Hf, K, Li, Mg, Mn, Mo, Na, Nb, Ni, Ti, V, W, Zn, Zr | ppb | <700 | <700 | <700 | <700 |
| Residual moisture | Wt. % | <3 | <3 | <3 | <3 |
| Alkali earth metal content | ppb | 512 | 516 | 506 | 486 |
| Pore volume | ml/g | 0.33 | 0.33 | 0.33 | 0.33 |
| Angle of repose | ° | 26 | 26 | 26 | 26 |

The granulates are all open pored, have a uniform and spherical shape (all by microscopic investigation). They tend not to stick together or cement.

F. Cleaning of Silicon Dioxide Granulate

Silicon dioxide granulate is first optionally treated with oxygen or nitrogen (see table 11) at a temperature T1. Subsequently, the silicon dioxide granulate is treated with a co-flow of a chlorine containing component, wherein the temperature is raised to a temperature T2. The process parameters are given in Table 11 and the properties of the obtained treated granulate in Table 12.

TABLE 11

| Example | | F1-1 | F1-2 | F1-3 | F1-4 | F1-5 | F2-1 | F3-1 | F3-2 | F8-5 | F8-6 | F8-7 | F8-8 |
|---|---|---|---|---|---|---|---|---|---|---|---|---|---|
| Educt = Product from Rotary kiln[1)] | | E1-1 | E1-2 | E1-3 | E1-4 | E1-5 | E2-1 | E3-1 | E3-2 | E8-5 | E8-6 | E8-7 | E8-8 |
| length | cm | 200 | | 200 | 200 | 200 | | 200 | 200 | 200 | 200 | 200 | 200 |
| Inner diameter | cm | 10 | | 10 | 10 | 10 | | 10 | 10 | 10 | 10 | 10 | 10 |
| Throughput | kg/h | 2 | | 2 | 2 | 2 | | 2 | 2 | 2 | 2 | 2 | 2 |
| Rotational speed | rpm | 2 | | 2 | 2 | 2 | | 2 | 2 | 2 | 2 | 2 | 2 |
| T1 | ° C. | 1100 | NA | 1100 | 1100 | 1100 | NA | 1100 | 1100 | 1100 | 1100 | 1100 | 1100 |
| Atmosphere | | O2 pure | NA | O2 pure | O2 pure | O2 pure | NA | N2 | N2 | $N_2$ | $N_2$ | $N_2$ | $N_2$ |
| Reactant | | O2 | NA | O2 | O2 | O2 | NA | None | None | None | None | None | None |
| Feed | | 300 l/h | NA | 300 l/h | 300 l/h | 300 l/h | NA | | | 300 l/h | 300 l/h | 300 l/h | 300 l/h |
| | | none | NA | None | none | none | NA | | | <1 | <1 | <1 | <1 |
| residual moisture content | wt.-% | <1 | <3 | <1 | <1 | <1 | <3 | <1 | <1 | <1 | <1 | <1 | <1 |
| T2 | ° C. | 1100 | 1100 | 1100 | 1100 | 1100 | 1100 | NA | NA | NA | NA | NA | NA |
| Co-flow | | | | | | | | | | | | | |
| Component 1: HCl | l/h | 50 | 50 | 50 | 50 | 50 | 50 | NA | NA | NA | NA | NA | NA |
| Component 2: Cl2 | l/h | 0 | 15 | 0 | 0 | 0 | 15 | NA | NA | | | | |
| Component 3: N2 | l/h | 50 | 35 | 50 | 50 | 50 | 35 | NA | NA | NA | NA | NA | NA |
| Total co-flow | l/h | 100 | 100 | 100 | 100 | 100 | 100 | NA | NA | NA | NA | NA | NA |

[1)]For the rotary kilns, the throughput is selected as the control variable. That means that during operation the mass flow exiting from the rotary kiln is weighed and then the rotational speed and/or the inclination of the rotary kiln is adapted accordingly. For example, an increase in the throughput can be achieved by a) increasing the rotational speed, or b) increasing the inclination of the rotary kiln away from horizontal, or a combination of a) and b).

TABLE 12

| Example | | F1-1 | F1-2 | F1-3 | F1-4 | F1-5 | F2-1 | F3-1 |
|---|---|---|---|---|---|---|---|---|
| BET | m²/g | 25 | 27 | 43 | 45 | 40 | 23 | 25 |
| C content | ppm | <4 | <4 | <4 | <4 | <4 | <4 | <4 |
| Cl content | ppm | 100-200 | 100-200 | 300-400 | 100-200 | 100-200 | 100-200 | <60 |
| Al content | ppb | 20 | 20 | 20 | 20 | 20 | 20 | 20 |
| pore volume | mm³/g | 650 | 650 | 650 | 650 | 650 | 650 | 650 |
| Total of the concentrations of Ca, Co, Cr, Cu, Fe, Ge, Hf, K, Li, Mg, Mn, Mo, Na, Nb, Ni, Ti, V, W, Zn, Zr | ppb | <200 | <200 | <200 | <200 | <200 | <200 | <700 |
| Alkaline earth metal content | ppb | 115 | 55 | 95 | 115 | 40 | 35 | 136 |
| tamped density | g/cm³ | 0.95 ± 0.05 | 0.95 ± 0.05 | 0.95 ± 0.05 | 0.95 ± 0.05 | 0.95 ± 0.05 | 0.95 ± 0.05 | 0.95 ± 0.05 |

| Example | | F3-2 | F8-5 | F8-6 | F8-7 | F8-8 |
|---|---|---|---|---|---|---|
| BET | m²/g | 26 | 24 | 24 | 25 | 26 |
| C content | ppm | <4 | <4 | <4 | <4 | <4 |
| Cl content | ppm | <60 | <60 | <60 | <60 | <60 |
| Al content | ppb | 20 | 20 | 20 | 20 | 20 |
| pore volume | mm³/g | 650 | 650 | 650 | 650 | 650 |
| Total of the concentrations of Ca, Co, Cr, Cu, Fe, Ge, Hf, K, Li, Mg, Mn, Mo, Na, Nb, Ni, Ti, V, W, Zn, Zr | ppb | <700 | <700 | <700 | <700 | <700 |
| Alkaline earth metal content | ppb | 33 | 118 | 124 | 136 | 33 |
| tamped density | g/cm³ | 0.95 ± 0.05 | 0.95 ± 0.05 | 0.95 ± 0.05 | 0.95 ± 0.05 | 0.95 ± 0.05 |

In the case of F1-2, F2-1 and F3-2, the granulates after the cleaning step show a significantly reduced carbon content (like low carbon granulate, e.g. F1-1). In particular, F1-2, F1-5, F2-1 and F3-2 show a significantly reduced content of alkaline earth metals. SiC formation was not observed.

G. Treatment of Silicon Dioxide Granulate by Warming

Silicon dioxide granulate is subjected to a temperature treatment in a pre chamber in the form of a rotary kiln which is positioned upstream of the melting oven and which is connected in flow connection to the melting oven via a further intermediate chamber. The rotary kiln is characterised by a temperature profile which increases in the flow direction. A further treated silicon dioxide granulate was obtained. In example G-4-2 no treatment by warming was performed during mixing in the rotary kiln. The process parameters are given in Table 13 and the properties of the obtained treated granulate in Table 14.

TABLE 13

| Example | | G1-1 | G1-2 | G1-3 | G1-4 | G1-5 | G2-1 | G3-1 | G3-2 |
|---|---|---|---|---|---|---|---|---|---|
| Educt = Product from Silicon components | | F1-1 | F1-2 | F1-3 | F1-4 | F1-5 | F2-1 | F3-1 | F3-2 |
| Material Amount | | — | — | — | — | — | — | — | — |
| Rotary kiln | | | | | | | | | |
| Length | cm | 200 | 200 | 200 | 200 | 200 | 200 | 200 | 200 |
| Inner diameter | cm | 10 | 10 | 10 | 10 | 10 | 10 | 10 | 10 |
| Throughput | kg/h | 8 | 5 | 5 | 5 | 5 | 5 | 5 | 5 |
| Rotation speed | rpm | 30 | 30 | 30 | 30 | 30 | 30 | 30 | 30 |
| T1 (Rotary kiln inlet) | °C. | RT | RT | RT | RT | RT | RT | RT | RT |
| T2 (Rotary kiln outlet) | °C. | 500 | 500 | 500 | 500 | 500 | 500 | 500 | 500 |
| Atmosphere | | | | | | | | | |
| Gas, flow direction | | air, free convection | $O_2$, in contraflow | $O_2$, in contraflow | $O_2$, in contraflow | $O_2$, in contraflow | $O_2$, in contraflow | $O_2$, in contraflow | $O_2$, in contraflow |
| Total throughput of gas flow | Nm³/h | | 0.6 | 0.6 | 0.6 | 0.6 | 0.6 | 0.6 | 0.6 |

| Example | | G4-1 | G4-2 | G8-5 | G8-6 | G8-7 | G8-8 |
|---|---|---|---|---|---|---|---|
| Educt = Product from Silicon components | | F1-1 | F1-1 | F8-5 | F8-6 | F8-7 | F8-8 |
| Material Amount | | Silicon powder*** 0.01% | Silicon powder*** 0.1% | — | — | — | — |
| Rotary kiln | | | | | | | |
| Length | cm | 200 | NA | 200 | 200 | 200 | 200 |
| Inner diameter | cm | 10 | | 10 | 10 | 10 | 10 |
| Throughput | kg/h | 5 | | 10 | 10 | 10 | 10 |
| Rotation speed | rpm | 30 | | 8 | 8 | 8 | 8 |
| T1 (Rotary kiln inlet) | °C. | RT | | 30 | 30 | 30 | 30 |
| T2 (Rotary kiln outlet) | °C. | 500 | | RT | RT | RT | RT |

TABLE 13-continued

| | | Atmosphere | | | | |
|---|---|---|---|---|---|---|
| Gas, flow direction | | $O_2$, in contraflow | Air, free convection | Air, free convection | Air, free convection | Air, free convection |
| Total throughput of gas flow | $Nm^3/h$ | 0.6 | 0.6 | 0.6 | 0.6 | 0.6 |

\*\*\*Grain size $D_{50}$ = 8 μm; carbon content ≤5 ppm; Total foreign metals ≤5 ppm; 0.5 ppm; available from Wacker Chemie AG (Munich, Germany).
RT = room temperature (25° C.).
[1]) For the rotary kilns, the throughput is selected as the control variable. That means that during operation the mass flow exiting from the rotary kiln is weighed and then the rotational speed and/or the inclination of the rotary kiln is adapted accordingly. For example, an increase in the throughput can be achieved by a) increasing the rotational speed, or b) increasing the inclination of the rotary kiln away from horizontal, or a combination of a) and b).

TABLE 14

| Example | | G1-1 | G1-2 | G1-3 | G1-4 | G1-5 | G2-1 | G3-1 | G3-2 |
|---|---|---|---|---|---|---|---|---|---|
| BET | $m^2/g$ | 22 | 23 | 38 | 42 | 37 | 22 | 22 | 21 |
| Water content (residual moisture) | ppm | 500 | 100 | 100 | 100 | 100 | 100 | 500 | 100 |
| C content | ppm | <4 | <4 | <4 | <4 | <4 | <4 | <4 | <4 |
| Cl content | ppm | 100-200 | 100-200 | 300-400 | 100-200 | 100-200 | 100-200 | <60 | <60 |
| Al content | ppb | 20 | 20 | 20 | 20 | 20 | 20 | 20 | 20 |
| Total of the concentrations of Ca, Co, Cr, Cu, Fe, Ge, Hf, K, Li, Mg, Mn, Mo, Na, Nb, Ni, Ti, V, W, Zn, Zr | ppb | ≤200 | ≤200 | ≤200 | ≤200 | ≤200 | ≤200 | ≤200 | ≤200 |
| Alkaline earth metal content | ppb | 115 | 55 | 95 | 115 | 40 | 35 | 136 | 33 |
| angle of repose | ° | 26 | 26 | 26 | 26 | 26 | 26 | 26 | 26 |

| Example | | G4-1 | G4-2 | G8-5 | G8-6 | G8-7 | G8-8 |
|---|---|---|---|---|---|---|---|
| BET | $m^2/g$ | 22 | 24 | 23 | 22 | 24 | 22 |
| Water content (residual moisture) | ppm | 500 | <10000 | 300 | 500 | 700 | 1000 |
| C content | ppm | <4 | <4 | <4 | <4 | <4 | <4 |
| Cl content | ppm | 100-200 | 100-200 | <60 | <60 | <60 | <60 |
| Al content | ppb | 20 | 20 | 20 | 20 | 20 | 20 |
| Total of the concentrations of Ca, Co, Cr, Cu, Fe, Ge, Hf, K, Li, Mg, Mn, Mo, Na, Nb, Ni, Ti, V, W, Zn, Zr | ppb | ≤200 | ≤200 | ≤200 | ≤200 | ≤200 | ≤200 |
| Alkaline earth metal content | ppb | 115 | 115 | 116 | 119 | 115 | 31 |
| angle of repose | ° | 26 | 26 | 26 | 26 | 26 | 26 |

Due to this treatment, G3-1 and G3-2 exhibit a significantly reduced alkaline earth metal content in comparison to before (E3-1 & E3-2 respectively).

H. Melting of Granulate to Obtain Quartz Glass

Silicon dioxide granulate according to line 2 of Table 15 is employed for preparing a quartz glass tube in a vertical crucible drawing process. The structure of the standing oven, for example H5-1 comprising a standing melting crucible is shown schematically in FIG. 7, and for all the other examples with a hanging melting crucible FIG. 6 serves as a schematic representation. The silicon dioxide granulate is introduced via the solids feed and the interior of the melting crucible is flushed with a gas mixture. In the melting crucible, a glass melt forms upon which a reposing cone of silicon dioxide granulate sits. In the lower region of the melting crucible, molten glass is removed from the glass melt through a die (optionally with a mandrel) and is pulled vertically down in the form of a tubular thread. The output of the plant results from the weight of the glass melt, the viscosity of the glass through the nozzle the size of the hole provided by the nozzle. By varying the feed rate of silicon dioxide granulate and the temperature, the output can be set to the desired level. The process parameters are given in Table 15 and Table 17 and in some cases in Table 19 and the properties of the formed quartz glass body in Table 16 and Table 18.

In Example H7-1, a gas distributing ring is arranged in the melting crucible, with which the flushing gas is fed close to the surface of the glass melt. An example of such an arrangement is shown in FIG. 8.

In Example H8-x. the dew point is measured at the gas outlet. The measuring principle is shown in FIG. 12. Between the outlet of the melting crucible and the measuring location of the dew point, the gas flow covers a distance of 100 cm.

TABLE 15

| Example | | H1-1 | H1-2 | H1-3 | H1-4 | H1-5 |
|---|---|---|---|---|---|---|
| Educt = Product from Melting crucible | | G1-1 | G1-2 | G1-3 | G1-4 | G1-5 |
| Type | | Hanging metal sheet crucible | Hanging metal sheet crucible | Hanging metal sheet crucible | Hanging metal sheet crucible | Hanging metal sheet crucible |
| Type of metal | cm | tungsten | tungsten | tungsten | tungsten | tungsten |

TABLE 15-continued

| | | | | | | |
|---|---|---|---|---|---|---|
| length | cm | 200 | 150 | 150 | 150 | 150 |
| Inner diameter | | 40 | 25 | 25 | 25 | 25 |
| Throughput | kg/h | 30 | 20 | 20 | 20 | 20 |
| T1 (Gas compartment of the melting crucible) | °C. | 300 | 300 | 300 | 300 | 300 |
| T2 (glass melt) | °C. | 2100 | 2100 | 2100 | 2100 | 2100 |
| T3 (nozzle) | °C. | 1900 | 1900 | 1900 | 1900 | 1900 |
| Atmosphere/Flushing gas | | | | | | |
| He Concentration | Vol.-% | 50 | 50 | 50 | 50 | 50 |
| $H_2$ Concentration | Vol.-% | 50 | 50 | 50 | 50 | 50 |
| Total gas flow throughput | $Nm^3/h$ | 4 | 4 | 4 | 4 | 4 |
| $O_2$ | ppm | ≤100 | ≤100 | ≤100 | ≤100 | ≤100 |

| Example | | H3-1 | H3-2 | H4-1 | H4-2 |
|---|---|---|---|---|---|
| Educt = Product from Melting crucible | | G3-1 | G3-2 | G4-1 | G4-2 |
| Type | | Hanging metal sheet crucible | Hanging metal sheet crucible | Hanging metal sheet crucible | Hanging metal sheet crucible |
| Type of metal | cm | tungsten | tungsten | tungsten | tungsten |
| length | cm | 200 | 150 | 200 | 200 |
| Inner diameter | | 40 | 25 | 40 | 40 |
| Throughput | kg/h | 30 | 20 | 30 | 30 |
| T1 (Gas compartment of the melting crucible) | °C. | 300 | 300 | 300 | 300 |
| T2 (glass melt) | °C. | 2100 | 2100 | 2100 | 2100 |
| T3 (nozzle) | °C. | 1900 | 1900 | 1900 | 1900 |
| Atmosphere/Flushing gas | | | | | |
| He Concentration | Vol.-% | 50 | 50 | 50 | 50 |
| $H_2$ Concentration | Vol.-% | 50 | 50 | 50 | 50 |
| Total gas flow throughput | $Nm^3/h$ | 2 | 4 | 2 | 2 |
| $O_2$ | ppm | ≤100 | ≤100 | ≤100 | ≤100 |

TABLE 16

| Example | | H1-1 | H1-2 | H1-3 | H1-4 | H1-5 |
|---|---|---|---|---|---|---|
| C content | ppm | <4 | <4 | <4 | <4 | <4 |
| Cl content | ppm | 100-200 | 100-200 | 300-400 | 100-200 | 100-200 |
| Al content | ppb | 20 | 20 | 20 | 20 | 20 |
| Total of the concentrations of Ca, Co, Cr, Cu, Fe, Ge, Hf, K, Li, Mg, Mn, Mo, Na, Nb, Ni, Ti, V, W, Zn, Zr | ppb | <400 | <400 | <400 | <400 | <400 |
| OH content | ppm | 400 | 400 | 400 | 400 | 400 |
| Alkaline earth metal content | ppb | 115 | 55 | 95 | 115 | 40 |
| ODC content | $l/cm^3$ | $4*10^{15}$ | $2*10^{16}$ | $4*10^{15}$ | $4*10^{15}$ | $4*10^{15}$ |
| pore volume | mL/g | 0.1 | 0.1 | 0.1 | 0.1 | 0.1 |
| Outer diameter tubular thread/quartz glass body | cm | 19.7 | 3.0 | 19.7 | 19.7 | 19.7 |
| Viscosity | | | | | | |
| @1250° C. | $Lg(\eta/dPas)$ | 11.69 ± 0.13 | 11.69 ± 0.13 | 11.69 ± 0.13 | 11.69 ± 0.13 | 11.69 ± 0.13 |
| @1300° C. | | 11.26 ± 0.1 | 11.26 ± 0.1 | 11.26 ± 0.1 | 11.26 ± 0.1 | 11.26 ± 0.1 |
| @1350° C. | | 10.69 ± 0.07 | 10.69 ± 0.07 | 10.69 ± 0.07 | 10.69 ± 0.07 | 10.69 ± 0.07 |

| Example | | H3-1 | H3-2 | H4-1 | H4-2 |
|---|---|---|---|---|---|
| C content | ppm | <4 | <4 | <4 | <4 |
| Cl content | ppm | <60 | <60 | 100-200 | 100-200 |
| Al content | ppb | 20 | 20 | 20 | 20 |
| Total of the concentrations of Ca, Co, Cr, Cu, Fe, Ge, Hf, K, Li, Mg, Mn, Mo, Na, Nb, Ni, Ti, V, W, Zn, Zr | ppb | <400 | <400 | <400 | <400 |
| OH content | ppm | 80 | 400 | 80 | 80 |
| Alkaline earth metal content | ppb | 136 | 33 | 115 | 115 |
| ODC content | $l/cm^3$ | $5*10^{18}$ | $2*10^{16}$ | $5*10^{18}$ | $8*10^{18}$ |
| pore volume | mL/g | 0.1 | 0.1 | 0.1 | 0.1 |
| Outer diameter tubular thread/quartz glass body | cm | 19.7 | 3.0 | 19.7 | 19.7 |

TABLE 16-continued

| Viscosity | | | | | | |
|---|---|---|---|---|---|---|
| @1250° C. | Lg(η/dPas) | 12.16 ± 0.2 | 11.69 ± 0.13 | 12.16 ± 0.2 | 12.16 ± 0.2 |
| @1300° C. | | 11.49 ± 0.15 | 11.26 ± 0.1 | 11.49 ± 0.15 | 11.49 ± 0.15 |
| @1350° C. | | 10.88 ± 0.1 | 10.69 ± 0.07 | 10.88 ± 0.1 | 10.88 ± 0.1 |

"±"-value are the standard deviation.

TABLE 17

| Example | | H5-1 | H6-1 | H7-1 | H8-1 | H8-2 | H8-3 |
|---|---|---|---|---|---|---|---|
| Educt = Product from Melting crucible | | G1-1 | G1-1 | G1-1 | G1-1 | G1-1 | G1-1 |
| Type | | Standing sinter crucible | Hanging sinter crucible | Hanging metal sheet crucible | Hanging metal sheet crucible | Hanging metal sheet crucible | Hanging metal sheet crucible |
| Type of metal | | tungsten | tungsten | tungsten | tungsten | tungsten | tungsten |
| Additional fittings and fixtures | | — | — | Gas distributor ring | dew point measurement | dew point measurement | dew point measurement |
| Length | cm | 250 | 250 | 200 | 200 | 200 | 200 |
| Inner diameter | cm | 40 | 36 | 40 | 40 | 40 | 40 |
| Throughput | kg/h | 40 | 35 | 30 | 30 | 30 | 30 |
| T1 (Gas compartment of melting crucible) | ° C. | 300 | 400 | 300 | 300 | 300 | 300 |
| T2 (glass melt) | ° C. | 2100 | 2150 | 2100 | 2100 | 2100 | 2100 |
| T3 (Nozzle) | ° C. | 1900 | 1900 | 1900 | 1900 | 1900 | 1900 |
| Atmosphere | | | | | | | |
| He Concentration | Vol.-% | 30 | 50 | 50 | 50 | 50 | 50 |
| $H_2$ Concentration | Vol.-% | 70 | 50 | 50 | 50 | 50 | 50 |
| Total gas flow throughput | $Nm^3$/h | 4 | 4 | 8 | 8 | 4 | 3 |
| $O_2$ | ppm | <100 | <100 | ≤10 | ≤100 | ≤100 | ≤100 |

| Example | | H8-4 | H8-5 | H8-6 | H8-7 | H8-8 |
|---|---|---|---|---|---|---|
| Educt = Product from Melting crucible | | G1-1 | G8-5 | G8-6 | G8-7 | G8-8 |
| Type | | Hanging metal sheet crucible | Hanging metal sheet crucible | Hanging metal sheet crucible | Hanging metal sheet crucible | Hanging metal sheet crucible |
| Type of metal | | tungsten | tungsten | tungsten | tungsten | tungsten |
| Additional fittings and fixtures | | dew point measurement | dew point measurement | dew point measurement | dew point measurement | dew point measurement |
| Length | cm | 200 | 200 | 200 | 200 | 200 |
| Inner diameter | cm | 40 | 40 | 40 | 40 | 40 |
| Throughput | kg/h | 30 | 30 | 30 | 30 | 30 |
| T1 (Gas compartment of melting crucible) | ° C. | 300 | 300 | 300 | 300 | 300 |
| T2 (glass melt) | ° C. | 2100 | 2100 | 2100 | 2100 | 2100 |
| T3 (Nozzle) | ° C. | 1900 | 1900 | 1900 | 1900 | 1900 |
| Atmosphere | | | | | | |
| He Concentration | Vol.-% | 50 | 50 | 50 | 30 | 50 |
| $H_2$ Concentration | Vol.-% | 50 | 50 | 50 | 70 | 50 |
| Total gas flow throughput | $Nm^3$/h | 2 | 4 | 4 | 4 | 4 |
| $O_2$ | ppm | ≤100 | ≤100 | ≤100 | ≤100 | ≤100 |

TABLE 18

| Example | | H5-1 | H6-1 | H7-1 | H8-1 | H8-2 | H8-3 |
|---|---|---|---|---|---|---|---|
| C content | ppm | <4 | <4 | <4 | <4 | <4 | <4 |
| Cl content | ppm | 100-200 | 100-200 | 100-200 | 100-200 | 100-200 | 100-200 |
| Al content | ppb | 20 | 20 | 20 | 20 | 20 | 20 |

TABLE 18-continued

| | | | | | | | |
|---|---|---|---|---|---|---|---|
| Total of the concentrations of Ca, Co, Cr, Cu, Fe, Ge, Hf, K, Li, Mg, Mn, Mo, Na, Nb, Ni, Ti, V, W, Zn, Zr | ppb | <400 | <400 | <400 | <400 | <400 | <400 |
| OH content | ppm | 400 | 400 | 400 | 250 | 400 | 500 |
| Alkaline earth metal content | ppb | 115 | 115 | 115 | 115 | 115 | 115 |
| ODC content | $l/cm^3$ | $<4*10^{15}$ | $<4*10^{15}$ | $<4*10^{15}$ | $<4*10^{15}$ | $<4*10^{15}$ | $<4*10^{15}$ |
| Content of W, Mo, Re, Ir, Os | | <300 ppb | <300 ppb | <100 ppb | <50 ppb | <100 ppb | <5 ppm |
| Outer diameter of tubular thread/quartz glass body | cm | 26.0 | 19.7 | 19.7 | 19.7 | 19.7 | 19.7 |
| Viscosity | | | | | | | |
| @1250° C. | $lg(\eta/dPas)$ | 11.69 ± 0.13 | 11.69 ± 0.13 | 11.69 ± 0.13 | 12.06 ± 0.15 | 11.69 ± 0.13 | 11.69 ± 0.13 |
| @1300° C. | | 11.26 ± 0.1 | 11.26 ± 0.1 | 11.26 ± 0.1 | 11.38 ± 0.1 | 11.26 ± 0.1 | 11.26 ± 0.1 |
| @1350° C. | | 10.69 ± 0.07 | 10.69 ± 0.07 | 10.69 ± 0.07 | 10.75 ± 0.08 | 10.69 ± 0.07 | 10.69 ± 0.07 |

| Example | | H8-4 | H8-5 | H8-6 | H8-7 | H8-8 |
|---|---|---|---|---|---|---|
| C content | ppm | <4 | <4 | <4 | <4 | <4 |
| Cl content | ppm | 100-200 | <60 | <60 | <60 | <60 |
| Al content | ppb | 20 | 20 | 20 | 20 | 20 |
| Total of the concentrations of Ca, Co, Cr, Cu, Fe, Ge, Hf, K, Li, Mg, Mn, Mo, Na, Nb, Ni, Ti, V, W, Zn, Zr | ppb | <400 | <400 | <400 | <400 | <400 |
| OH content | ppm | 800 | 400 | 350 | 450 | 500 |
| Alkaline earth metal content | ppb | 115 | 116 | 119 | 115 | 31 |
| ODC content | $l/cm^3$ | $<4*10^{15}$ | $<4*10^{15}$ | $<4*10^{15}$ | $<4*10^{15}$ | $<4*10^{15}$ |
| Content of W, Mo, Re, Ir, Os | | 100 ppm | 94 ppb | 25 ppb | 1 ppm | 1.5 ppm |
| Outer diameter of tubular thread/quartz glass body | cm | 19.7 | 19.7 | 19.7 | 19.7 | 19.7 |
| Viscosity | | | | | | |
| @1250° C. | $lg(\eta/dPas)$ | 11.63 ± 0.13 | 11.69 ± 0.13 | 11.69 ± 0.13 | 11.69 ± 0.13 | 11.69 ± 0.13 |
| @1300° C. | | 11.22 ± 0.1 | 11.26 ± 0.1 | 11.26 ± 0.1 | 11.2 g ± 0.1 | 11.26 ± 0.1 |
| @1350° C. | | 10.65 ± 0.07 | 10.69 ± 0.07 | 10.69 ± 0.07 | 10.69 ± 0.07 | 10.69 ± 0.07 |

TABLE 19

| Example | | H-7-1 | H8-1 | H8-2 | H8-3 | H8-4 |
|---|---|---|---|---|---|---|
| Distributor ring (Gas inlet in the melting crucible), Height above the glass melt | cm | 2 | — | — | — | — |
| Location of gas outlet | | In the lid of the melting crucible | In the lid of the melting crucible | In the lid of the melting crucible | In the lid of the melting crucible | In the lid of the melting crucible |
| Dew point of the gas flow | | | | | | |
| Before introduction into melting crucible | | −90 | −90 | −90 | −90 | −90 |
| After removal from melting crucible | | −10 | −30 | −10 | 0 | +10 |

I. Post Processing of a Quartz Glass Body

A quartz glass body obtained in example H1-1 and which has already been drawn (1000 kg, Surface area=110 m²; Diameter=1.65 cm, Total length 2120 m) is cut into pieces with a length of 200 cm by scoring and striking. The end surfaces were post worked by sawing to obtain a flat end surface. The obtained batch of quartz glass bodies (I-1) was cleaned by dipping in an HF bath (V=2 m³) for 30 minutes and then rinsed with fully desalinated water (to obtain quartz glass body (I-1')).

J. "Used Acid" (HF Bath after Use)

The liquid in the dipping bath in example I (V=2 m³) is tested directly after the treatment of the quartz glass body (I-1') and without further treatment. The liquid employed for the above described treatment is characterised before and after the treatment by the properties given in Table 20.

TABLE 20

| Element | Unit | Before treatment of a quartz glass body | After treatment of a quartz glass body of mass m = 1000 kg and surface area of 110 m² |
|---|---|---|---|
| Al | ppm | 0.04 | 0.8 |
| Refractory metal (W, Mo, . . . ) | ppm | 0 | 0.15 |

TABLE 20-continued

| Element | Unit | Before treatment of a quartz glass body | After treatment of a quartz glass body of mass m = 1000 kg and surface area of 110 m² |
|---|---|---|---|
| Further metals according to entire list * in total, of which | ppm | 0.15 | 1 |
| Ca | ppm | 0.01 | 0.3 |
| Mg | ppm | 0.04 | 0.09 |
| Na | ppm | 0.04 | 0.1 |
| Cr | ppm | 0.01 | 0.01 |
| Ni | ppm | 0.001 | 0.01 |
| Fe | ppm | 0.01 | 0.05 |
| Zr | ppm | 0.01 | 0.05 |
| Ti | ppm | 0.01 | 0.05 |
| HF | wt.-% | 40 | 35 |
| Content of Si-F compounds | wt.-% | 4 | 6 |
| Density | g/cm³ | 1.14 | 1.123 |

K. Form Change (Resizing)

Form change tests were carried out. For this, a glass tube with a diameter of 200 mm was provided. This was then broadened, each time by 50 mm in multiple cycles by blowing in the warm (T=2100° C.). With the broadening goes a reduction of the wall strength. The test was performed on quartz glass tubes with different tungsten concentration. Subsequently, the wall strength of the tube was measured along the cross secction. FIG. 15a shows an exemplar for the result for a tungsten rich place in a tube, FIG. 15b for a tungsten poor tube. In each case, the uppermost line corresponds to a tube diameter of 250 mm, the next for 300 mm, then 350 mm and the lowermost for 400 mm.

An increased tungsten content in the quartz glass tube is normally homogeneously distributed. The tungsten inclusions are not homogeneously dissolved in the quartz glass and can also not diffuse. Point or line shaped accumulations occur in the quartz glass tube. In these places, the tungsten content is locally between 10 and 100 ppm, whereas in the surrounding tube wall region, a tungsten content of <100 ppb is found. In a further processing of such tubes, these regions in the quartz glass body are tougher than those which have a lower tungsten content, at the same temperature. As a result, sections occur in the form modified tube in which the wall strength of the tube is greater than in other sections. It does occur that the quartz glass tube is up to 0.5 mm thicker at places with increased tungsten content. Such an irregularly formed tube cannot be directly processed further, but must be resized with the expenditure of much effort.

The invention claimed is:

1. A process for preparing a quartz glass body comprising pyrogenic silicon dioxide, comprising:
    providing a silicon dioxide granulate comprising:
        providing a pyrogenic silicon dioxide powder; and
        processing the silicon dioxide powder to give a silicon dioxide granulate,
        wherein the silicon dioxide granulate has a larger particle diameter than the silicon dioxide powder;
    making a glass melt from the silicon dioxide granulate in a melting crucible; and
    making a quartz glass body from at least a part of the glass melt;
    wherein the melting crucible is comprised in an oven,
    wherein the melting crucible is made of at least one material comprising tungsten or molybdenum or a combination thereof, and
    wherein the quartz glass body comprises:
        an OH content of less than 500 ppm;
        a chlorine content of less than 60 ppm;
        a tungsten content of less than 1000 ppb;
        a molybdenum content of less than 1000 ppb;
    wherein the ppb and ppm are based on the total weight of the quartz glass body in each case.

2. The process according to claim 1, wherein the oven has at least one gas inlet and one gas outlet, wherein a gas which is removed through the gas outlet has a dew point of less than 0° C. on exiting the oven through the gas outlet.

3. The process according to claim 1, wherein the melting crucible does not have a coating selected from a material comprising rhenium, iridium, osmium or a combination thereof on the surface facing the glass melt.

4. The process according to claim 1, wherein the quartz glass body comprises at least one of:
    an aluminium content of less than 200 ppb;
    an ODC content of less than $5 \cdot 10^{15}/cm^3$;
    a metal content of metals which are different from aluminium of less than 1 ppm;
    a viscosity (p=1013 hPa) in a range from $\log_{10} (\eta \ (1250° C.)/dPas)=11.4$ to $\log_{10} (\eta \ (1250° C.)/dPas)=12.9$, or $\log_{10} (\eta \ (1300° C.)/dPas)=11.1$ to $\log_{10} (\eta \ (1300° C.)/dPas)=12.2$, or $\log_{10} (\eta \ (1350° C.)/dPas)=10.5$ to $\log_{10} (\eta \ (1350° C.)/dPas)=11.5$;
    a standard deviation of the OH content of not more than 10%, based on the OH content of the quartz glass body;
    a standard deviation of the Cl content of not more than 10%, based on the Cl content of the quartz glass body;
    a standard deviation of the Al content of not more than 10%, based on the Al content of the quartz glass body;
    a refractive index homogeneity of less than $1*10^{-4}$; and
    a cylindrical form,
    wherein the ppb and ppm are based on the total weight of the quartz glass body in each case.

5. The process according to claim 1, wherein the silicon dioxide powder comprises at least one of:
    a BET surface area in a range from 20 to 60 m²/g;
    a bulk density in a range from 0.01 to 0.3 g/cm³;
    a carbon content of less than 50 ppm;
    a chlorine content of less than 200 ppm;
    an aluminium content of less than 200 ppb;
    a total content of metals which are different from aluminium of less than 5 ppm;
    at least 70 wt.-% of the powder particles have a primary particle size in a range from 10 to 100 nm;
    a tamped density in a range from 0.001 to 0.3 g/cm³;
    a residual moisture content of less than 5 wt.-%;
    a particle size distribution $D_{10}$ in a range from 1 to 7 µm;
    a particle size distribution $D_{50}$ in a range from 6 to 15 µm; and
    a particle size distribution $D_{90}$ in a range from 10 to 40 µm;
    wherein the wt.-%, ppm and ppb are based on the total weight of the silicon dioxide powder in each case.

6. The process according to claim 1, wherein the silicon dioxide powder is prepared from a compound selected from the group consisting of siloxanes, silicon alkoxides and silicon halides.

7. The process according to claim 1, further comprising making a hollow body with at least one opening from the quartz glass body.

8. A process for preparing a light guide, comprising:
    providing
        a hollow body with at least one opening obtained by a process according to claim 7;

introducing one or more core rods into the quartz glass body through the at least one opening to obtain a precursor; and drawing the precursor from in the warm to obtain a light guide with one or more cores and a jacket.

9. A process for preparing a light guide, comprising:
providing
   a hollow body obtained by a process according to claim 7;
optionally fitting the hollow body with electrodes; and
filling the hollow body with a gas.

10. A process for preparing a formed body comprising:
providing a quartz glass body according to claim 7; and
forming a formed body from the quartz glass body.

\* \* \* \* \*

UNITED STATES PATENT AND TRADEMARK OFFICE
CERTIFICATE OF CORRECTION

| | |
|---|---|
| PATENT NO. | : 11,299,417 B2 |
| APPLICATION NO. | : 16/062658 |
| DATED | : April 12, 2022 |
| INVENTOR(S) | : Otter et al. |

It is certified that error appears in the above-identified patent and that said Letters Patent is hereby corrected as shown below:

On the Title Page

Item [87], delete "WO2017/103155" and insert in place thereof --WO2017/103115--.

Signed and Sealed this
Thirtieth Day of August, 2022

Katherine Kelly Vidal
*Director of the United States Patent and Trademark Office*